(12) United States Patent
Kurs

(10) Patent No.: US 9,842,687 B2
(45) Date of Patent: Dec. 12, 2017

(54) WIRELESS POWER TRANSFER SYSTEMS WITH SHAPED MAGNETIC COMPONENTS

(71) Applicant: WiTricity Corporation, Watertown, MA (US)

(72) Inventor: Andre B. Kurs, Chestnut Hill, MA (US)

(73) Assignee: WiTricity Corporation, Watertown, MA (US)

( * ) Notice: Subject to any disclaimer, the term of this patent is extended or adjusted under 35 U.S.C. 154(b) by 336 days.

(21) Appl. No.: 14/688,103

(22) Filed: Apr. 16, 2015

(65) Prior Publication Data

US 2015/0302985 A1   Oct. 22, 2015

Related U.S. Application Data

(60) Provisional application No. 61/980,711, filed on Apr. 17, 2014.

(51) Int. Cl.
| | |
|---|---|
| *H02J 50/00* | (2016.01) |
| *H01F 38/14* | (2006.01) |
| *H01F 3/10* | (2006.01) |
| *H02J 7/02* | (2016.01) |
| *H02J 50/12* | (2016.01) |

(Continued)

(52) U.S. Cl.
CPC .............. *H01F 38/14* (2013.01); *H01F 3/10* (2013.01); *H02J 7/025* (2013.01); *H02J 50/12* (2016.02); *H02J 5/005* (2013.01); *H02J 50/00* (2016.02); *H02J 50/10* (2016.02)

(58) Field of Classification Search
None
See application file for complete search history.

(56) References Cited

U.S. PATENT DOCUMENTS

| | | |
|---|---|---|
| 645,576 A | 3/1900 | Tesla |
| 649,621 A | 5/1900 | Tesla |

(Continued)

FOREIGN PATENT DOCUMENTS

| | | |
|---|---|---|
| CA | 142352 | 8/1912 |
| CN | 102239633 | 11/2011 |

(Continued)

OTHER PUBLICATIONS

"Intel CTO Says Gap between Humans, Machines Will Close by 2050", *Intel News Release*, (See intel.com/.../20080821comp. htm?iid=S . . . ) (Printed Nov. 6, 2009).

(Continued)

*Primary Examiner* — Tuan T Lam
(74) *Attorney, Agent, or Firm* — Fish & Richardson P.C.

(57) ABSTRACT

In a first aspect, the disclosure features apparatuses for wireless power transfer, the apparatuses including a coil formed of a conductive material. The coil includes a plurality of loops, where the plurality of loops defines an internal region of the coil that extends along a coil axis. The apparatuses include a magnetic component, where the magnetic component is disposed in the internal region and extends in a first direction parallel to the coil axis and in a second direction perpendicular to the coil axis. A maximum dimension of the magnetic component measured in the second direction varies along the first direction.

17 Claims, 36 Drawing Sheets

(51) Int. Cl.
*H02J 5/00* (2016.01)
*H02J 50/10* (2016.01)

(56) References Cited

U.S. PATENT DOCUMENTS

| | | | |
|---|---|---|---|
| 787,412 A | 4/1905 | Tesla | |
| 1,119,732 A | 12/1914 | Tesla | |
| 2,133,494 A | 10/1938 | Waters | |
| 3,131,078 A * | 4/1964 | Fuller | G11C 8/005 118/504 |
| 3,517,350 A | 6/1970 | Beaver | |
| 3,535,543 A | 10/1970 | Dailey | |
| 3,780,425 A | 12/1973 | Penn et al. | |
| 3,871,176 A | 3/1975 | Schukei | |
| 4,088,999 A | 5/1978 | Fletcher et al. | |
| 4,095,998 A | 6/1978 | Hanson | |
| 4,180,795 A | 12/1979 | Matsuda et al. | |
| 4,280,129 A | 7/1981 | Wells | |
| 4,450,431 A | 5/1984 | Hochstein | |
| 4,588,978 A | 5/1986 | Allen | |
| 5,027,709 A | 7/1991 | Slagle | |
| 5,033,295 A | 7/1991 | Schmid et al. | |
| 5,034,658 A | 7/1991 | Hiering et al. | |
| 5,053,774 A | 10/1991 | Schuermann et al. | |
| 5,070,293 A | 12/1991 | Ishii et al. | |
| 5,118,997 A | 6/1992 | El-Hamamsy | |
| 5,216,402 A | 6/1993 | Carosa | |
| 5,229,652 A | 7/1993 | Hough | |
| 5,287,112 A | 2/1994 | Schuermann | |
| 5,341,083 A | 8/1994 | Klontz et al. | |
| 5,367,242 A | 11/1994 | Hulman | |
| 5,374,930 A | 12/1994 | Schuermann | |
| 5,408,209 A | 4/1995 | Tanzer et al. | |
| 5,437,057 A | 7/1995 | Richley et al. | |
| 5,455,467 A | 10/1995 | Young et al. | |
| 5,493,691 A | 2/1996 | Barrett | |
| 5,522,856 A | 6/1996 | Reineman | |
| 5,528,113 A | 6/1996 | Boys et al. | |
| 5,541,604 A | 7/1996 | Meier | |
| 5,550,452 A | 8/1996 | Shirai et al. | |
| 5,565,763 A | 10/1996 | Arrendale et al. | |
| 5,630,835 A | 5/1997 | Brownlee | |
| 5,697,956 A | 12/1997 | Bornzin | |
| 5,703,461 A | 12/1997 | Minoshima et al. | |
| 5,703,573 A | 12/1997 | Fujimoto et al. | |
| 5,710,413 A | 1/1998 | King et al. | |
| 5,742,471 A | 4/1998 | Barbee, Jr. et al. | |
| 5,814,900 A * | 9/1998 | Esser | H01F 38/18 307/104 |
| 5,821,728 A | 10/1998 | Sshwind | |
| 5,821,731 A | 10/1998 | Kuki et al. | |
| 5,864,323 A | 1/1999 | Berthon | |
| 5,898,579 A | 4/1999 | Boys et al. | |
| 5,903,134 A | 5/1999 | Takeuchi | |
| 5,923,544 A | 7/1999 | Urano | |
| 5,940,509 A | 8/1999 | Jovanovich et al. | |
| 5,957,956 A | 9/1999 | Kroll et al. | |
| 5,959,245 A | 9/1999 | Moe et al. | |
| 5,986,895 A | 11/1999 | Stewart et al. | |
| 5,993,996 A | 11/1999 | Firsich | |
| 5,999,308 A | 12/1999 | Nelson et al. | |
| 6,012,659 A | 1/2000 | Nakazawa et al. | |
| 6,047,214 A | 4/2000 | Mueller et al. | |
| 6,066,163 A | 5/2000 | John | |
| 6,067,473 A | 5/2000 | Greeninger et al. | |
| 6,108,579 A | 8/2000 | Snell et al. | |
| 6,127,799 A | 10/2000 | Krishnan | |
| 6,176,433 B1 | 1/2001 | Uesaka et al. | |
| 6,184,651 B1 | 2/2001 | Fernandez et al. | |
| 6,207,887 B1 | 3/2001 | Bass et al. | |
| 6,232,841 B1 | 5/2001 | Bartlett et al. | |
| 6,238,387 B1 | 5/2001 | Miller, III | |
| 6,252,762 B1 | 6/2001 | Amatucci | |
| 6,436,299 B1 | 8/2002 | Baarman et al. | |
| 6,450,946 B1 | 9/2002 | Forsell | |
| 6,452,465 B1 | 9/2002 | Brown et al. | |
| 6,459,218 B1 | 10/2002 | Boys et al. | |
| 6,473,028 B1 | 10/2002 | Luc | |
| 6,483,202 B1 | 11/2002 | Boys | |
| 6,515,878 B1 | 2/2003 | Meins et al. | |
| 6,535,133 B2 | 3/2003 | Gohara | |
| 6,561,975 B1 | 5/2003 | Pool et al. | |
| 6,563,425 B2 | 5/2003 | Nicholson et al. | |
| 6,597,076 B2 | 7/2003 | Scheible et al. | |
| 6,609,023 B1 | 8/2003 | Fischell et al. | |
| 6,631,072 B1 | 10/2003 | Paul et al. | |
| 6,650,227 B1 | 11/2003 | Bradin | |
| 6,664,770 B1 | 12/2003 | Bartels | |
| 6,673,250 B2 | 1/2004 | Kuennen et al. | |
| 6,683,256 B2 | 1/2004 | Kao | |
| 6,696,647 B2 | 2/2004 | Ono et al. | |
| 6,703,921 B1 | 3/2004 | Wuidart et al. | |
| 6,731,071 B2 | 5/2004 | Baarman | |
| 6,749,119 B2 | 6/2004 | Scheible et al. | |
| 6,772,011 B2 | 8/2004 | Dolgin | |
| 6,798,716 B1 | 9/2004 | Charych | |
| 6,803,744 B1 | 10/2004 | Sabo | |
| 6,806,649 B2 | 10/2004 | Mollema et al. | |
| 6,812,645 B2 | 11/2004 | Baarman | |
| 6,825,620 B2 | 11/2004 | Kuennen et al. | |
| 6,831,417 B2 | 12/2004 | Baarman | |
| 6,839,035 B1 | 1/2005 | Addonisio et al. | |
| 6,844,702 B2 | 1/2005 | Giannopoulos et al. | |
| 6,856,291 B2 | 2/2005 | Mickle et al. | |
| 6,858,970 B2 | 2/2005 | Malkin et al. | |
| 6,906,495 B2 | 6/2005 | Cheng et al. | |
| 6,917,163 B2 | 7/2005 | Baarman | |
| 6,917,431 B2 | 7/2005 | Soljacic et al. | |
| 6,937,130 B2 | 8/2005 | Scheible et al. | |
| 6,960,968 B2 | 11/2005 | Odendaal et al. | |
| 6,961,619 B2 | 11/2005 | Casey | |
| 6,967,462 B1 | 11/2005 | Landis | |
| 6,975,198 B2 | 12/2005 | Baarman | |
| 6,988,026 B2 | 1/2006 | Breed et al. | |
| 7,027,311 B2 | 4/2006 | Vanderelli et al. | |
| 7,035,076 B1 | 4/2006 | Stevenson | |
| 7,042,196 B2 | 5/2006 | Ka-Lai et al. | |
| 7,069,064 B2 | 6/2006 | Govorgian et al. | |
| 7,084,605 B2 | 8/2006 | Mickle et al. | |
| 7,116,200 B2 | 10/2006 | Baarman et al. | |
| 7,118,240 B2 | 10/2006 | Baarman et al. | |
| 7,126,450 B2 | 10/2006 | Baarman et al. | |
| 7,127,293 B2 | 10/2006 | MacDonald | |
| 7,132,918 B2 | 11/2006 | Baarman et al. | |
| 7,147,604 B1 | 12/2006 | Allen et al. | |
| 7,180,248 B2 | 2/2007 | Kuennen et al. | |
| 7,191,007 B2 | 3/2007 | Desai et al. | |
| 7,193,418 B2 | 3/2007 | Freytag | |
| D541,322 S | 4/2007 | Garrett et al. | |
| 7,212,414 B2 | 5/2007 | Baarman | |
| 7,233,137 B2 | 6/2007 | Nakamura et al. | |
| D545,855 S | 7/2007 | Garrett et al. | |
| 7,239,110 B2 | 7/2007 | Cheng et al. | |
| 7,248,017 B2 | 7/2007 | Cheng et al. | |
| 7,251,527 B2 | 7/2007 | Lyden | |
| 7,288,918 B2 | 10/2007 | DiStefano | |
| 7,340,304 B2 | 3/2008 | MacDonald | |
| 7,375,492 B2 | 5/2008 | Calhoon et al. | |
| 7,375,493 B2 | 5/2008 | Calhoon et al. | |
| 7,378,817 B2 | 5/2008 | Calhoon et al. | |
| 7,382,636 B2 | 6/2008 | Baarman et al. | |
| 7,385,357 B2 | 6/2008 | Kuennen et al. | |
| 7,443,135 B2 | 10/2008 | Cho | |
| 7,462,951 B1 | 12/2008 | Baarman | |
| 7,466,213 B2 | 12/2008 | Lobl et al. | |
| 7,471,062 B2 | 12/2008 | Bruning | |
| 7,474,058 B2 | 1/2009 | Baarman | |
| 7,492,247 B2 | 2/2009 | Schmidt et al. | |
| 7,514,818 B2 | 4/2009 | Abe et al. | |
| 7,518,267 B2 | 4/2009 | Baarman | |
| 7,521,890 B2 | 4/2009 | Lee et al. | |
| 7,525,283 B2 | 4/2009 | Cheng et al. | |
| 7,545,337 B2 | 6/2009 | Guenther | |
| 7,554,316 B2 | 6/2009 | Stevens et al. | |

(56) References Cited

U.S. PATENT DOCUMENTS

| | | | |
|---|---|---|---|
| 7,599,743 B2 | 10/2009 | Hassler, Jr. et al. | |
| 7,615,936 B2 | 11/2009 | Baarman et al. | |
| 7,639,514 B2 | 12/2009 | Baarman | |
| 7,741,734 B2 | 6/2010 | Joannopoulos et al. | |
| 7,795,708 B2 | 9/2010 | Katti | |
| 7,825,543 B2 | 11/2010 | Karalis et al. | |
| 7,825,544 B2 | 11/2010 | Jansen et al. | |
| 7,835,417 B2 | 11/2010 | Heideman et al. | |
| 7,843,288 B2 | 11/2010 | Lee et al. | |
| 7,844,306 B2 | 11/2010 | Shearer et al. | |
| 7,863,859 B2 | 1/2011 | Soar | |
| 7,880,337 B2 | 2/2011 | Farkas | |
| 7,884,697 B2 | 2/2011 | Wei et al. | |
| 7,885,050 B2 | 2/2011 | Lee | |
| 7,919,886 B2 | 4/2011 | Tanaka | |
| 7,923,870 B2 | 4/2011 | Jin | |
| 7,932,798 B2 | 4/2011 | Tolle et al. | |
| 7,948,209 B2 | 5/2011 | Jung | |
| 7,952,322 B2 | 5/2011 | Partovi et al. | |
| 7,963,941 B2 | 6/2011 | Wilk | |
| 7,969,045 B2 | 6/2011 | Schmidt et al. | |
| 7,994,880 B2 | 8/2011 | Chen et al. | |
| 7,999,506 B1 | 8/2011 | Hollar et al. | |
| 8,022,576 B2 | 9/2011 | Joannopoulos et al. | |
| 8,035,255 B2 | 10/2011 | Kurs et al. | |
| 8,076,800 B2 | 12/2011 | Joannopoulos et al. | |
| 8,076,801 B2 | 12/2011 | Karalis et al. | |
| 8,084,889 B2 | 12/2011 | Joannopoulos et al. | |
| 8,097,983 B2 | 1/2012 | Karalis et al. | |
| 8,106,539 B2 | 1/2012 | Schatz et al. | |
| 8,115,448 B2 | 2/2012 | John | |
| 8,130,067 B2 * | 3/2012 | Lee | H01F 17/08 148/108 |
| 8,131,378 B2 | 3/2012 | Greenberg et al. | |
| 8,178,995 B2 | 5/2012 | Amano et al. | |
| 8,193,769 B2 | 6/2012 | Azancot et al. | |
| 8,212,414 B2 | 7/2012 | Howard et al. | |
| 8,260,200 B2 | 9/2012 | Shimizu et al. | |
| 8,304,935 B2 | 11/2012 | Karalis et al. | |
| 8,324,759 B2 | 12/2012 | Karalis et al. | |
| 8,334,620 B2 | 12/2012 | Park et al. | |
| 8,362,651 B2 | 1/2013 | Hamam et al. | |
| 8,395,282 B2 | 3/2013 | Joannopoulos et al. | |
| 8,395,283 B2 | 3/2013 | Joannopoulos et al. | |
| 8,400,017 B2 | 3/2013 | Kurs et al. | |
| 8,400,018 B2 | 3/2013 | Joannopoulos et al. | |
| 8,400,019 B2 | 3/2013 | Joannopoulos et al. | |
| 8,400,020 B2 | 3/2013 | Joannopoulos et al. | |
| 8,400,021 B2 | 3/2013 | Joannopoulos et al. | |
| 8,400,022 B2 | 3/2013 | Joannopoulos et al. | |
| 8,400,023 B2 | 3/2013 | Joannopoulos et al. | |
| 8,400,024 B2 | 3/2013 | Joannopoulos et al. | |
| 8,410,636 B2 | 4/2013 | Kurs et al. | |
| 8,441,154 B2 | 5/2013 | Karalis et al. | |
| 8,457,547 B2 | 6/2013 | Meskens | |
| 8,461,719 B2 | 6/2013 | Kesler et al. | |
| 8,461,720 B2 | 6/2013 | Kurs et al. | |
| 8,461,721 B2 | 6/2013 | Karalis et al. | |
| 8,461,722 B2 | 6/2013 | Kurs et al. | |
| 8,461,817 B2 | 6/2013 | Martin et al. | |
| 8,466,583 B2 | 6/2013 | Karalis et al. | |
| 8,471,410 B2 | 6/2013 | Karalis et al. | |
| 8,476,788 B2 | 7/2013 | Karalis et al. | |
| 8,482,157 B2 | 7/2013 | Cook et al. | |
| 8,482,158 B2 | 7/2013 | Kurs et al. | |
| 8,487,480 B1 | 7/2013 | Kesler et al. | |
| 8,497,601 B2 | 7/2013 | Hall et al. | |
| 8,552,592 B2 | 10/2013 | Schatz et al. | |
| 8,569,914 B2 | 10/2013 | Karalis et al. | |
| 8,587,153 B2 | 11/2013 | Schatz et al. | |
| 8,587,155 B2 | 11/2013 | Giler et al. | |
| 8,598,743 B2 | 12/2013 | Hall et al. | |
| 8,618,696 B2 | 12/2013 | Karalis et al. | |
| 8,629,578 B2 | 1/2014 | Kurs et al. | |
| 8,643,326 B2 | 2/2014 | Campanella et al. | |
| 2002/0032471 A1 | 3/2002 | Loftin et al. | |
| 2002/0105343 A1 | 8/2002 | Scheible et al. | |
| 2002/0118004 A1 | 8/2002 | Scheible et al. | |
| 2002/0130642 A1 | 9/2002 | Ettes et al. | |
| 2002/0167294 A1 | 11/2002 | Odaohhara | |
| 2003/0038641 A1 | 2/2003 | Scheible | |
| 2003/0062794 A1 | 4/2003 | Scheible et al. | |
| 2003/0062980 A1 | 4/2003 | Scheible et al. | |
| 2003/0071034 A1 | 4/2003 | Thompson et al. | |
| 2003/0124050 A1 | 7/2003 | Yadav et al. | |
| 2003/0126948 A1 | 7/2003 | Yadav et al. | |
| 2003/0160590 A1 | 8/2003 | Schaefer et al. | |
| 2003/0199778 A1 | 10/2003 | Mickle et al. | |
| 2003/0214255 A1 | 11/2003 | Baarman et al. | |
| 2004/0000974 A1 | 1/2004 | Odenaal et al. | |
| 2004/0026998 A1 | 2/2004 | Henriott et al. | |
| 2004/0100338 A1 | 5/2004 | Clark | |
| 2004/0113847 A1 | 6/2004 | Qi et al. | |
| 2004/0130425 A1 | 7/2004 | Dayan et al. | |
| 2004/0130915 A1 | 7/2004 | Baarman | |
| 2004/0130916 A1 | 7/2004 | Baarman | |
| 2004/0142733 A1 | 7/2004 | Parise | |
| 2004/0150934 A1 | 8/2004 | Baarman | |
| 2004/0189246 A1 | 9/2004 | Bulai et al. | |
| 2004/0201361 A1 | 10/2004 | Koh et al. | |
| 2004/0222751 A1 | 11/2004 | Mollema et al. | |
| 2004/0227057 A1 | 11/2004 | Tuominen et al. | |
| 2004/0232845 A1 | 11/2004 | Baarman | |
| 2004/0233043 A1 | 11/2004 | Yazawa et al. | |
| 2004/0267501 A1 | 12/2004 | Freed et al. | |
| 2005/0007067 A1 | 1/2005 | Baarman et al. | |
| 2005/0021134 A1 | 1/2005 | Opie | |
| 2005/0027192 A1 | 2/2005 | Govari et al. | |
| 2005/0033382 A1 | 2/2005 | Single | |
| 2005/0085873 A1 | 4/2005 | Gord et al. | |
| 2005/0093475 A1 | 5/2005 | Kuennen et al. | |
| 2005/0104064 A1 | 5/2005 | Hegarty et al. | |
| 2005/0104453 A1 | 5/2005 | Vanderelli et al. | |
| 2005/0116650 A1 | 6/2005 | Baarman | |
| 2005/0116683 A1 | 6/2005 | Cheng et al. | |
| 2005/0122058 A1 | 6/2005 | Baarman et al. | |
| 2005/0122059 A1 | 6/2005 | Baarman et al. | |
| 2005/0125093 A1 | 6/2005 | Kikuchi et al. | |
| 2005/0127849 A1 | 6/2005 | Baarman et al. | |
| 2005/0127850 A1 | 6/2005 | Baarman et al. | |
| 2005/0127866 A1 | 6/2005 | Hamilton et al. | |
| 2005/0135122 A1 | 6/2005 | Cheng et al. | |
| 2005/0140482 A1 | 6/2005 | Cheng et al. | |
| 2005/0151511 A1 | 7/2005 | Chary | |
| 2005/0156560 A1 | 7/2005 | Shimaoka et al. | |
| 2005/0189945 A1 | 9/2005 | Reiderman | |
| 2005/0194926 A1 | 9/2005 | DiStefano | |
| 2005/0253152 A1 | 11/2005 | Klimov et al. | |
| 2005/0288739 A1 | 12/2005 | Hassler, Jr. et al. | |
| 2005/0288740 A1 | 12/2005 | Hassler, Jr. et al. | |
| 2005/0288741 A1 | 12/2005 | Hassler, Jr. et al. | |
| 2005/0288742 A1 | 12/2005 | Giordano et al. | |
| 2006/0001509 A1 | 1/2006 | Gibbs | |
| 2006/0010902 A1 | 1/2006 | Trinh et al. | |
| 2006/0022636 A1 | 2/2006 | Xian et al. | |
| 2006/0053296 A1 | 3/2006 | Busboom et al. | |
| 2006/0061323 A1 * | 3/2006 | Cheng | H02J 5/005 320/108 |
| 2006/0066443 A1 | 3/2006 | Hall | |
| 2006/0090956 A1 | 5/2006 | Peshkovskiy et al. | |
| 2006/0132045 A1 | 6/2006 | Baarman | |
| 2006/0164866 A1 | 7/2006 | Vanderelli et al. | |
| 2006/0181242 A1 | 8/2006 | Freed et al. | |
| 2006/0184209 A1 | 8/2006 | John et al. | |
| 2006/0184210 A1 | 8/2006 | Singhal et al. | |
| 2006/0185809 A1 | 8/2006 | Elfrink et al. | |
| 2006/0199620 A1 | 9/2006 | Greene et al. | |
| 2006/0202665 A1 | 9/2006 | Hsu | |
| 2006/0205381 A1 | 9/2006 | Beart et al. | |
| 2006/0214626 A1 | 9/2006 | Nilson et al. | |
| 2006/0219448 A1 | 10/2006 | Grieve et al. | |
| 2006/0238365 A1 | 10/2006 | Vecchione et al. | |
| 2006/0270440 A1 | 11/2006 | Shearer et al. | |
| 2006/0281435 A1 | 12/2006 | Shearer et al. | |

(56) References Cited

U.S. PATENT DOCUMENTS

| | | |
|---|---|---|
| 2007/0010295 A1 | 1/2007 | Greene et al. |
| 2007/0013483 A1 | 1/2007 | Stewart |
| 2007/0016089 A1 | 1/2007 | Fischell et al. |
| 2007/0021140 A1 | 1/2007 | Keyes, IV et al. |
| 2007/0024246 A1 | 2/2007 | Flaugher |
| 2007/0064406 A1 | 3/2007 | Beart |
| 2007/0069687 A1 | 3/2007 | Suzuki |
| 2007/0096875 A1 | 5/2007 | Waterhouse et al. |
| 2007/0105429 A1 | 5/2007 | Kohl et al. |
| 2007/0117596 A1 | 5/2007 | Greene et al. |
| 2007/0126650 A1 | 6/2007 | Guenther |
| 2007/0145830 A1 | 6/2007 | Lee et al. |
| 2007/0164839 A1 | 7/2007 | Naito |
| 2007/0171681 A1 | 7/2007 | Baarman |
| 2007/0176840 A1 | 8/2007 | Pristas et al. |
| 2007/0178945 A1 | 8/2007 | Cook et al. |
| 2007/0182367 A1 | 8/2007 | Partovi |
| 2007/0208263 A1 | 9/2007 | John et al. |
| 2007/0222542 A1 | 9/2007 | Joannopoulos et al. |
| 2007/0257636 A1 | 11/2007 | Phillips et al. |
| 2007/0267918 A1 | 11/2007 | Gyland |
| 2007/0276538 A1 | 11/2007 | Kjellsson et al. |
| 2008/0012569 A1 | 1/2008 | Hall et al. |
| 2008/0014897 A1 | 1/2008 | Cook et al. |
| 2008/0030415 A1 | 2/2008 | Homan et al. |
| 2008/0036588 A1 | 2/2008 | Iverson et al. |
| 2008/0047727 A1 | 2/2008 | Sexton et al. |
| 2008/0051854 A1 | 2/2008 | Bulkes et al. |
| 2008/0067874 A1 | 3/2008 | Tseng |
| 2008/0132909 A1 | 6/2008 | Jascob et al. |
| 2008/0154331 A1 | 6/2008 | John et al. |
| 2008/0176521 A1 | 7/2008 | Singh et al. |
| 2008/0191638 A1 | 8/2008 | Kuennen et al. |
| 2008/0197710 A1 | 8/2008 | Kreitz et al. |
| 2008/0197802 A1 | 8/2008 | Onishi et al. |
| 2008/0211320 A1 | 9/2008 | Cook et al. |
| 2008/0238364 A1 | 10/2008 | Weber et al. |
| 2008/0255901 A1 | 10/2008 | Carroll et al. |
| 2008/0265684 A1 | 10/2008 | Farkas |
| 2008/0266748 A1 | 10/2008 | Lee |
| 2008/0272860 A1 | 11/2008 | Pance |
| 2008/0273242 A1 | 11/2008 | Woodgate et al. |
| 2008/0278264 A1 | 11/2008 | Karalis et al. |
| 2008/0291277 A1 | 11/2008 | Jacobsen et al. |
| 2008/0300657 A1 | 12/2008 | Stultz |
| 2008/0300660 A1 | 12/2008 | John |
| 2009/0010028 A1 | 1/2009 | Baarmen et al. |
| 2009/0015075 A1 | 1/2009 | Cook et al. |
| 2009/0033280 A1 | 2/2009 | Choi et al. |
| 2009/0033564 A1 | 2/2009 | Cook et al. |
| 2009/0038623 A1 | 2/2009 | Farbarik et al. |
| 2009/0045772 A1 | 2/2009 | Cook et al. |
| 2009/0051224 A1 | 2/2009 | Cook et al. |
| 2009/0058189 A1 | 3/2009 | Cook et al. |
| 2009/0058361 A1 | 3/2009 | John |
| 2009/0067198 A1 | 3/2009 | Graham et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0072782 A1 | 3/2009 | Randall |
| 2009/0079268 A1 | 3/2009 | Cook et al. |
| 2009/0079387 A1 | 3/2009 | Jin et al. |
| 2009/0085408 A1 | 4/2009 | Bruhn |
| 2009/0085706 A1 | 4/2009 | Baarman et al. |
| 2009/0096413 A1 | 4/2009 | Patovi et al. |
| 2009/0102292 A1 | 4/2009 | Cook et al. |
| 2009/0108679 A1 | 4/2009 | Porwal |
| 2009/0108997 A1 | 4/2009 | Patterson et al. |
| 2009/0115628 A1 | 5/2009 | Dicks et al. |
| 2009/0127937 A1 | 5/2009 | Widmer et al. |
| 2009/0134712 A1 | 5/2009 | Cook et al. |
| 2009/0146892 A1 | 6/2009 | Shimizu et al. |
| 2009/0153273 A1 | 6/2009 | Chen |
| 2009/0160261 A1 | 6/2009 | Elo |
| 2009/0161078 A1 | 6/2009 | Wu et al. |
| 2009/0167449 A1 | 7/2009 | Cook et al. |
| 2009/0174263 A1 | 7/2009 | Baarman et al. |
| 2009/0179502 A1 | 7/2009 | Cook et al. |
| 2009/0188396 A1 | 7/2009 | Hofmann et al. |
| 2009/0189458 A1 | 7/2009 | Kawasaki |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0218884 A1 | 9/2009 | Soar |
| 2009/0224608 A1 | 9/2009 | Cook et al. |
| 2009/0224609 A1 | 9/2009 | Cook et al. |
| 2009/0224723 A1 | 9/2009 | Tanabe |
| 2009/0224856 A1 | 9/2009 | Karalis et al. |
| 2009/0230777 A1 | 9/2009 | Baarman et al. |
| 2009/0237194 A1 | 9/2009 | Waffenschmidt et al. |
| 2009/0243394 A1 | 10/2009 | Levine |
| 2009/0243397 A1 | 10/2009 | Cook et al. |
| 2009/0251008 A1 | 10/2009 | Sugaya |
| 2009/0261778 A1 | 10/2009 | Kook |
| 2009/0267558 A1 | 10/2009 | Jung |
| 2009/0267709 A1 | 10/2009 | Joannopoulos et al. |
| 2009/0267710 A1 | 10/2009 | Joannopoulos et al. |
| 2009/0271047 A1 | 10/2009 | Wakamatsu |
| 2009/0271048 A1 | 10/2009 | Wakamatsu |
| 2009/0273242 A1 | 11/2009 | Cook |
| 2009/0273318 A1 | 11/2009 | Rondoni et al. |
| 2009/0281678 A1 | 11/2009 | Wakamatsu |
| 2009/0284082 A1 | 11/2009 | Mohammadian |
| 2009/0284083 A1 | 11/2009 | Karalis et al. |
| 2009/0284218 A1 | 11/2009 | Mohammadian et al. |
| 2009/0284220 A1 | 11/2009 | Toncich et al. |
| 2009/0284227 A1 | 11/2009 | Mohammadian et al. |
| 2009/0284245 A1 | 11/2009 | Kirby et al. |
| 2009/0284369 A1 | 11/2009 | Toncich et al. |
| 2009/0286470 A1 | 11/2009 | Mohammadian et al. |
| 2009/0286475 A1 | 11/2009 | Toncich et al. |
| 2009/0286476 A1 | 11/2009 | Toncich et al. |
| 2009/0289595 A1 | 11/2009 | Chen et al. |
| 2009/0299918 A1 | 12/2009 | Cook et al. |
| 2009/0308933 A1 | 12/2009 | Osada |
| 2009/0322158 A1 | 12/2009 | Stevens et al. |
| 2009/0322280 A1 | 12/2009 | Kamijo et al. |
| 2010/0015918 A1 | 1/2010 | Liu et al. |
| 2010/0017249 A1 | 1/2010 | Fincham et al. |
| 2010/0033021 A1 | 2/2010 | Bennett |
| 2010/0034238 A1 | 2/2010 | Bennett |
| 2010/0036773 A1 | 2/2010 | Bennett |
| 2010/0038970 A1 | 2/2010 | Cook et al. |
| 2010/0045114 A1 | 2/2010 | Sample et al. |
| 2010/0052431 A1 | 3/2010 | Mita |
| 2010/0052811 A1 | 3/2010 | Smith et al. |
| 2010/0060077 A1 | 3/2010 | Paulus et al. |
| 2010/0065352 A1 | 3/2010 | Ichikawa |
| 2010/0066349 A1 | 3/2010 | Lin et al. |
| 2010/0076524 A1 | 3/2010 | Forsberg et al. |
| 2010/0081379 A1 | 4/2010 | Cooper et al. |
| 2010/0094381 A1 | 4/2010 | Kim et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0104031 A1 | 4/2010 | Lacour |
| 2010/0109443 A1 | 5/2010 | Cook et al. |
| 2010/0109445 A1 | 5/2010 | Kurs et al. |
| 2010/0109604 A1 | 5/2010 | Boys et al. |
| 2010/0115474 A1 | 5/2010 | Takada et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0117596 A1 | 5/2010 | Cook et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0123452 A1 | 5/2010 | Amano et al. |
| 2010/0123530 A1 | 5/2010 | Park et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |

(56) References Cited

U.S. PATENT DOCUMENTS

| | | |
|---|---|---|
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0148723 A1 | 6/2010 | Cook et al. |
| 2010/0151808 A1 | 6/2010 | Toncich et al. |
| 2010/0156346 A1 | 6/2010 | Takada et al. |
| 2010/0156355 A1 | 6/2010 | Bauerle et al. |
| 2010/0156570 A1 | 6/2010 | Hong et al. |
| 2010/0164295 A1 | 7/2010 | Ichikawa et al. |
| 2010/0164296 A1 | 7/2010 | Kurs |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0171370 A1 | 7/2010 | Karalis et al. |
| 2010/0179384 A1 | 7/2010 | Hoeg et al. |
| 2010/0181843 A1 | 7/2010 | Schatz et al. |
| 2010/0181844 A1 | 7/2010 | Karalis et al. |
| 2010/0181845 A1 | 7/2010 | Fiorello et al. |
| 2010/0181961 A1 | 7/2010 | Novak et al. |
| 2010/0181964 A1 | 7/2010 | Huggins et al. |
| 2010/0184371 A1 | 7/2010 | Cook et al. |
| 2010/0187911 A1 | 7/2010 | Joannopoulos et al. |
| 2010/0187913 A1 | 7/2010 | Sample |
| 2010/0188183 A1 | 7/2010 | Shpiro |
| 2010/0190435 A1 | 7/2010 | Cook et al. |
| 2010/0190436 A1 | 7/2010 | Cook et al. |
| 2010/0194206 A1 | 8/2010 | Burdo et al. |
| 2010/0194207 A1 | 8/2010 | Graham |
| 2010/0194334 A1 | 8/2010 | Kirby et al. |
| 2010/0194335 A1 | 8/2010 | Kirby et al. |
| 2010/0201189 A1 | 8/2010 | Kirby et al. |
| 2010/0201201 A1 | 8/2010 | Mobarhan et al. |
| 2010/0201202 A1 | 8/2010 | Kirby et al. |
| 2010/0201203 A1 | 8/2010 | Schatz et al. |
| 2010/0201204 A1 | 8/2010 | Sakoda et al. |
| 2010/0201205 A1 | 8/2010 | Karalis et al. |
| 2010/0201310 A1 | 8/2010 | Vorenkamp et al. |
| 2010/0201312 A1 | 8/2010 | Kirby et al. |
| 2010/0201313 A1 | 8/2010 | Vorenkamp et al. |
| 2010/0201316 A1 | 8/2010 | Takada et al. |
| 2010/0201513 A1 | 8/2010 | Vorenkamp et al. |
| 2010/0207458 A1 | 8/2010 | Joannopoulos et al. |
| 2010/0210233 A1 | 8/2010 | Cook et al. |
| 2010/0213770 A1 | 8/2010 | Kikuchi |
| 2010/0213895 A1 | 8/2010 | Keating et al. |
| 2010/0217553 A1 | 8/2010 | Von Novak et al. |
| 2010/0219694 A1 | 9/2010 | Kurs et al. |
| 2010/0219695 A1 | 9/2010 | Komiyama et al. |
| 2010/0219696 A1 | 9/2010 | Kojima |
| 2010/0222010 A1 | 9/2010 | Ozaki et al. |
| 2010/0225175 A1 | 9/2010 | Karalis et al. |
| 2010/0225270 A1 | 9/2010 | Jacobs et al. |
| 2010/0225271 A1 | 9/2010 | Oyobe et al. |
| 2010/0225272 A1 | 9/2010 | Kirby et al. |
| 2010/0231053 A1 | 9/2010 | Karalis et al. |
| 2010/0231163 A1 | 9/2010 | Mashinsky |
| 2010/0231340 A1 | 9/2010 | Fiorello et al. |
| 2010/0234922 A1 | 9/2010 | Forsell |
| 2010/0235006 A1 | 9/2010 | Brown |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0237709 A1 | 9/2010 | Hall et al. |
| 2010/0244576 A1 | 9/2010 | Hillan et al. |
| 2010/0244577 A1 | 9/2010 | Shimokawa |
| 2010/0244578 A1 | 9/2010 | Yoshikawa |
| 2010/0244579 A1 | 9/2010 | Sogabe et al. |
| 2010/0244580 A1 | 9/2010 | Uchida et al. |
| 2010/0244581 A1 | 9/2010 | Uchida |
| 2010/0244582 A1 | 9/2010 | Yoshikawa |
| 2010/0244583 A1 | 9/2010 | Shimokawa |
| 2010/0244767 A1 | 9/2010 | Turner et al. |
| 2010/0244839 A1 | 9/2010 | Yoshikawa |
| 2010/0248622 A1 | 9/2010 | Kirby et al. |
| 2010/0253152 A1 | 10/2010 | Karalis et al. |
| 2010/0253281 A1 | 10/2010 | Li |
| 2010/0256481 A1 | 10/2010 | Mareci et al. |
| 2010/0256831 A1 | 10/2010 | Abramo et al. |
| 2010/0259108 A1 | 10/2010 | Giler et al. |
| 2010/0259109 A1 | 10/2010 | Sato |
| 2010/0259110 A1 | 10/2010 | Kurs et al. |
| 2010/0264745 A1 | 10/2010 | Karalis et al. |
| 2010/0264746 A1 | 10/2010 | Kazama et al. |
| 2010/0264747 A1 | 10/2010 | Hall et al. |
| 2010/0276995 A1 | 11/2010 | Marzetta et al. |
| 2010/0277003 A1 | 11/2010 | Von Novak et al. |
| 2010/0277004 A1 | 11/2010 | Suzuki et al. |
| 2010/0277005 A1 | 11/2010 | Karalis et al. |
| 2010/0277120 A1 | 11/2010 | Cook et al. |
| 2010/0277121 A1 | 11/2010 | Hall et al. |
| 2010/0289341 A1 | 11/2010 | Ozaki et al. |
| 2010/0289449 A1 | 11/2010 | Elo |
| 2010/0295505 A1 | 11/2010 | Jung et al. |
| 2010/0295506 A1 | 11/2010 | Ichikawa |
| 2010/0308939 A1 | 12/2010 | Kurs |
| 2010/0314946 A1 | 12/2010 | Budde et al. |
| 2010/0327660 A1 | 12/2010 | Karalis et al. |
| 2010/0327661 A1 | 12/2010 | Karalis et al. |
| 2010/0328044 A1 | 12/2010 | Waffenschmidt et al. |
| 2011/0004269 A1 | 1/2011 | Strother et al. |
| 2011/0012431 A1 | 1/2011 | Karalis et al. |
| 2011/0018361 A1 | 1/2011 | Karalis et al. |
| 2011/0025131 A1 | 2/2011 | Karalis et al. |
| 2011/0031928 A1 | 2/2011 | Soar |
| 2011/0043046 A1 | 2/2011 | Joannopoulos et al. |
| 2011/0043047 A1 | 2/2011 | Karalis et al. |
| 2011/0043048 A1 | 2/2011 | Karalis et al. |
| 2011/0043049 A1 | 2/2011 | Karalis et al. |
| 2011/0049995 A1 | 3/2011 | Hashiguchi |
| 2011/0049996 A1 | 3/2011 | Karalis et al. |
| 2011/0049998 A1 | 3/2011 | Karalis et al. |
| 2011/0074218 A1 | 3/2011 | Karalis et al. |
| 2011/0074346 A1 | 3/2011 | Hall et al. |
| 2011/0074347 A1 | 3/2011 | Karalis et al. |
| 2011/0089895 A1 | 4/2011 | Karalis et al. |
| 2011/0095618 A1 | 4/2011 | Schatz et al. |
| 2011/0115303 A1 | 5/2011 | Baarman et al. |
| 2011/0115431 A1 | 5/2011 | Dunworth et al. |
| 2011/0121920 A1 | 5/2011 | Kurs et al. |
| 2011/0128015 A1 | 6/2011 | Dorairaj et al. |
| 2011/0140544 A1 | 6/2011 | Karalis et al. |
| 2011/0148219 A1 | 6/2011 | Karalis et al. |
| 2011/0162895 A1 | 7/2011 | Karalis et al. |
| 2011/0169339 A1 | 7/2011 | Karalis et al. |
| 2011/0181122 A1 | 7/2011 | Karalis et al. |
| 2011/0193416 A1 | 8/2011 | Campanella et al. |
| 2011/0193419 A1 | 8/2011 | Karalis et al. |
| 2011/0198939 A1 | 8/2011 | Karalis et al. |
| 2011/0215086 A1 | 9/2011 | Yeh |
| 2011/0221278 A1 | 9/2011 | Karalis et al. |
| 2011/0227528 A1 | 9/2011 | Karalis et al. |
| 2011/0227530 A1 | 9/2011 | Karalis et al. |
| 2011/0241618 A1 | 10/2011 | Karalis et al. |
| 2011/0248573 A1 | 10/2011 | Kanno et al. |
| 2011/0254377 A1 | 10/2011 | Wildmer et al. |
| 2011/0254503 A1 | 10/2011 | Widmer et al. |
| 2011/0266878 A9 | 11/2011 | Cook et al. |
| 2011/0278943 A1 | 11/2011 | Eckhoff et al. |
| 2012/0001492 A9 | 1/2012 | Cook et al. |
| 2012/0001593 A1 | 1/2012 | DiGuardo |
| 2012/0007435 A1 | 1/2012 | Sada et al. |
| 2012/0007441 A1 | 1/2012 | John et al. |
| 2012/0025602 A1 | 2/2012 | Boys et al. |
| 2012/0032522 A1 | 2/2012 | Schatz et al. |
| 2012/0038525 A1 | 2/2012 | Monsalve Carcelen et al. |
| 2012/0062345 A1 | 3/2012 | Kurs et al. |
| 2012/0068549 A1 | 3/2012 | Karalis et al. |
| 2012/0086284 A1 | 4/2012 | Campanella et al. |
| 2012/0086867 A1 | 4/2012 | Kesler et al. |
| 2012/0091794 A1 | 4/2012 | Campanella et al. |
| 2012/0091795 A1 | 4/2012 | Fiorello et al. |

(56) References Cited

U.S. PATENT DOCUMENTS

| | | |
|---|---|---|
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0091950 A1 | 4/2012 | Campanella et al. |
| 2012/0098350 A1 | 4/2012 | Campanella et al. |
| 2012/0112531 A1 | 5/2012 | Kesler et al. |
| 2012/0112532 A1 | 5/2012 | Kesler et al. |
| 2012/0112534 A1 | 5/2012 | Kesler et al. |
| 2012/0112535 A1 | 5/2012 | Karalis et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0119569 A1 | 5/2012 | Karalis et al. |
| 2012/0119575 A1 | 5/2012 | Kurs et al. |
| 2012/0119576 A1 | 5/2012 | Kesler et al. |
| 2012/0119698 A1 | 5/2012 | Karalis et al. |
| 2012/0139355 A1 | 6/2012 | Ganem et al. |
| 2012/0146575 A1 | 6/2012 | Armstrong et al. |
| 2012/0153732 A1 | 6/2012 | Kurs et al. |
| 2012/0153733 A1 | 6/2012 | Schatz et al. |
| 2012/0153734 A1 | 6/2012 | Kurs et al. |
| 2012/0153735 A1 | 6/2012 | Karalis et al. |
| 2012/0153736 A1 | 6/2012 | Karalis et al. |
| 2012/0153737 A1 | 6/2012 | Karalis et al. |
| 2012/0153738 A1 | 6/2012 | Karalis et al. |
| 2012/0153893 A1 | 6/2012 | Schatz et al. |
| 2012/0184338 A1 | 7/2012 | Kesler et al. |
| 2012/0206096 A1 | 8/2012 | John |
| 2012/0223573 A1 | 9/2012 | Schatz et al. |
| 2012/0228952 A1 | 9/2012 | Hall et al. |
| 2012/0228953 A1 | 9/2012 | Kesler et al. |
| 2012/0228954 A1 | 9/2012 | Kesler et al. |
| 2012/0235500 A1 | 9/2012 | Ganem et al. |
| 2012/0235501 A1 | 9/2012 | Kesler et al. |
| 2012/0235502 A1 | 9/2012 | Kesler et al. |
| 2012/0235503 A1 | 9/2012 | Kesler et al. |
| 2012/0235504 A1 | 9/2012 | Kesler et al. |
| 2012/0235505 A1 | 9/2012 | Schatz et al. |
| 2012/0235566 A1 | 9/2012 | Karalis et al. |
| 2012/0235567 A1 | 9/2012 | Karalis et al. |
| 2012/0235633 A1 | 9/2012 | Kesler et al. |
| 2012/0235634 A1 | 9/2012 | Hall et al. |
| 2012/0239117 A1 | 9/2012 | Kesler et al. |
| 2012/0242159 A1 | 9/2012 | Lou et al. |
| 2012/0242225 A1 | 9/2012 | Karalis et al. |
| 2012/0248884 A1 | 10/2012 | Karalis et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0256494 A1 | 10/2012 | Kesler et al. |
| 2012/0267960 A1 | 10/2012 | Low et al. |
| 2012/0280765 A1 | 11/2012 | Kurs et al. |
| 2012/0313449 A1 | 12/2012 | Kurs et al. |
| 2012/0313742 A1 | 12/2012 | Kurs et al. |
| 2013/0007949 A1 | 1/2013 | Kurs et al. |
| 2013/0020878 A1 | 1/2013 | Karalis et al. |
| 2013/0033118 A1 | 2/2013 | Karalis et al. |
| 2013/0038402 A1 | 2/2013 | Karalis et al. |
| 2013/0057364 A1 | 3/2013 | Kesler et al. |
| 2013/0062966 A1 | 3/2013 | Verghese et al. |
| 2013/0069441 A1 | 3/2013 | Verghese et al. |
| 2013/0069753 A1 | 3/2013 | Kurs et al. |
| 2013/0099587 A1 | 4/2013 | Lou et al. |
| 2013/0154383 A1 | 6/2013 | Kasturi et al. |
| 2013/0154389 A1 | 6/2013 | Kurs et al. |
| 2013/0159956 A1 | 6/2013 | Verghese et al. |
| 2013/0175874 A1 | 7/2013 | Lou et al. |
| 2013/0175875 A1 | 7/2013 | Kurs et al. |
| 2013/0200716 A1 | 8/2013 | Kesler et al. |
| 2013/0200721 A1 | 8/2013 | Kurs et al. |
| 2013/0221744 A1 | 8/2013 | Hall et al. |
| 2013/0278073 A1 | 10/2013 | Kurs et al. |
| 2013/0278074 A1 | 10/2013 | Kurs et al. |
| 2013/0278075 A1 | 10/2013 | Kurs et al. |
| 2013/0300353 A1 | 11/2013 | Kurs et al. |
| 2013/0307349 A1 | 11/2013 | Hall et al. |
| 2013/0320773 A1 | 12/2013 | Schatz et al. |
| 2013/0334892 A1 | 12/2013 | Hall et al. |
| 2014/0002012 A1* | 1/2014 | McCauley ............ H02J 7/025 320/108 |
| 2014/0070764 A1 | 3/2014 | Keeling |
| 2015/0222129 A1* | 8/2015 | McCauley ............ H02J 5/005 307/104 |
| 2015/0302984 A1* | 10/2015 | Kurs .................... H01F 38/14 307/104 |
| 2016/0005532 A1* | 1/2016 | Terayama ............ H01F 38/14 307/104 |

FOREIGN PATENT DOCUMENTS

| | | |
|---|---|---|
| CN | 102439669 | 5/2012 |
| CN | 103329397 | 9/2013 |
| DE | 38 24 972 | 1/1989 |
| DE | 100 29147 | 12/2001 |
| DE | 200 16 655 | 3/2002 |
| DE | 102 21 484 | 11/2003 |
| DE | 103 04 584 | 8/2004 |
| DE | 10 2005 036290 | 2/2007 |
| DE | 10 2006 044057 | 4/2008 |
| EP | 1 335 477 | 8/2003 |
| EP | 1 521 206 | 4/2005 |
| EP | 1 524 010 | 4/2005 |
| EP | 2 357 716 | 8/2011 |
| JP | 02-097005 | 4/1990 |
| JP | 4-265875 | 9/1992 |
| JP | 6-341410 | 12/1994 |
| JP | 9-182323 | 7/1997 |
| JP | 9-298847 | 11/1997 |
| JP | 10-164837 | 6/1998 |
| JP | 11-75329 | 3/1999 |
| JP | 11-188113 | 7/1999 |
| JP | 2001-309580 | 11/2001 |
| JP | 2002-010535 | 1/2002 |
| JP | 2003-179526 | 6/2003 |
| JP | 2004-166459 | 6/2004 |
| JP | 2004-201458 | 7/2004 |
| JP | 2004-229144 | 8/2004 |
| JP | 2005-57444 | 3/2005 |
| JP | 2005-149238 | 6/2005 |
| JP | 2006-074848 | 3/2006 |
| JP | 2007-505480 | 3/2007 |
| JP | 2007-266892 | 10/2007 |
| JP | 2007-537637 | 12/2007 |
| JP | 2008-508842 | 3/2008 |
| JP | 2008-206231 | 9/2008 |
| JP | 2008-206327 | 9/2008 |
| JP | 2011-072074 | 4/2011 |
| JP | 2012-504387 | 2/2012 |
| JP | 2013-543718 | 12/2013 |
| KR | 10-2007-0017804 | 2/2007 |
| KR | 10-2008-0007635 | 1/2008 |
| KR | 10-2009-0122072 | 11/2009 |
| KR | 10-2011-0050920 | 5/2011 |
| SG | 112842 | 7/2005 |
| WO | WO 92/17929 | 10/1992 |
| WO | WO 93/23908 | 11/1993 |
| WO | WO 94/28560 | 12/1994 |
| WO | WO 95/11545 | 4/1995 |
| WO | WO 96/02970 | 2/1996 |
| WO | WO 98/50993 | 11/1998 |
| WO | WO 00/77910 | 12/2000 |
| WO | WO 03/092329 | 11/2003 |
| WO | WO 03/096361 | 11/2003 |
| WO | WO 03/096512 | 11/2003 |
| WO | WO 2004/015885 | 2/2004 |
| WO | WO 2004/038888 | 5/2004 |
| WO | WO 2004/055654 | 7/2004 |
| WO | WO 2004/073150 | 8/2004 |
| WO | WO 2004/073166 | 8/2004 |
| WO | WO 2004/073176 | 8/2004 |

(56) References Cited

FOREIGN PATENT DOCUMENTS

| WO | WO 2004/073177 | 8/2004 |
|---|---|---|
| WO | WO 2004/112216 | 12/2004 |
| WO | WO 2005/024865 | 3/2005 |
| WO | WO 2005/060068 | 6/2005 |
| WO | WO 2005/109597 | 11/2005 |
| WO | WO 2005/109598 | 11/2005 |
| WO | WO 2006/011769 | 2/2006 |
| WO | WO 2007/008646 | 1/2007 |
| WO | WO 2007/020583 | 2/2007 |
| WO | WO 2007/042952 | 4/2007 |
| WO | WO 2007/084716 | 7/2007 |
| WO | WO 2007/084717 | 7/2007 |
| WO | WO 2008/109489 | 9/2008 |
| WO | WO 2008/118178 | 10/2008 |
| WO | WO 2009/009559 | 1/2009 |
| WO | WO 2009/018568 | 2/2009 |
| WO | WO 2009/023155 | 2/2009 |
| WO | WO 2009/023646 | 2/2009 |
| WO | WO 2009/033043 | 3/2009 |
| WO | WO 2009/062438 | 5/2009 |
| WO | WO 2009/070730 | 6/2009 |
| WO | WO 2009/126963 | 10/2009 |
| WO | WO 2009/140506 | 11/2009 |
| WO | WO 2009/149464 | 12/2009 |
| WO | WO 2009/155000 | 12/2009 |
| WO | WO 2010/030977 | 3/2010 |
| WO | WO 2010/036980 | 4/2010 |
| WO | WO 2010/039967 | 4/2010 |
| WO | WO 2010/090538 | 8/2010 |
| WO | WO 2010/090539 | 8/2010 |
| WO | WO 2010/093997 | 8/2010 |
| WO | WO 2010/104569 | 9/2010 |
| WO | WO 2011/061388 | 5/2011 |
| WO | WO 2011/061821 | 5/2011 |
| WO | WO 2011/062827 | 5/2011 |
| WO | WO 2011/112795 | 9/2011 |
| WO | WO 2012/037279 | 3/2012 |
| WO | WO 2012/170278 | 12/2012 |
| WO | WO 2013/013235 | 1/2013 |
| WO | WO 2013/020138 | 2/2013 |
| WO | WO 2013/036947 | 3/2013 |
| WO | WO 2013/059441 | 4/2013 |
| WO | WO 2013/067484 | 5/2013 |
| WO | WO 2013/113017 | 8/2013 |
| WO | WO 2013/142840 | 9/2013 |
| WO | WO 2014/004843 | 1/2014 |

OTHER PUBLICATIONS

"Physics Update, Unwired Energy", *Physics Today*, pp. 26, (Jan. 2007) (See http://arxiv.org/abs/physics/0611063.).
"In pictures: a year in technology", *BBC News*, (Dec. 28, 2007).
"Next Little Thing 2010 Electricity without wires", CNN Money (See money.cnn.com/galleries/2009/smallbusiness/0911/gallery.next_little_thing_2010.smb/) (dated Nov. 30, 2009).
Abe et al. "A Noncontact Charger Using a Resonant Converter with Parallel Capacitor of the Secondary Coil". IEEE, 36(2):444-451, Mar./Apr. 2000.
Ahmadian, M. et al., "Miniature Transmitter for Implantable Micro Systems", *Proceedings of the 25th Annual International Conference of the IEEE EMBS Cancun, Mexico*, pp. 3028-3031 (Sep. 17-21, 2003).
Aoki, T. et al., "Observation of strong coupling between one atom and a monolithic microresonator", Nature, vol. 443:671-674 (2006).
Apneseth et al. "Introducing wireless proximity switches" ABB Review Apr. 2002.
Aristeidis Karalis et al., "Efficient Wireless non-radiative mid-range energy transfer", *Annals of Physics*, vol. 323, pp. 34-48 (2008).
Baker et al., "Feedback Analysis and Design of RF Power Links for Low-Power Bionic Systems," *IEEE Transactions on Biomedical Circuits and Systems*, vol. 1(1):28-38 (Mar. 2007).
Balanis, C.A., "Antenna Theory: Analysis and Design," 3rd Edition, Sections 4.2, 4.3, 5.2, 5.3 (Wiley, New Jersey, 2005).

Berardelli, P., "Outlets Are Out", ScienceNOW Daily News, Science Now, http://sciencenow.sciencemag.org/cgi/content/full/2006/1114/2, (Nov. 14, 2006) 2 pages.
Biever, C., "Evanescent coupling could power gadgets wirelessly", NewScientistsTech.com, http://www.newscientisttech.com/article.ns?id=dn1 0575&print=true, (Nov. 15, 2006) 2 pages.
Borenstein, S., "Man tries wirelessly boosting batteries", (The Associated Press), USA Today, (Nov. 16, 2006) 1 page.
Borenstein, S., "Man tries wirelessly boosting batteries", AP Science Writer, Boston.com, (See http://www.boston.com/business/technology/articles/2006/11/15/man_tries_wirelessly_b . . . ) (Nov. 15, 2006).
Boyle, A., "Electro-nirvana? Not so fast", MSNBC, http:/lcosmiclog.msnbc.msn.com/_news/2007/06/08/4350760- electro-nirvana-not-so-fast, (Jun. 8, 2007) 1 page.
Budhia, M. et al., "A New IPT Magnetic Coupler for Electric Vehicle Charging Systems", IECON 2010—36th Annual Conference on IEEE Industrial Electronics Society, Glendale, AZ, pp. 2487-2492 (Nov. 7-10, 2010).
Budhia, M. et al., "Development and evaluation of single sided flux couplers for contactless electric vehicle charging", 2011 IEEE Energy Conversion Congress and Exposition (ECCE), Phoenix, AZ, pp. 614-621 (Sep. 17-22, 2011).
Budhia, M. et al.,"Development of a Single-Sided Flux Magnetic Coupler for Electric Vehicle IPT", IEEE Transactions on Industrial Electronics, vol. 60:318-328 (Jan. 2013).
Bulkeley, W. M., "MIT Scientists Pave the Way for Wireless Battery Charging", The Wall Street Journal (See http://online.wsj.com/article/SB118123955549228045.html?mod=googlenews_wsj), (Jun. 8, 2007) 2 pages.
Burri et al., "Invention Description", (Feb. 5, 2008).
Cass, S., "Air Power—Wireless data connections are common—now scientists are working on wireless power", Sponsored by IEEE Spectrum, http://spectrum.ieee.org/computing/hardware/air-power, (Nov. 2006) 2 pages.
Castelvecchi, Davide, "The Power of Induction—Cutting the last cord could resonate with our increasingly gadget dependent lives", *Science News Online*, vol. 172, No. 3, Jul. 21, 2007, 6 pages.
Chang, a., "Recharging the Wireless Way—Even physicists forget to recharge their cell phones sometimes.", PC Magazine, ABC News Internet Ventures, (Dec. 12, 2006) 1 page.
Chinaview, , "Scientists light bulb with 'wireless electricity'",www.Chinaview.cn, http://news.xinhuanet.com/english/2007-06/08/content_6215681.htm,Jun. 2007,1 page.
Cooks, G., "The vision of an MIT physicist: Getting rid of pesky rechargers", Boston.com, (Dec. 11, 2006) 1 page.
Derbyshire, D., "The end of the plug? Scientists invent wireless device that beams electricity through your home", Daily Mail, http://www.dailymail.co.uk/pages/live/articles/technology/technology.html?in_article_id=4 . . . ), (Jun. 7, 2007) 3 pages.
Eisenberg, Anne, "Automatic Recharging, From a Distance", The New York Times, (see www.nytimes.com/2012/03/11/business/built-in-wireless-chargeing-for-electronic-devices.html?_r=0) (published on Mar. 10, 2012).
Esser et al., "A New Approach to Power Supplies for Robots", IEEE, vol. 27(5):872-875, (Sep./Oct. 1991).
Fan, Shanhui et al., "Rate-Equation Analysis of Output Efficiency and Modulation Rate of Photomic-Crystal Light-Emitting Diodes", IEEE Journal of Quantum Electronics, vol. 36(10):1123-1130 (Oct. 2000).
Fenske et al., "Dielectric Materials at Microwave Frequencies", Applied Microwave & Wireless, pp. 92-100 (2000).
Fernandez, C. et al., "A simple dc-dc converter for the power supply of a cochlear implant", *IEEE*, pp. 1965-1970 (2003).
Ferris, David, "How Wireless Charging Will Make Life Simpler (and Greener)", Forbes (See forbes.com/site s/davidferris/2012/07/24/how-wireless-charging-will-make-life-simpler-and-greener/print/) (dated Jul. 24, 2012).
Fildes, J., "Physics Promises Wireless Power", (Science and Technology Reporter), BBC News, (Nov. 15, 2006) 3 pages.
Fildes, J., "The technology with impact 2007", BBC News, (Dec. 27, 2007) 3 pages.

(56) References Cited

OTHER PUBLICATIONS

Fildes, J., "Wireless energy promise powers up", BBC News, http://news.bbc.co.uk/2/hi/technology/6725955.stm, (Jun. 7, 2007) 3 pages.
Finkenzeller, Klaus, "RFID Handbook—Fundamentals and Applications in Contactless Smart Cards", Nikkan Kohgyo-sya, Kanno Taihei, first version, pp. 32-37, 253 (Aug. 21, 2001).
Finkenzeller, Klaus, "RFID Handbook (2nd Edition)", The Nikkan Kogyo Shimbun, Ltd., pp. 19, 20, 38, 39, 43, 44, 62, 63, 67, 68, 87, 88, 291, 292 (Published on May 31, 2004).
Freedman, D.H., "Power on a Chip", MIT Technology Review, (Nov. 2004).
Gary Peterson, "MIT WiTricity Not So Original After All", *Feed Line No. 9*, (See.http://www.tfcbooks.com/articles/witricity.htm) printed Nov. 12, 2009.
Geyi, Wen, "A Method for the Evaluation of Small Antenna Q", IEEE Transactions on Antennas and Propagation, vol. 51(8):2124-2129 (Aug. 2003).
Hadley, F., "Goodbye Wires—MIT Team Experimentally Demonstrates Wireless Power Transfer, Potentially Useful for Power Laptops, Cell-Phones Without Cords", Massachusetts Institute of Technology, Institute for Soldier D Nanotechnologies, http://web.mit.edu/newsoffice/2007/wireless-0607.html, (Jun. 7, 2007) 3 pages.
Haus, H.A., "Waves and Fields in Optoelectronics," Chapter 7 "Coupling of Modes—Reasonators and Couplers" (Prentice-Hall, New Jersey, 1984).
Heikkinen et al., "Performance and Efficiency of Planar Rectennas for Short-Range Wireless Power Transfer at 2.45 GHz", Microwave and Optical Technology Letters, vol. 31(2):86-91, (Oct. 20, 2001).
Highfield, R., "Wireless revolution could spell end of plugs-",(Science Editor), Telegraph.co.uk, http://www. telegraph.co.uk/news/main.jhtml?xml=/news/2007/06/07/nwireless1 07.xml, (Jun. 7, 2007) 3 pages.
Hirai et al., "Integral Motor with Driver and Wireless Transmission of Power and Information for Autonomous Subspindle Drive", IEEE, vol. 15(1):13-20, (Jan. 2000).
Hirai et al., "Practical Study on Wireless Transmission of Power and Infaimation for Autonomous Decentralized Manufacturing System", IEEE, vol. 46(2):349-359, Apr. 1999.
Hirai et al., "Study on Intelligent Battery Charging Using Inductive Transmission of Power and Information", IEEE, vol. 15(2):335-345, (Mar. 2000).
Hirai et al., "Wireless Transmission of Power and Information and Information for Cableless Linear Motor Drive", IEEE, vol. 15(1):21-27, (Jan. 2000).
Hirayama, M., "Splashpower—World Leaders in Wireless Power", PowerPoint presentation, Splashpower Japan, (Sep. 3, 2007) 30 pages.
Ho, S. L. et al., "A Comparative Study Between Novel Witricity and Traditional Inductive Magnetic Coupling in Wireless Charging", IEEE Transactions on Magnetics, vol. 47(5):1522-1525 (May 2011).
Infotech Online, "Recharging gadgets without cables", infotech.indiatimes.com, (Nov. 17, 2006) 1 page.
Jackson, J. D., "Classical Electrodynamics", 3rd Edition, Wiley, New York, 1999, pp. 201-203.
Jackson, J.D., "Classical Electrodynamics," 3rd Edition, Sections 1.11, 5.5, 5.17, 6.9, 8.1, 8.8, 9.2, 9.3 (Wiley, New York, 1999).
Jacob, M. V. et al., "Lithium Tantalate—A High Peimittivity Dielectric Material for Microwave Communication Systems", *Proceedings of IEEE TENCON—Poster Papers*, pp. 1362-1366, 2003.
Karalis, Aristeidis, "Electricity Unplugged", Feature: Wireless Energy Physics World, physicsworld.com, pp. 23-25 (Feb. 2009).
Kawamura et al., "Wireless Transmission of Power and Information Through One High-Frequency Resonant AC Link Inverter for Robot Manipulator Applications", IEEE, vol. 32(3):503-508, (May/Jun. 1996).
Kurs, A. et al., "Wireless Power Transfer via Strongly Coupled Magnetic Resonances", *Science* vol. 317, pp. 83-86 (Jul. 6, 2007).

Kurs, A. et al., "Simultaneous mid-range power transfer to multiple devices", *Applied Physics Letters*, vol. 96, No. 044102 (2010).
Kurs, A. et al.,"Optimized design of a low-resistance electrical conductor for the multimegahertz range", *Applied Physics Letters*, vol. 98:172504-172504-3 (Apr. 2011).
Lamb, Gregory M. ,"Look Ma—no wires!—Electricity broadcast through the air may someday run your home",The Christian Science Monitor,http://www.csmonitor.com/2006/1116/p14s01-stct.html,Nov. 15, 2006,2 pages.
Lee, "Antenna Circuit Design for RFID Applications," Microchip Technology Inc., AN710, 50 pages (2003).
Lee, "RFID Coil Design," Microchip Technology Inc., AN678, 21 pages (1998).
Liang et al., "Silicon waveguide two-photon absorption detector at 1.5 µm wavelength for autocorrelation measurements," Applied Physics Letters, 81(7):1323-1325 (Aug. 12, 2002).
Markoff, J. ,"Intel Moves to Free Gadgets of Their Recharging Cords", The New York Times—nytimes.com, Aug. 21, 2008, 2 pages.
Mediano, A. et al. "Design of class E amplifier with nonlinear and linear shunt capacitances for any duty cycle", IEEE Trans. Microwave Theor. Tech., vol. 55, No. 3, pp. 484-492, (2007).
Microchip Technology Inc., "microID 13.56 MHz Design Guide—MCRF355/360 Reader Reference Design," 24 pages (2001).
Minkel, J R. ,"Wireless Energy Lights Bulb from Seven Feet Away—Physicists vow to cut the cord between your laptop battery and the wall socket—with just a simple loop of wire",Scientific American,http://www.scientificamerican.com/article.cfm?id=wireless-energy-lights-bulb-from-seven-feet-away,Jun. 7, 2007,1 page.
Minkel, J R. ,"Wireless Energy Transfer May Power Devices at a Distance",Scientific American,Nov. 14, 2006,1 page.
Morgan, J., "Lab report: Pull the plug for a positive charge", The Herald, Web Issue 2680, (Nov. 16, 2006) 3 pages.
Moskvitch, Katia, "Wireless charging—The future for electric cars?", BBC News Technology (See www.bbc.co.uk/news/technology-14183409) (dated Jul. 21, 2011).
O'Brien et al., "Analysis of Wireless Power Supplies for Industrial Automation Systems", IEEE, pp. 367-372 (Nov. 2-6, 2003).
O'Brien et al., "Design of Large Air-Gap Transformers for Wireless Power Supplies", IEEE, pp. 1557-1562 (Jun. 15-19, 2003).
Pendry, J. B., "A Chiral Route to Negative Refraction", Science, vol. 306:1353-1355 (2004).
Physics Today, "Unwired energy questions asked answered", Sep. 2007, pp. 16-17.
Powercast LLC. "White Paper" Powercast simply wire free, 2003.
PR News Wire, "The Big Story for CES 2007: The public debut of eCoupled Intelligent Wireless Power", Press Release, Fulton Innovation LLC, Las Vegas, NV, (Dec. 27, 2006) 3 pages.
Press Release, "The world's first sheet-type wireless power transmission system: Will a socket be replaced by e-wall?",Public Relations Office, School of Engineering, University of Tokyo, Japan,Dec. 12, 2006,4 pages.
PRESSTV, "Wireless power transfer possible", http://edition.presstv.ir/detail/12754.html, Jun. 11, 2007, 1 page.
Reidy, C. (Globe Staff), "MIT discovery could unplug your iPod forever", Boston.com, http://www.boston.com/ business/ticker/2007/06/mit_discovery_c.html, (Jun. 7, 2007) 3 pages.
Risen, C., "Wireless Energy", The New York Times, (Dec. 9, 2007) 1 page.
Sakamoto et al., "A Novel Circuit for Non-Contact Charging Through Electro-Magnetic Coupling", IEEE, pp. 168-174 (1992).
Scheible, G. et al., "Novel Wireless Power Supply System for Wireless Communication Devices in Industrial Automation Systems", IEEE, pp. 1358-1363, (Nov. 5-8, 2002).
Schneider, D. "A Critical Look at Wireless Power", *IEEE Spectrum*, pp. 35-39 (May 2010).
Schneider, David, "Electrons Unplugged. Wireless power at a distance is still far away", *IEEE Spectrum*, pp. 35-39 (May 2010).
Schuder, J. C. et al., "An Inductively Coupled RF System for the Transmission of 1 kW of Power Through the Skin", *IEEE Transactions on Bio-Medical Engineering*, vol. BME-18, No. 4, pp. 265-273 (Jul. 1971).

(56) References Cited

OTHER PUBLICATIONS

Schuder, J. C., "Powering an Artificial Heart: Birth of the Inductively Coupled-Radio Frequency System in 1960", *Artificial Organs*, vol. 26:909-915 (2002).
Schuder, J.C. et al., "Energy Transport Into the Closed Chest From a Set of Very-Large Mutually Orthogonal Coils", Communication Electronics, vol. 64:527-534 (Jan. 1963).
Schutz, J. et al., "Load Adaptive Medium Frequency Resonant Power Supply", IEEE, pp. 282-287 (Nov. 2002).
Sekitani et al. "A large-area wireless power-transmission sheet using printed organic transistors and plastic MEMS switches" www.nature.com/naturematerials. Published online Apr. 29, 2007.
Sekitani et al., "A large-area flexible wireless power transmission sheet using printed plastic MEMS switches and organic field-effect transistors", IEDM '06, International Electron Devices Meeting, (Dec. 11-13, 2006) 4 pages.
Sekiya, H. et al., "FM/PWM control scheme in class DE inverter", IEEE Trans. Circuits Syst. I, vol. 51(7) (Jul. 2004).
Senge, M., "MIT's wireless electricity for mobile phones", Vanguard, http://www.vanguardngr.com/articles/2002/features/gsm/gsm211062007.htm, (Jun. 11, 2007) 1 page.
Sensiper, S., "Electromagnetic wave propogation on helical conductors", Technical Report No. 194 (based on PhD Thesis), Massachusetts Institute of Technology, (May 16, 1951) 126 pages.
Soljacic, M. , "Wireless Non-Radiative Energy Transfer—PowerPoint presentation". Massachusetts Institute of Technology, (Oct. 6, 2005).
Soljacic, M. et al., "Wireless Energy Transfer Can Potentially Recharge Laptops Cell Phones Without Cords", (Nov. 14, 2006) 3 pages.
Soljacic, M. et al., "Photonic-crystal slow-light enhancement of nonlinear phase sensitivity", *J. Opt. Soc. Am B*, vol. 19, No. 9, pp. 2052-2059 (Sep. 2002).
Soljacic, M., "Wireless nonradiative energy transfer", *Visions of Discovery New Light on Physics, Cosmology, and Consciousness*, Cambridge University Press, New York, NY pp. 530-542 (2011).
Someya, Takao. "The world's first sheet-type wireless power transmission system". University of Tokyo, (Dec. 12, 2006).
Staelin, David H. et al., Electromagnetic Waves, Chapters 2, 3, 4, and 8, pp. 46-176 and 336-405 (Prentice Hall Upper Saddle River, New Jersey 1998).
Stark III, Joseph C., "Wireless Power Transmission Utilizing a Phased Array of Tesla Coils", Master Thesis, Massachusetts Institute of Technology (2004).
Stewart, W., "The Power to Set you Free", Science, vol. 317:55-56 (Jul. 6, 2007).
Tang, S.C. et al., "Evaluation of the Shielding Effects on Printed-Circuit-Board Transformers Using Ferrite Plates and Copper Sheets", *IEEE Transactions on Power Electronics*, vol. 17:1080-1088 (Nov. 2002).
Tesla, Nikola, "High Frequency Oscillators for Electro-Therapeutic and Other Purposes", *Proceedings of the IEEE*, vol. 87:1282-1292 (Jul. 1999).
Tesla, Nikola, "High Frequency Oscillators for Electro-Therapeutic and Other Purposes", *The Electrical Engineer*, vol. XXVI, No. 50 (Nov. 17, 1898).
Texas Instruments, "HF Antenna Design Notes—Technical Application Report," Literature No. 11-08-26-003, 47 pages (Sep. 2003).
Thomsen et al., "Ultrahigh speed all-optical demultiplexing based on two-photon absorption in a laser diode," Electronics Letters, 34(19):1871-1872 (Sep. 17, 1998).
UPM Rafsec, "Tutorial overview of inductively coupled RFID Systems," 7 pages (May 2003).
Valtchev et al. "Efficient Resonant Inductive Coupling Energy Transfer Using New Magnetic and Design Criteria". IEEE, pp. 1293-1298, 2005.
Vandevoorde et al., "Wireless energy transfer for stand-alone systems: a comparison between low and high power applicability", Sensors and Actuators, vol. 92:305-311 (2001).
Vilkomerson, David et al., "Implantable Doppler System for Self-Monitoring Vascular Grafts", *IEEE Ultrasonics Symposium*, pp. 461-465 (2004).
Villeneuve, Pierre R. et al., "Microcavities in photonic crystals: Mode symmetry, tunability, and coupling efficiency", *Physical Review B*, vol. 54:7837-7842 (Sep. 15, 1996).
Yariv, Amnon et al., "Coupled-resonator optical waveguide: a proposal and analysis", *Optics Letters*, vol. 24(11):711-713 (Jun. 1, 1999).
Yates, David C. et al., "Optimal Transmission Frequency for Ultralow-Power Short-Range Radio Links", IEEE Transactions on Circuits and Systems—1, Regular Papers, vol. 51:1405-1413 (Jul. 2004).
Yoshihiro Konishi, *Microwave Electronic Circuit Technology*, Chapter 4, pp. 145-197 (Marcel Dekker, Inc., New York, NY 1998).
Ziaie, Babak et al., "A Low-Power Miniature Transmitter Using a Low-Loss Silicon Platform for Biotelemetry", *Proceedings—19th International Conference IEEE/EMBS*, pp. 2221-2224, Oct. 30-Nov. 2, 1997) 4 pages.
Zierhofer, Clemens M. et al., "High-Efficiency Coupling—Insensitive Transcutaneous Power and Data Transmission Via an Inductive Link", *IEEE Transactions on Biomedical Engineering*, vol. 37, No. 7, pp. 716-722 (Jul. 1990).

* cited by examiner

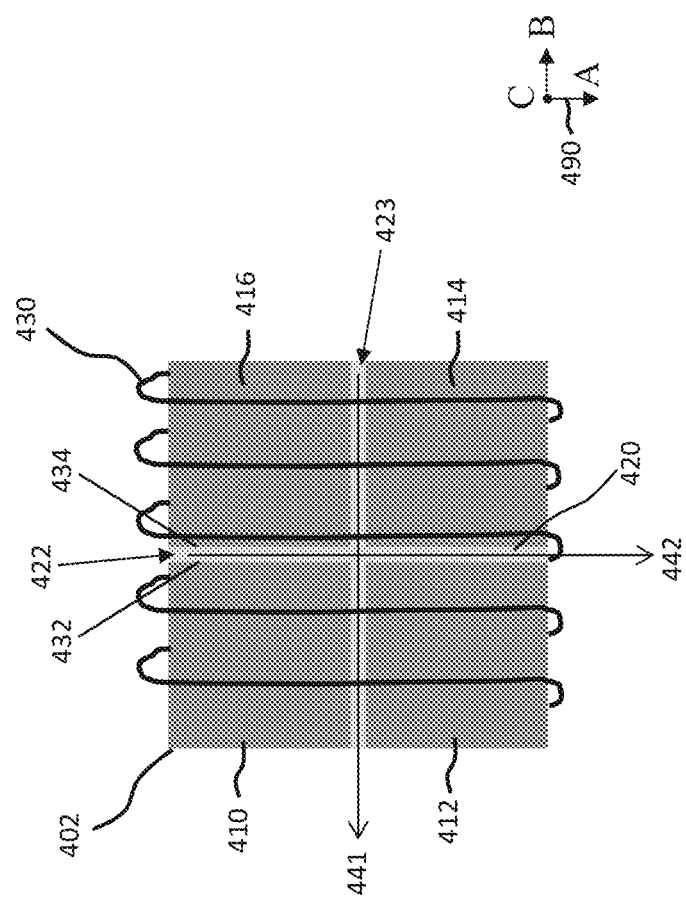

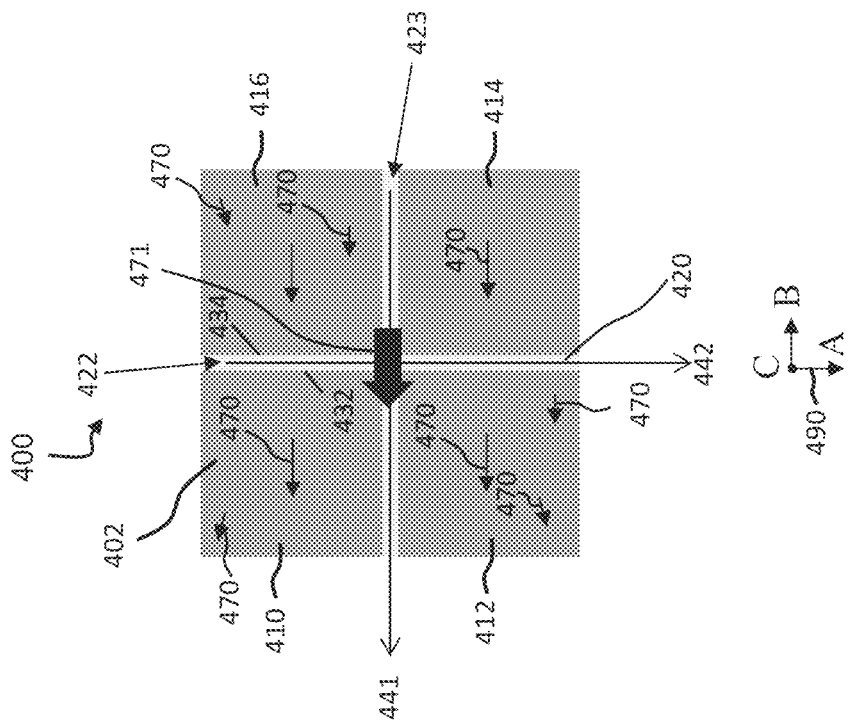
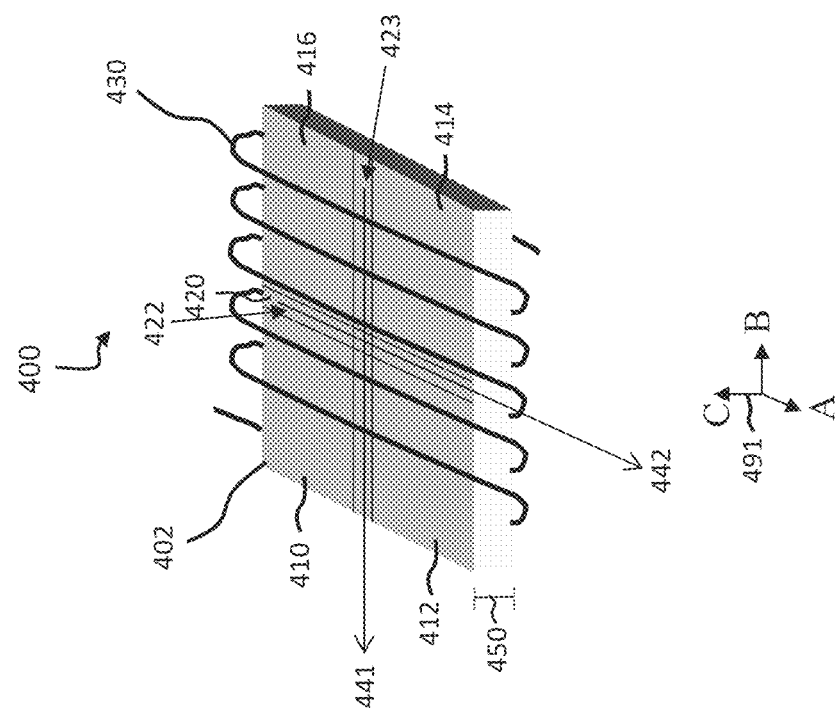

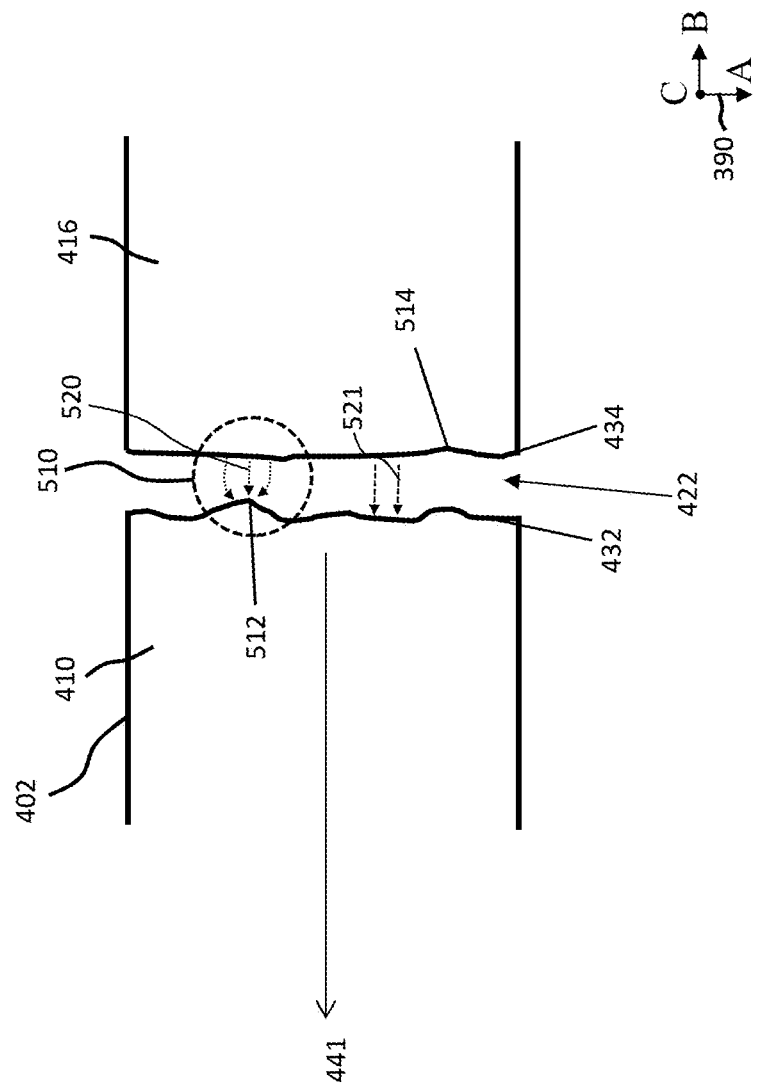

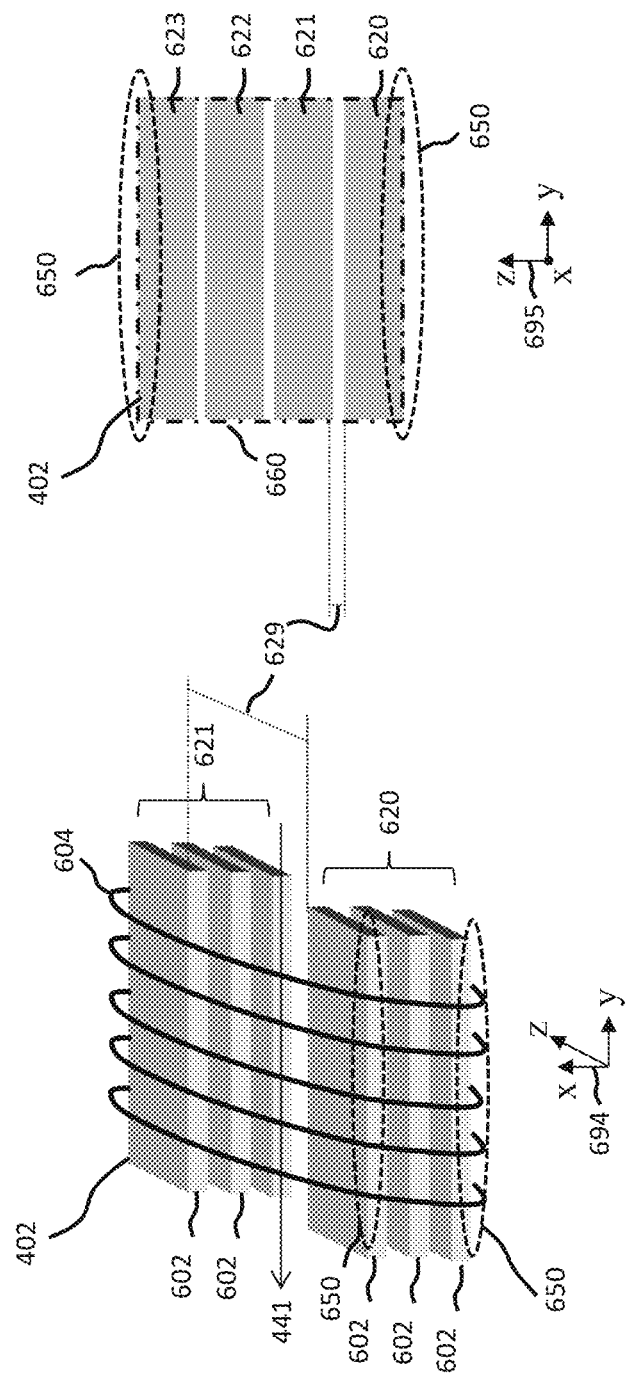

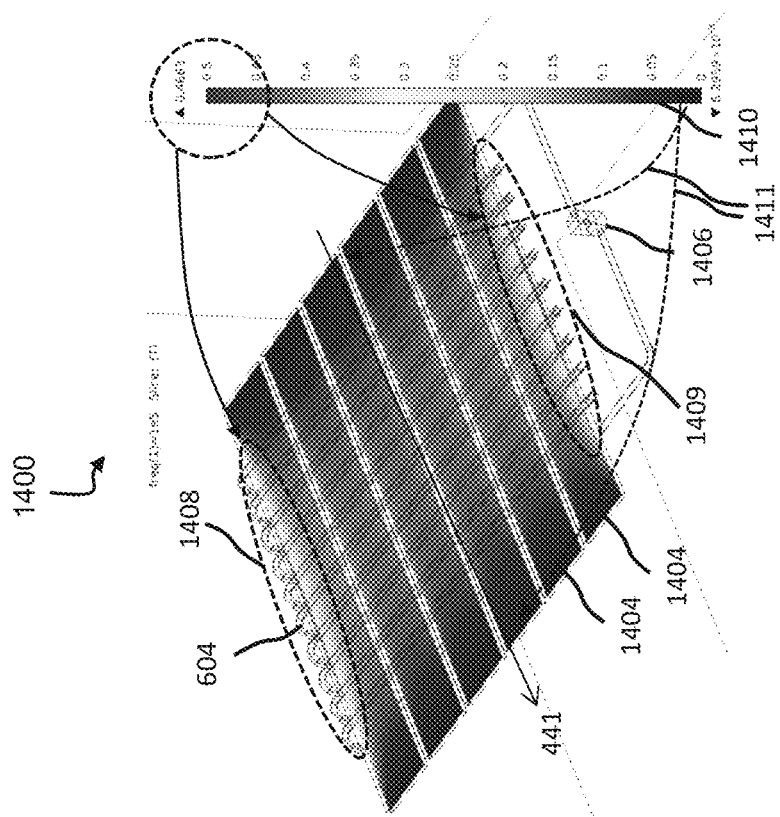

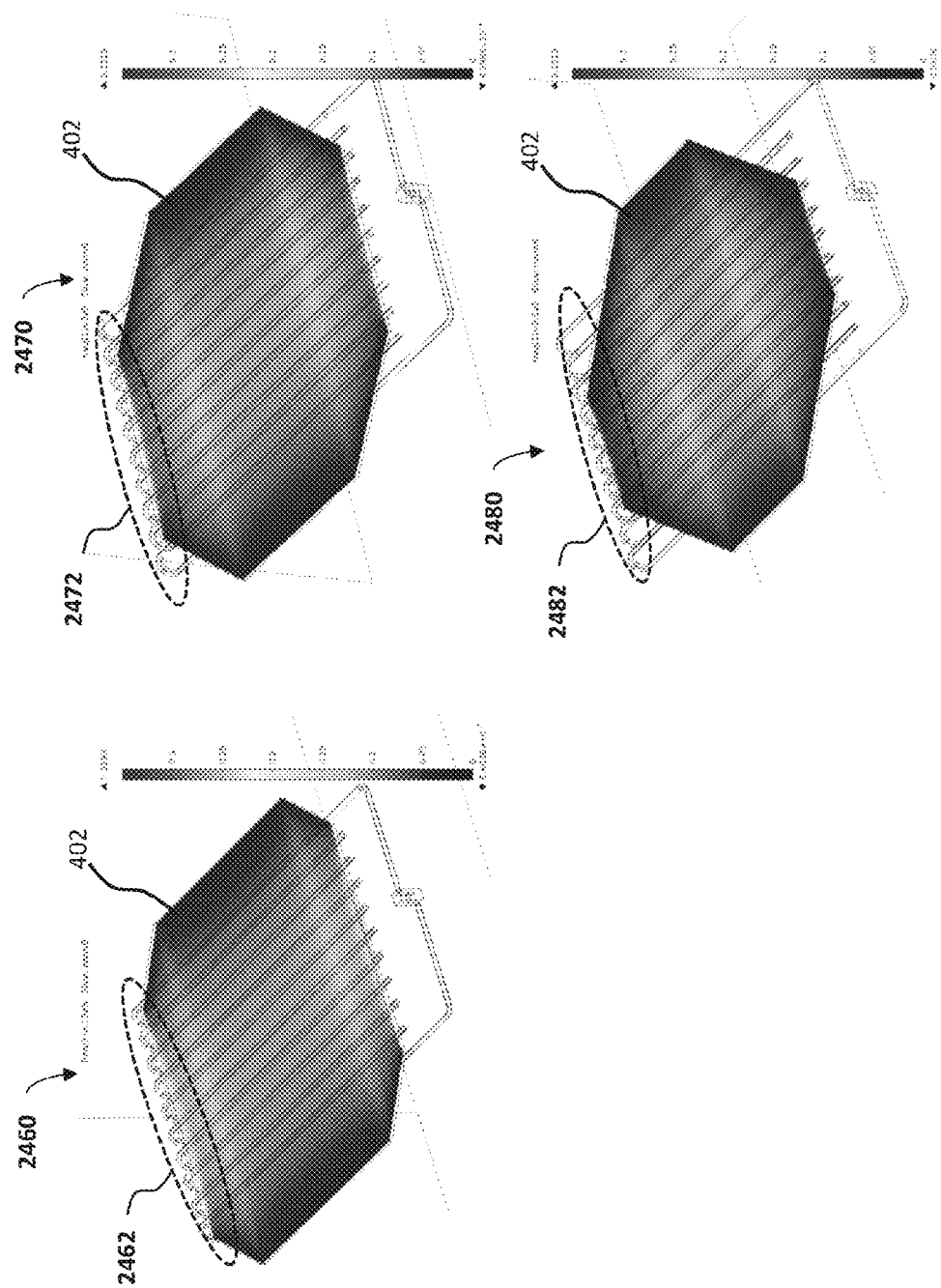

FIG. 8B
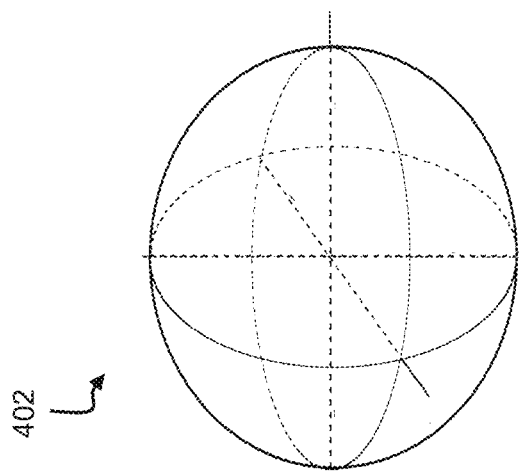
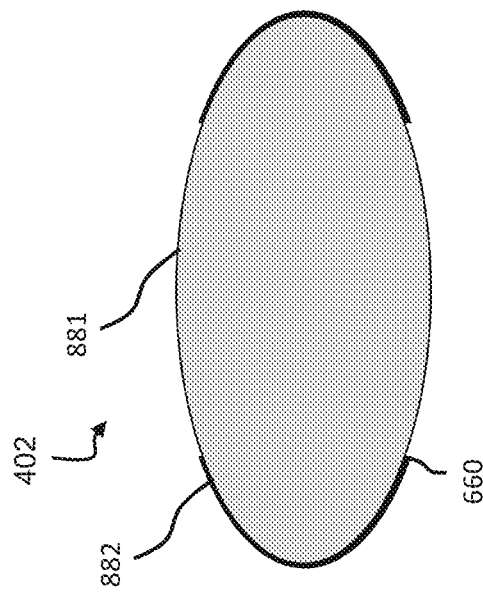

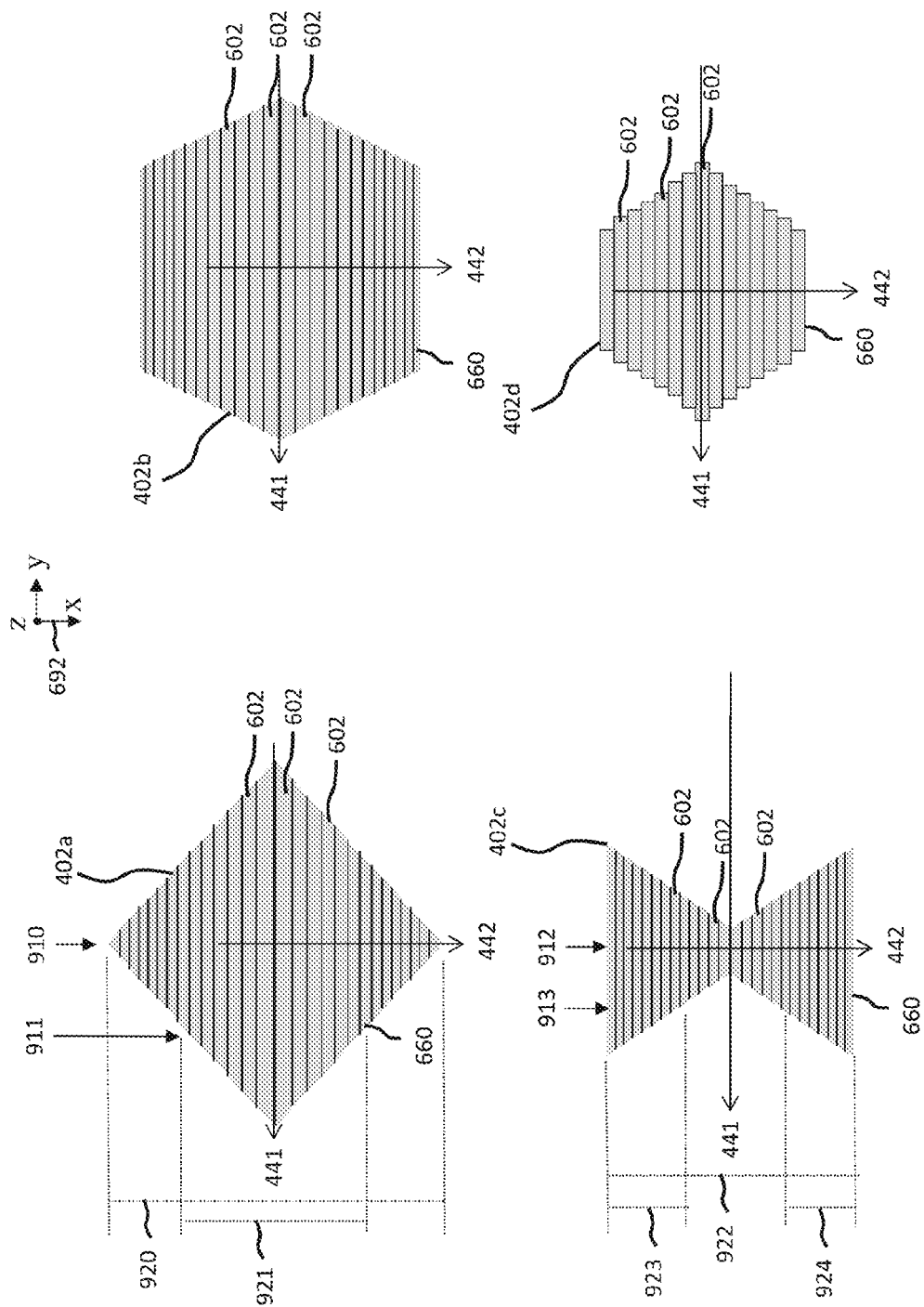

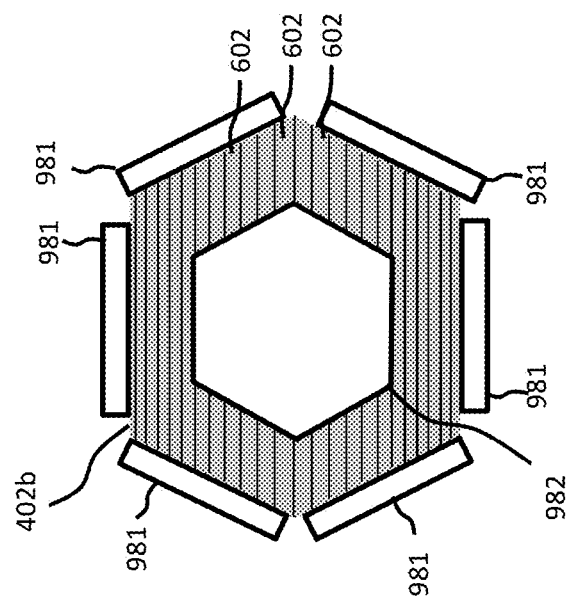
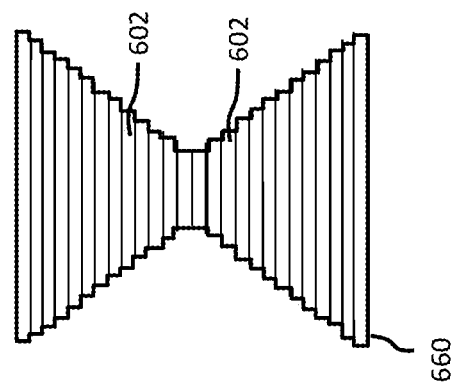
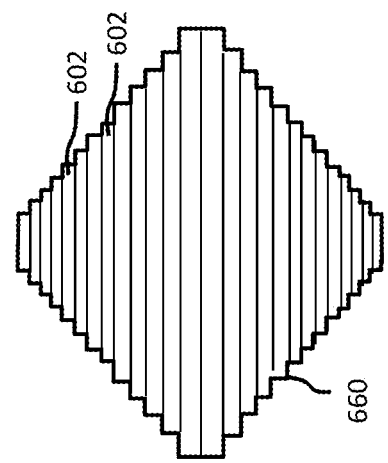

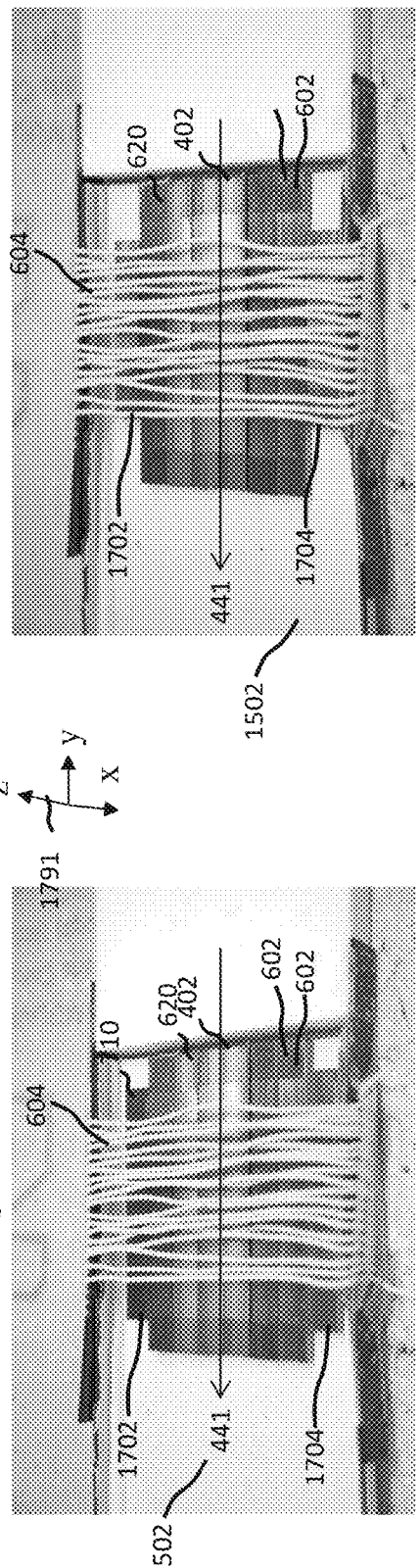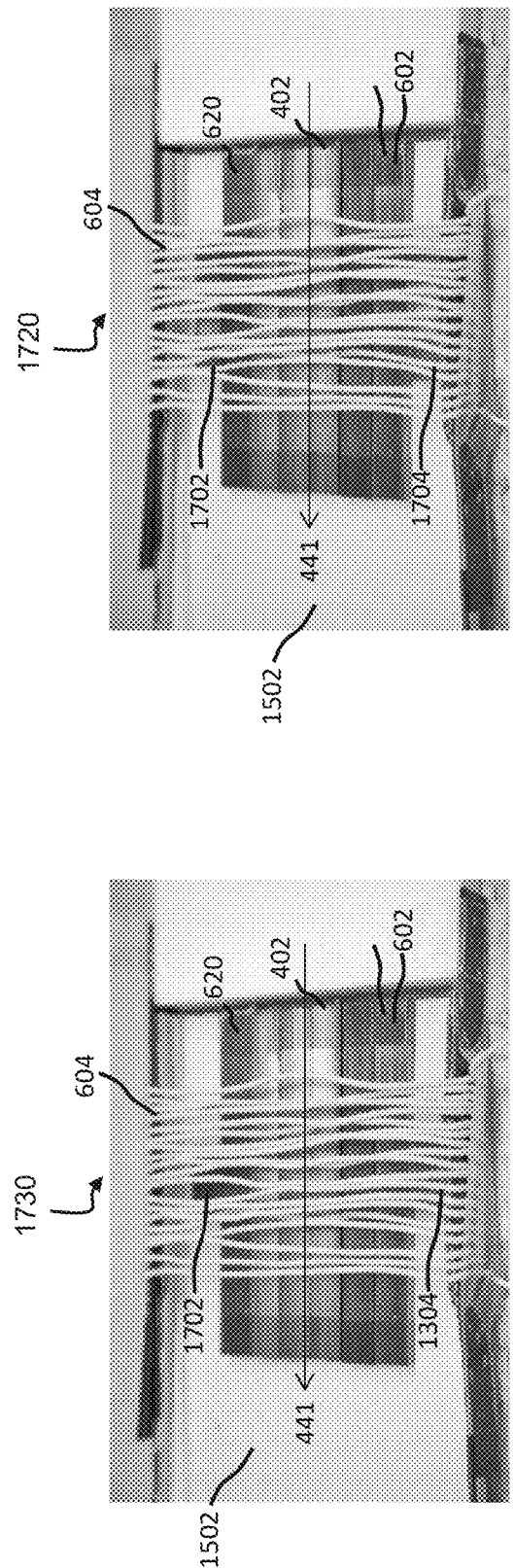
FIG. 17

WIRELESS POWER TRANSFER SYSTEMS WITH SHAPED MAGNETIC COMPONENTS

CROSS-REFERENCE TO RELATED APPLICATIONS

This application claims priority under 35 U.S.C. §120 to U.S. Provisional Patent Application No. 61/980,711, filed on Apr. 17, 2014, the entire contents of which are incorporated herein by reference.

TECHNICAL FIELD

This disclosure relates to wireless power transfer systems and methods.

BACKGROUND

Energy can be transferred from a power source to a receiving device using a variety of known techniques such as radiative (far-field) techniques. For example, radiative techniques using low-directionality antennas can transfer a small portion of the supplied radiated power, namely, that portion in the direction of, and overlapping with, the receiving device used for pick up. In such methods, much—even most—of the energy is radiated away in directions other than the direction of the receiving device, and typically the transferred energy is insufficient to power or charge the receiving device. In another example of radiative techniques, directional antennas are used to confine and preferentially direct the radiated energy towards the receiving device. In this case, an uninterruptible line-of-sight and potentially complicated tracking and steering mechanisms are used.

Another approach to energy transfer is to use non-radiative (near-field) techniques. For example, techniques known as traditional induction schemes do not (intentionally) radiate power, but use an oscillating current passing through a primary coil, to generate an oscillating magnetic near-field that induces currents in a nearby receiving or secondary coil. Traditional induction schemes can transfer modest to large amounts of power over very short distances. In these schemes, the offset tolerances between the power source and the receiving device are very small. Electric transformers and proximity chargers, for example, typically use traditional induction schemes.

SUMMARY

This disclosure is related to wireless transfer of power from a power transmitting apparatus to a power receiving apparatus.

In a first aspect, the disclosure features apparatuses for wireless power transfer, the apparatuses including a coil formed of a conductive material. The coil includes a plurality of loops, where the plurality of loops defines an internal region of the coil that extends along a coil axis. The apparatuses includes a magnetic component, where the magnetic component is disposed in the internal region and extends in a first direction parallel to the coil axis and in a second direction perpendicular to the coil axis. A maximum dimension of the magnetic component measured in the second direction varies along the first direction.

Embodiments of the apparatuses can include any one or more of the following features.

The magnetic component can have an anisotropic magnetic permeability.

A plurality of magnetic elements can be joined to form the magnetic component, where the plurality of magnetic elements can be positioned in a row that extends in a direction parallel to the second direction. During operation of the apparatuses an average magnetic field generated by the coil at a given time in the magnetic component can be oriented along a direction different from the second direction.

An edge of the magnetic component can have a stepped profile. Each of the each of the edges of the magnetic component can have a stepped profile.

An edge of the magnetic component has a smooth profile. Each of the edges of the magnetic component can have a smooth profile. An edge of the magnetic component can have a smooth linear profile. Each of the edges of the magnetic component can have a smooth linear profile. An edge of the magnetic component can have a smooth curved profile. Each of the edges of the magnetic component can have a smooth curved profile.

The magnetic component can have an oval shape. The magnetic component can have a square shape. The magnetic component can have a hexagonal shape. The magnetic component can have a bowtie shape.

Each of the plurality of loops can have the same diameter.

The plurality of loops can have different diameters. The diameters of the plurality of loops can vary based on positions of each of the loops relative to edges of the magnetic component. The plurality of loops can have diameters that conform to a shape of the magnetic component.

The average magnetic field generated by the coil at the given time in the magnetic component can be oriented in a direction parallel to the first direction. Each one of the plurality of magnetic elements can have a length measured in a direction parallel to the first direction, and at least two magnetic elements can have different lengths.

The magnetic elements can be arranged such that a magnetic element with a longest length is positioned at a center of the row, and a magnetic element with a shortest length is positioned at an end of the row. The magnetic elements can be arranged such that a magnetic element with a longest length is positioned at an end of the row, and a magnetic element with a shortest length is positioned at a center of the row.

The plurality of magnetic elements can be symmetrically arranged with respect to the coil axis. The plurality of magnetic elements can include at least 10 magnetic elements.

Each one of the plurality of magnetic elements can contact adjacent magnetic elements within the row.

Each one of the plurality of magnetic elements can be connected to adjacent magnetic elements within the row by a dielectric material which can include an adhesive.

During operation, the apparatus can be configured to wirelessly transfer power to, or receive power from, another coil. During operation, the apparatus can be configured to transfer power to an additional coil at an operating frequency within a range of one of: 85 kHz or less, and between about 80 kHz and about 145 kHz. During operation, the apparatus can be configured to transfer power from the coil to an additional coil at 3.3 kW or higher. During operation of the apparatus, a magnetic field can be generated when the coil is driven, the magnetic field having a magnetic flux density that varies in a range from about 10 mT to about 1000 mT.

The magnetic component can include a magnetic alloy including Fe. For example, the magnetic component can include an alloy of Fe, Cu, Nb, Si and B. The magnetic component can include an alloy of Fe, Co, Zr, B and Cu. The magnetic component can include an alloy of Fe, Co, Cu, Nb, Si and B.

In another aspect, the disclosure features methods for wirelessly transferring power using apparatuses, the methods including: generating a magnetic field using a first coil, and positioning the first coil relative to a second coil so that power is transferred by the magnetic field from the first coil to the second coil. The first coil is formed of a conductive material and includes a plurality of loops, where the plurality of loops defining an internal region of the coil that extends along a coil axis. A magnetic component is disposed in the internal region and extending in a first direction parallel to the coil axis and in a second direction perpendicular to the coil axis, and a maximum dimension of the magnetic component measured in the second direction varies along the first direction.

Embodiments of the methods can include any one or more of the following features.

The methods can include transferring power from the first coil to the second coil at an operating frequency of 85 kHz or less.

The methods can include transferring power from the first coil to the second coil at an operating frequency of between about 80 kHz and about 145 kHz.

The transferring power from the first coil to the second coil can be 3.3 kW or higher. The magnetic field can have a magnetic flux density that varies in a range from about 10 mT to about 1000 mT.

Embodiments of the apparatuses and methods can also include any other features disclosed herein, including features disclosed in connection with other apparatuses and methods, in any combination as appropriate.

In this disclosure, "wireless energy transfer" from one coil (e.g., resonator coil) to another coil (e.g., another resonator coil) refers to transferring energy to do useful work (e.g., electrical work, mechanical work) such as powering electronic devices, vehicles, lighting a light bulb or charging batteries. Similarly, "wireless power transfer" from one coil (e.g., resonator coil) to another resonator (e.g., another resonator coil) refers to transferring power to do useful work (e.g., electrical work, mechanical work) such as powering electronic devices, vehicles, lighting a light bulb or charging batteries. Both wireless energy transfer and wireless power transfer refer to the transfer (or equivalently, the transmission) of energy to provide operating power that would otherwise be provided through a wired connection to a power source, such as a connection to a main voltage source. Accordingly, with the above understanding, the expressions "wireless energy transfer" and "wireless power transfer" are used interchangeably in this disclosure. It is also understood that, "wireless power transfer" and "wireless energy transfer" can be accompanied by the transfer of information; that is, information can be transferred via an electromagnetic signal along with the energy or power to do useful work.

Unless otherwise defined, all technical and scientific terms used herein have the same meaning as commonly understood by one of ordinary skill in the art to which this disclosure belongs. In case of conflict with publications, patent applications, patents, and other references mentioned or incorporated herein by reference, the present disclosure, including definitions, will control. Any of the features described above may be used, alone or in combination, without departing from the scope of this disclosure. Other features, objects, and advantages of the systems and methods disclosed herein will be apparent from the following detailed description and figures.

BRIEF DESCRIPTION OF THE DRAWINGS

FIGS. 3A-3C are schematic diagrams of a further wireless power transmitting apparatus.

FIG. 4 is a schematic diagram of a portion of the wireless power transmitting apparatus shown in FIGS. 3A-3C.

FIG. 6A shows a schematic diagram of simulated magnetic field densities for a magnetic component.

FIG. 6C is a schematic diagram of calculated magnetic field distributions for several power transmitting apparatuses.

FIGS. 8A and 8B are schematic diagrams of magnetic components.

FIG. 9A-9D are schematic diagrams showing different examples of magnetic components.

FIG. 17 is a series of images of different magnetic components, each featuring magnetic elements of different lengths.

DETAILED DESCRIPTION

Introduction

A wireless power transfer system can include a power transmitting apparatus which is configured to wirelessly transmit power to a power receiving apparatus. In some embodiments, the power transmitting apparatus can include a source coil which generates oscillating fields (e.g., electric, magnetic fields) due to currents oscillating within the source coil. The generated oscillating fields can couple to the power receiving apparatus and provide power to the power receiving apparatus through the coupling. To achieve coupling, the power receiving apparatus typically includes a receiver coil. The oscillating fields generated by the source coil can induce oscillating currents within the receiver coil. In some embodiments, either or both of the source and receiver coils can be resonant. In some other embodiments, either or both of the source and receiver coils can be non-resonant so that power transfer is achieved through non-resonant coupling.

In some embodiments, a wireless power transfer system can utilize a source resonator to wirelessly transmit power to a receiver resonator. For example, a power transmitting apparatus of the system can include the source resonator, which has a source coil, and a power receiving apparatus of the system can include the receiver resonator, which has a receiver coil. Power can be wirelessly transferred between the source resonator and the receiver resonator. In certain embodiments, the wireless power transfer can be extended by multiple source resonators and/or multiple device resonators and/or multiple intermediate (also referred as "repeater" or "repeating") resonators.

Figure 1:
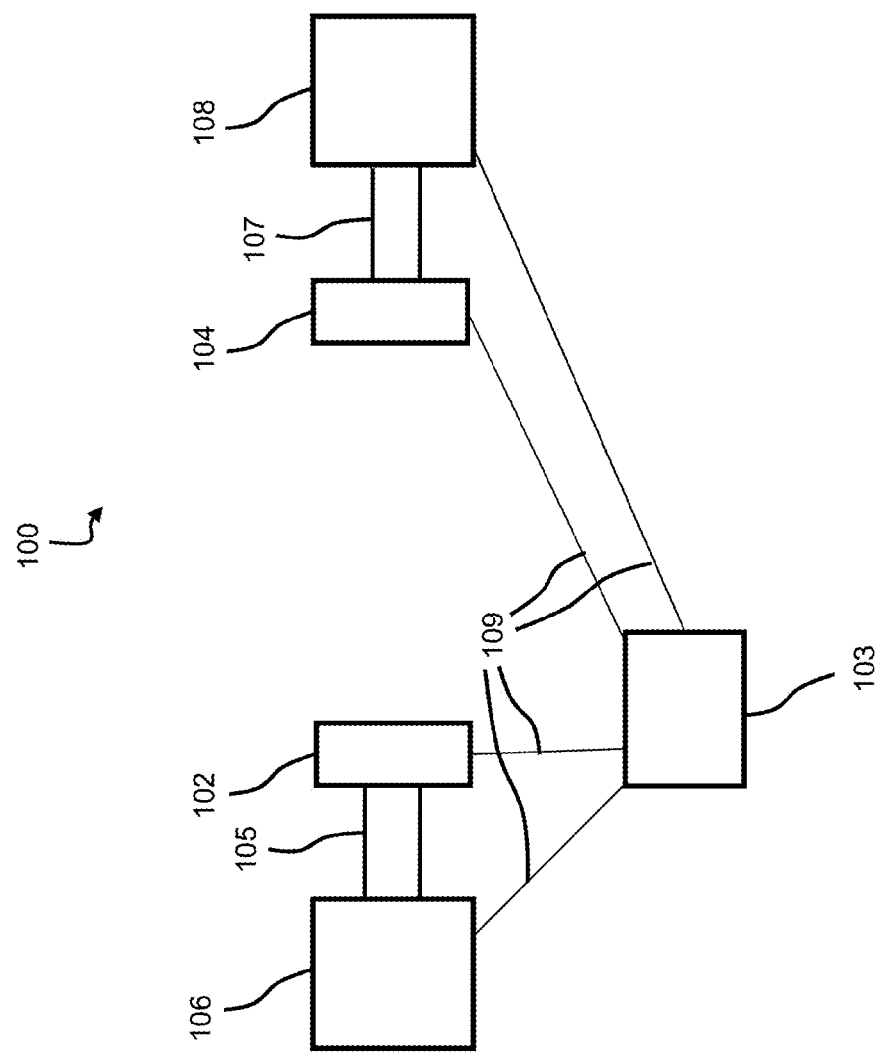
FIG. 1 is a schematic diagram of a wireless power transfer system.

FIG. 1 is a schematic diagram of a wireless power transfer system 100. System 100 includes a power transmitting apparatus 102 and a power receiving apparatus 104. Power transmitting apparatus 102 is coupled to power source 106 through a coupling 105. In some embodiments, coupling 105 is a direct electrical connection. In certain embodiments, coupling 105 is a non-contact inductive coupling. In some embodiments, coupling 105 can include an impedance matching network (not shown in FIG. 1). Impedance matching networks and methods for impedance matching are disclosed, for example, in commonly owned U.S. patent application Ser. No. 13/283,822, published as US Patent Application Publication No. 2012/0242225, the entire contents of which are incorporated herein by reference.

In similar fashion, power receiving apparatus 104 is coupled to a device 108 through a coupling 107. Coupling 107 can be a direct electrical connection or a non-contact inductive coupling. In some embodiments, coupling 107 can include an impedance matching network, as described above.

In general, device 108 receives power from power receiving apparatus 104. Device 108 then uses the power to do useful work. In some embodiments, for example, device 108 is a battery charger that charges depleted batteries (e.g., car batteries). In certain embodiments, device 108 is a lighting device and uses the power to illuminate one or more light sources. In some embodiments, device 108 is an electronic device such as a communication device (e.g., a mobile telephone) or a display. In some embodiments, device 108 is a medical device which can be implanted in a patient.

During operation, power transmitting apparatus 102 is configured to wirelessly transmit power to power receiving apparatus 104. In some embodiments, power transmitting apparatus 102 can include a source coil, which can generate oscillating fields (e.g., electric, magnetic fields) when electrical currents oscillate within the source coil. The generated oscillating fields can couple to power receiving apparatus 104 and provide power to the power receiving apparatus through the coupling. To achieve coupling between power transmitting apparatus 102 and power receiving apparatus 104, the power receiving apparatus can include a receiver coil. The oscillating fields can induce oscillating currents within the receiver coil. In some embodiments, either or both of the source and receiver coils can be resonant. In certain embodiments, either or both of the source and receiver coils can be non-resonant so that the power transfer is achieved through non-resonant coupling.

In certain embodiments, the system 100 can include a power repeating apparatus (not shown in FIG. 1). The power repeating apparatus can be configured to wirelessly receive power from the power transmitting apparatus 102 and wirelessly transmit the power to the power receiving apparatus 104. The power repeating apparatus can include similar elements described in relation to the power transmitting apparatus 102 and the power receiving apparatus 104 above.

System 100 can include an electronic controller 103 configured to control the power transfer in the system 100, for example, by directing electrical currents through coils of the system 100. In some embodiments, the electronic controller 103 can tune resonant frequencies of resonators included in the system 100, through coupling 109. The electronic controller 103 can be coupled to one or more elements of the system 100 in various configurations. For example, the electronic controller 103 can be only coupled to power source 106. The electronic controller 103 can be coupled to power source 106 and power transmitting apparatus 102. The electronic controller 103 can be only coupled to power transmitting apparatus 102. In some embodiments, coupling 109 is a direct connection. In certain embodiments, coupling 109 is a wireless communication (e.g., radio-frequency, Bluetooth communication). The coupling 109 between the electronic controller 103 can depend on respective one or more elements of the system 100. For example, the electronic controller 103 can be directly connected to power source 106 while wirelessly communicating with power receiving apparatus 104.

In some embodiments, the electronic controller 103 can configure the power source 106 to provide power to the power transmitting apparatus 102. For example, the electronic controller 103 can increase the power output of the power source 106 by sending a higher drive current to a coil in the power transmitting apparatus 102. The power output can be at an operating frequency, which is used to generate oscillating fields by the power transmitting apparatus 102.

In certain embodiments, the electronic controller 103 can tune a resonant frequency of a resonator in the power transmitting apparatus 102 and/or a resonant frequency of a resonator in the power receiving apparatus 104. By tuning resonant frequencies of resonators relative to the operating frequency of the power output of the power source 106, the efficiency of power transfer from the power source 106 to the device 108 can be controlled. For example, the electronic controller 103 can tune the resonant frequencies to be substantially the same (e.g., within 0.5%, within 1%, within 2%) to the operating frequency to increase the efficiency of power transfer. The electronic controller 103 can tune the resonant frequencies by adjusting capacitance values of respective resonators. To achieve this, for example, the electronic controller 103 can adjust a capacitance of a capacitor connected to a coil in a resonator. The adjustment can be based on the electronic controller 103's measurement of the resonant frequency or based on wireless communication signal from the apparatuses 102 and 104. In certain embodiments, the electronic controller 103 can tune the operating frequency to be substantially the same (e.g., within 0.5%, within 1%, within 2%) to the resonant frequencies of the resonators.

In some embodiments, the electronic controller 103 can control an impedance matching network in the system 100 to optimize or de-tune impedance matching conditions in the system 100, and thereby control the efficiency of power transfer. For example, the electronic controller 103 can tune capacitance of capacitors or networks of capacitors included in the impedance matching network connected between power transmitting apparatus 102 and power source 106. The optimum impedance conditions can be calculated internally by the electronic controller 103 or can be received from an external device.

Figure 2:
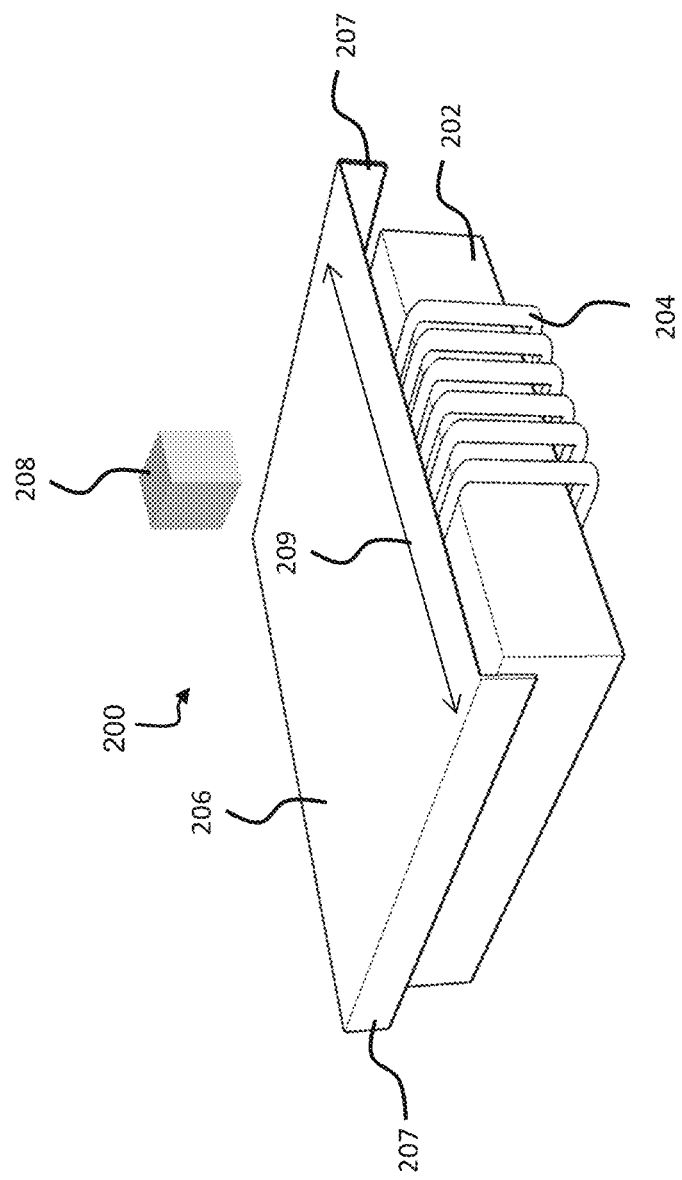
FIG. 2 is a perspective view of a wireless power transmitting apparatus.

FIG. 2 is a schematic diagram of a power transmitting apparatus 200, which includes a coil 204 having a plurality of loops wound around a magnetic component 202. The magnetic component 202 can act as a core structure, which can guide a magnetic flux in the internal region defined by the plurality of loops of coil 204. The presence of the magnetic component 202 as a core structure can lead to an increase of a magnetic field flux density generated by coil 204 when oscillating electrical currents circulate in coil 204, compared to the case without the magnetic component 202.

The power transmitting apparatus 200 can include a shield 206 (e.g., a sheet of conductive material) positioned between coil 204 and a lossy object 208. Shield 206, which is typically formed of a conductive material, shields magnetic fields generated by coil 204 from lossy object 208 (e.g., lossy steel object). For example, the shield 206 can reduce aberrant coupling of magnetic fields to lossy object 208 by guiding magnetic field lines away from the lossy object 208.

In some embodiments, shield 206 can include two flaps 207 which are bent down ends of the conductor shield 206. Flaps 207 do not add to the overall length 209 of the conductor shield 206, but can improve the shielding effect of the conductor shield 206 by deflecting and guiding magnetic field lines downwards, and reducing field interactions with lossy object 208. This configuration can increase the effectiveness of the shield 206 without increasing its length 209. Note that a power receiving apparatus and or a power repeating apparatus can use the structure shown in FIG. 2.

Nanocrystalline Magnetic Materials

Magnetic components can include magnetic materials. During operation, the temperature of a magnetic component within an apparatus can increase due to a variety of factors. For example, in vehicle battery charging applications, magnetic components of large areal size (e.g., 30 cm×30 cm) are useful for transferring high power of 1 kW or more (e.g., 2 kW or more, 3 kW or more, 5 kW or more, 6 kW or more). In some embodiments, if a single piece of magnetic component of the required size is available, it may be preferable to use the single piece of material. In some embodiments, it can be difficult and/or expensive to manufacture a monolithic piece of magnetic component from ferrite materials such as manganese-zinc (MnZn) and/or nickel-zinc (NiZn) which may be brittle and costly for producing large areal sizes. One solution to this problem is to fabricate ferrite materials in pieces of smaller areal size (e.g., 5 cm×5 cm), and then join several pieces together to form a larger piece of magnetic component. However, when multiple pieces of ferrite material are joined together, irregularities at edges of the pieces can lead to "magnetic field hot spots," where magnetic fields are locally concentrated at the irregularities. Such hot spots can damage the magnetic component due to localized heating, and/or reduce a quality factor of the apparatus.

FIG. 3A is a schematic diagram showing a top view of a power transmitting apparatus 400 including a coil 430, which is wound around a magnetic component 402, according to coordinate 490 based on the right-hand rule convention, which is used through-out this disclosure. Coil 430 includes one or more loops that define a coil axis in direction 441 along which coil 430 extends, and which is perpendicular to direction 442. The magnetic component 402 includes four magnetic elements 410, 412, 414 and 416 (e.g., ferrite tiles) each shaped as a rectangular slab. Magnetic elements 410, 412, 414 and 416 are joined with a dielectric material 420 between the four magnet elements 410, 412, 414 and 416. In FIG. 3A, dielectric material 420 is an adhesive material which bonds the four magnetic elements 410, 412, 414 and 416 together. By using four magnetic elements 410, 412, 414 and 416, a large magnetic component 402 can be fabricated for use in power transmitting apparatus 400 at significantly reduced cost, relative to the cost for an equivalent-size monolithic piece of magnetic component. The equivalent-size monolithic piece may easily break, which may lead to irregular gaps giving rise to hot spots.

FIG. 3B is a schematic diagram of the power transmitting apparatus 400 shown in FIG. 3A according to coordinate 491. Magnetic elements 410, 412, 414 and 416 are each implemented as rectangular slabs with a height 450. The coil 430 is configured to generate oscillating magnetic fields and magnetic dipoles in the magnetic component 402, which oscillate substantially along axial direction 441, when currents oscillate within the coil 430. To illustrate this, a top view of the power transmitting apparatus 400 is shown in FIG. 3C according to coordinate 490. Coil 430 is not shown in this top view for purposes of clarity. At a given time, oscillating currents in the coil 430 generate magnetic fields which are schematically depicted with arrows 470 at several positions within the magnetic elements 410, 412, 414 and 416.

Referring back to FIG. 3A, the magnetic component 402 includes gaps 422 and 423, which are formed between the magnetic elements 410, 412, 414 and 416. The dielectric material 420 can fill the gaps 422 and 423.

In this disclosure an "average magnetic field" of a magnetic component at a given time refers to the magnetic field integrated over the total volume of all magnetic elements in the magnetic component at the given time. FIG. 3C schematically depicts an average magnetic field 471 of the magnetic component 402, which is the average of magnetic fields within the volume of magnetic elements 410, 412, 414 and 416 at a given time. In this example, the average magnetic field 471 points in a direction nominally parallel to direction 441 along the negative B-direction, at a given time. In some embodiments, an angle between a direction of the average magnetic field 471 and direction 441 is 10° or less (e.g., 5° or less, 3° or less, 1° or less) at a given time.

Furthermore, the magnetic fields generated in the gap 422 oscillate in the B-direction. Accordingly, the magnetic fields generated in the gap 422 oscillate in a perpendicular direction to an interface 432 between the magnetic element 410 and the dielectric material 420 and an interface 434 between the magnetic element 416 and the dielectric material 420.

As discussed briefly above, magnetic field hot spots can arise within gap 422 due to imperfections in magnetic elements 410, 412, 414, and 416, and these hot spots can lead to local heating of the magnetic component in the vicinity of the hot spots.

FIG. 4 is a schematic diagram of a portion of the power transmitting apparatus 400 shown in FIGS. 3A-4C, showing the gap 422 between magnetic elements 410 and 416 at higher magnification, according to coordinate 490. The interfaces 432 and 434 between the magnetic elements 410 and 416 are also shown. During operation, the coil 430 can generate oscillating magnetic fields, with a high density of magnetic field lines 521 being concentrated in gap 422 between interfaces 432 and 434. The gap 422 is filled with the dielectric material 420 (not shown) such as adhesive for joining the magnetic elements 410 and 416. In embodiments, magnetic elements can be joined, secured, or positioned relative to one another by tape, plastic, epoxy, foam, and the like. In embodiments, magnetic components may be enclosed in enclosures made of plastic, resin, etc. In some embodiments, the gap 422 is filled with air—in this case, the gap 422 is referred as air gap and to have an air space. When the coil 430 generates magnetic fields in the magnetic component 220 with the average magnetic field 471 pointing along the direction 441, high densities of magnetic fields can become concentrated in the gap 422.

As shown in FIG. 4, in some embodiments, interfaces 432 and 434 may not be perfectly even, and may include local peaks (e.g., peak 512 of interface 432) and/or valleys (e.g., valley 514 of interface 434). Oscillating magnetic fields between interfaces 432 and 434 along axis 441 can form "magnetic field hot spots," where the magnetic fields are locally (e.g., in regions of the peaks or valleys) concentrated compared to other regions of the interfaces 432 and 434.

For example, magnetic fields 520 depicted as dashed arrows within region 510 can concentrate on the peak 512. Concentrated field regions (e.g., region 510) can lead to increased heating if the magnetic flux densities are high enough, which can cause damage to, and even structural breakdown of, the magnetic component, which in turn can cause deteriorated power transfer efficiency provided by the power transmitting apparatus 400.

Furthermore, magnetic field hot spots can become more pronounced when the distance between the interfaces 432 and 434 is decreased. The distance between interfaces 432 and 434 can be reduced, for example, when elements 410 and 416 are joined together more closely to achieve a more compact arrangement of the magnetic elements 410 and 416. Polishing the interfaces can, in certain embodiments, assist in reducing the extent of irregularities at the surfaces, but it is difficult to fully ameliorate surface irregularities that lead to magnetic hot spots through polishing alone.

The effects of heating and, more generally, temperature variations within magnetic components, can be addressed by using alternative magnetic components. In particular, alternative magnetic components can be attractive if they can be fabricated in larger sizes. Then, the magnetic component in an apparatus can be implemented as a single piece of material or formed from a relatively smaller number of magnetic elements, thereby reducing local heating due to imperfections in the edges of the smaller tiles of magnetic component.

Magnetic materials used in magnetic components can have magnetic properties that make them advantageous for use in environments where temperature variations such as heating can occur. For conventional magnetic materials (e.g., MnZn ferrites), the magnetic permeability typically depends on the temperature and magnetic field density within the magnetic materials. Thus, changes in the temperature and magnetic field density can lead to different magnetic permeability values of the magnetic component which can alter the impedance matching conditions of the system, and can thereby reduce the power transfer efficiency of the system.

However, certain alternative magnetic components can include magnetic materials with magnetic properties that are relatively constant over a range of temperatures and power transfer rates compared to, for example, MnZn ferrites. Moreover, these magnetic materials typically have strong stress resilience compared to MnZn and other ferrites and are therefore mechanically stronger than MnZn ferrites. By using such magnetic materials, variations in impedance matching conditions can be reduced, and maintenance costs associated with of wireless power transfer systems can also be reduced. Moreover, such magnetic materials may transfer more power per weight than magnetic materials as MnZn ferrites.

As explained above, local heating can arise from magnetic field hot spots that are attributable to imperfections in the magnetic elements that are joined to form a magnetic component. To form large area magnetic components from conventional ferrite-based materials, many such elements may be used, because high quality ferrite-based materials are typically difficult to fabricate in large sizes due to their brittleness.

In contrast, nanocrystalline magnetic materials can typically be fabricated in relatively large sizes. Consequently, a magnetic component can be fabricated from magnetic elements formed from nanocrystalline magnetic materials, arranged so that substantially no gaps that lead to magnetic field hot spots are present between the elements. By eliminating such gaps, local heating due to magnetic field hot spots can be reduced or even eliminated.

As an example, consider an apparatus utilizing a large magnetic component having dimensions of 30 cm×30 cm. Magnetic elements formed of a nanocrystalline magnetic material and having at least one dimension (e.g., a length) of 30 cm can be fabricated, and then joined to form the magnetic component, leaving no gaps between the elements that lead to (e.g., no gaps such as gap 422) field concentration and associated excessive localized heating. In general, nanocrystalline magnetic materials can be used to form magnetic elements having at least one dimension that extends a large length (e.g., 30 cm or more, 40 cm or more, 50 cm or more). The nanocrystalline magnetic materials can be more robust than ferrite material such as MnZn or NiZn.

A variety of different nanocrystalline magnetic materials can be used in the systems disclosed herein. For example, in some embodiments, nanocrystalline magnetic materials can be nanocrystalline alloys formed on a basis of Fe, Si and B with additions of Nb and Cu. Nanocrystalline magnetic materials can be an alloy of Fe, Cu, Nb, Si and B (e.g., $Fe_{73.5}Cu_1Nb_3Si_{15.5}B_7$). In some embodiments, nanocrystalline magnetic materials can be an alloy of Fe, Co, Zr, B and Cu. In certain embodiments, nanocrystalline magnetic materials can be an alloy of Fe, Si, B, Cu and Nb. In certain embodiments, nanocrystalline magnetic materials can be an alloy of Fe, Co, Cu, Nb, Si and B. The nanocrystalline magnetic material can include an alloy based on Fe. For example, the alloy can be a FeSiB alloy.

Nanocrystalline magnetic materials can include NANOPERM® or FINEMET®. In certain embodiments, amorphous cobalt- and iron-based alloys can be used as a magnetic component. For example, NANOPERM® available from MAGNETEC is a rapidly quenched iron based alloy. The alloy composition is $Fe_{73.5}Cu_1Nb_3Si_{15.5}B_7$. FINEMET® is available from Hitachi. FINEMET® includes an alloy of Fe, Si, B and small amounts of Cu and Nb. By applying heat treatment to the alloy at higher temperatures than its crystalline temperature, the alloy can form nanocrystalline structures.

In certain embodiments, amorphous cobalt-based alloys or amorphous iron-based alloys can be used as a magnetic component. Such alloys may have the advantages described in relation to nanocrystalline magnetic materials over ferrites such as MnZn and NiZn.

Characteristics of nanocrystalline magnetic materials and MnZn ferrites can be compared by analyzing quantities that relate to their performance for wireless power transfer at different operating frequencies. In the following discussion, quantities such as their magnetic permeabilities, and the reactive power ($P_x$) of an apparatus which utilizes these materials are described. Some of these quantities are measured to compare the characteristics of certain nanocrystalline magnetic materials and MnZn ferrites.

For a wireless power transfer system utilizing a source resonator configured to transfer power to a receiver resonator, the figure-of-merit (U) can be expressed by $U=\kappa/\sqrt{\Gamma_1\Gamma_2}$, where κ is the coupling rate between the source and receiver resonators. The source resonator can have an angular resonant frequency $\omega_1$ and a Q-factor $Q_1=\omega_1/(2\Gamma_1)$, where $\Gamma_1$ is related to the intrinsic loss of the source resonator. The receiver resonator can have an angular resonant frequency $\omega_2$ and a Q-factor $Q_2=\omega_2/(2\Gamma_2)$, where $\Gamma_2$ is related to the intrinsic loss of the receiver resonator. For a given geometry of a resonator, and assuming a constant overall figure-of-merit (U) and power transfer $P_w$ to a load in the system, the reactive power $P_x$ may be constant, which is expressed according to Eq. (1) shown below:

$$P_X(U, P_w) \approx \frac{\omega[B(U, P_w)]^2}{2\mu_0}, \quad (1)$$

where B is a magnetic field at a given location and $\mu_0$ is the vacuum permeability.

In some embodiments, a power transmitting apparatus of the system can include a magnetic component. (Similarly, a power receiving apparatus or a power repeating apparatus of the system can include a magnetic component.) The magnetic component can have a magnetic permeability μ that can be expressed into real and imaginary parts according to Eq. (2) shown below:

$$\mu = \mu_s' + i\mu_s'' = \mu_r + i\mu_i. \quad (2)$$

$\mu_s'=\mu_r$ is the real part and $\mu_s''=\mu_i$ is the imaginary part. The magnetic permeability μ can also be expressed according to Eq. (3) shown below:

$$\frac{1}{\mu} = \frac{1}{\mu_p'} - i\frac{1}{\mu_p''}. \quad (3)$$

Assuming the absence of nonlinearity of the magnetic component, $Q_\mu$ of the magnetic component can be expressed according to Eq. (4) shown below:

$$Q_\mu \approx g \times \mu_p'', \quad (4)$$

where g is a dimensionless factor depending on the geometry of the source resonator. $Q_\mu$ can be considered as the quality factor contributed by the magnetic component (described later). $\mu_p''$ is the imaginary part of the parallel magnetic permeability as shown in Eq. (3). A plot of reactive power $P_X$ versus $\mu_p''$ can provide a comparison of the performance of different magnetic components at different frequencies.

Figure 10:
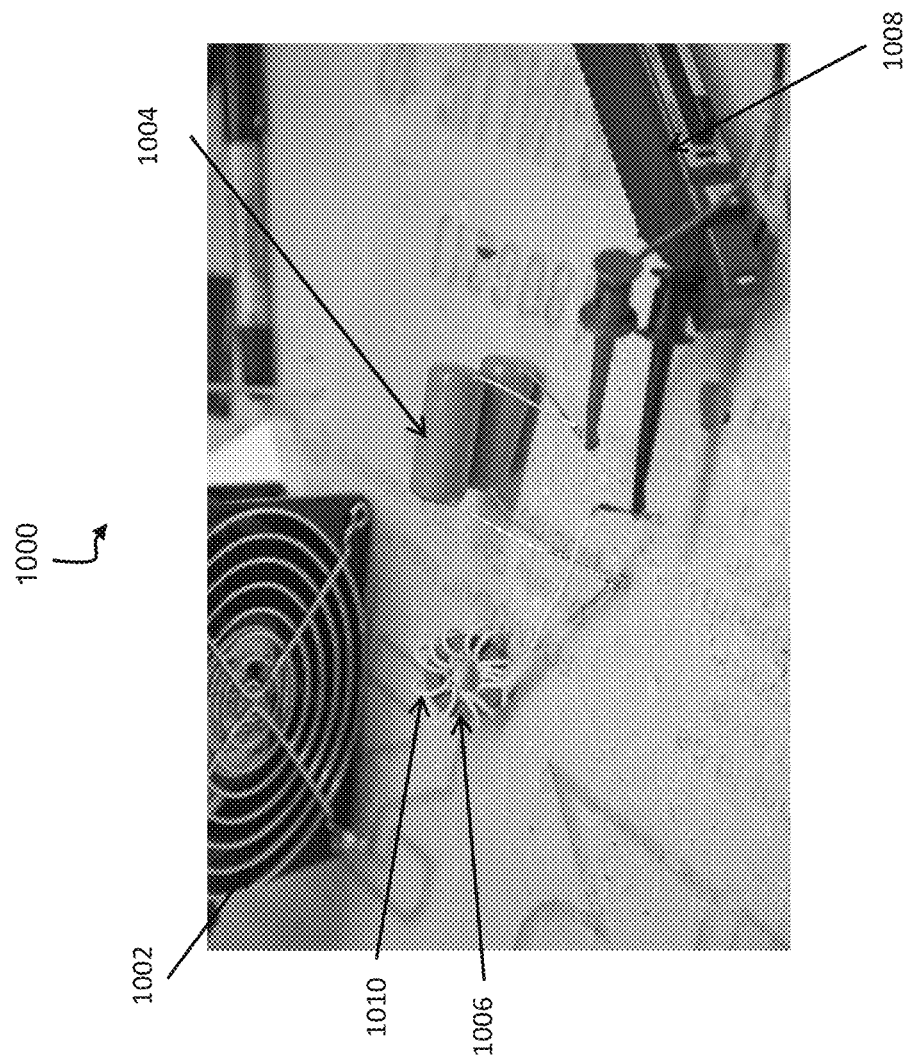
FIG. 10 is an image of an example of an apparatus for measuring characteristics of a magnetic component.

FIG. 10 is an image showing an apparatus 1000 for measuring characteristics of a magnetic component (e.g., MnZn ferrites, nanocrystalline magnetic materials). Apparatus 1000 includes a coil 1010 (e.g., Litz wire) wrapped around the magnetic component 1006, which is shaped as a toroid. The coil 1010 is connected to a capacitor 1004, to a current probe 1008 and to a power source (not shown). The coil 1010 receives power from the power source and generates a magnetic field within the magnetic component 1006. Because of its toroidal shape, the generated magnetic fields are substantially uniform within the magnetic component 1006. A fan 1002 is positioned to control the temperature of the magnetic component 1006. By adjusting the power and frequency of the applied current from the power source, various properties of the magnetic component can be measured.

Figure 11A:
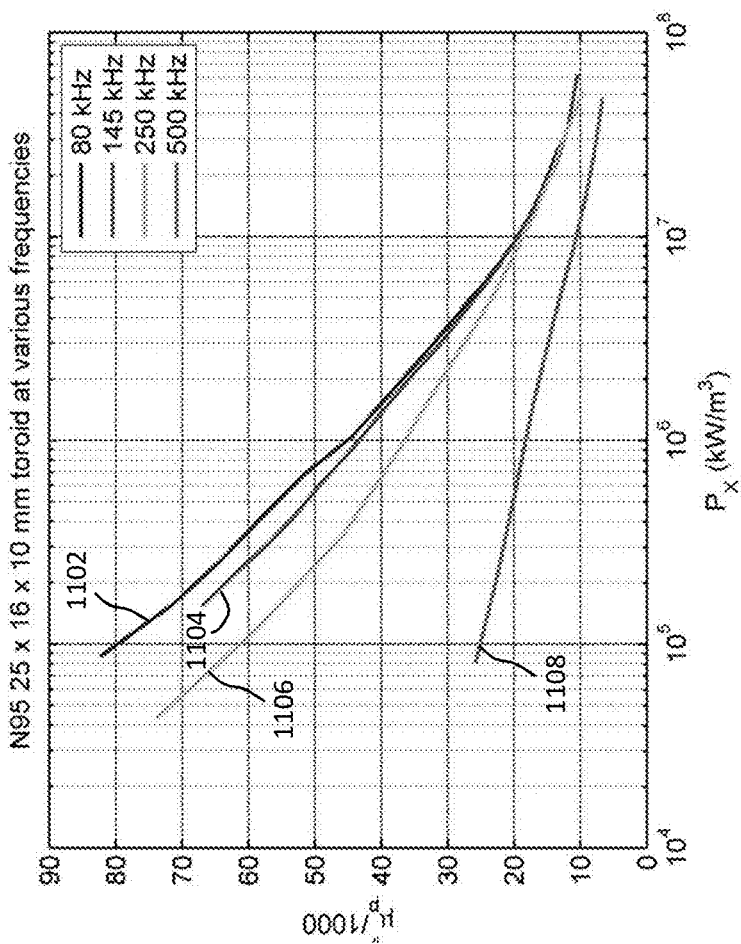
FIG. 11A is a plot showing measured imaginary part of the parallel magnetic permeability ($\mu_p''$) as a function of reactive power ($P_X$) for the magnetic component shown in FIG. 10.

FIG. 11A is a plot 1100 displaying the measured imaginary part of the parallel magnetic permeability ($\mu_p''$) as a function of reactive power ($P_X$) for a magnetic component made of N95® available from EPCOS, which is a type of a MnZn based ferrite. Curves 1102, 1104, 1106 and 1108 correspond to frequencies 80, 145, 250 and 500 kHz, respectively, of the current applied by the power source. The nonlinear shape of curves 1102, 1104, 1106 and 1108 indicates the nonlinearity of the magnetic permeability of MnZn.

Figure 11B:
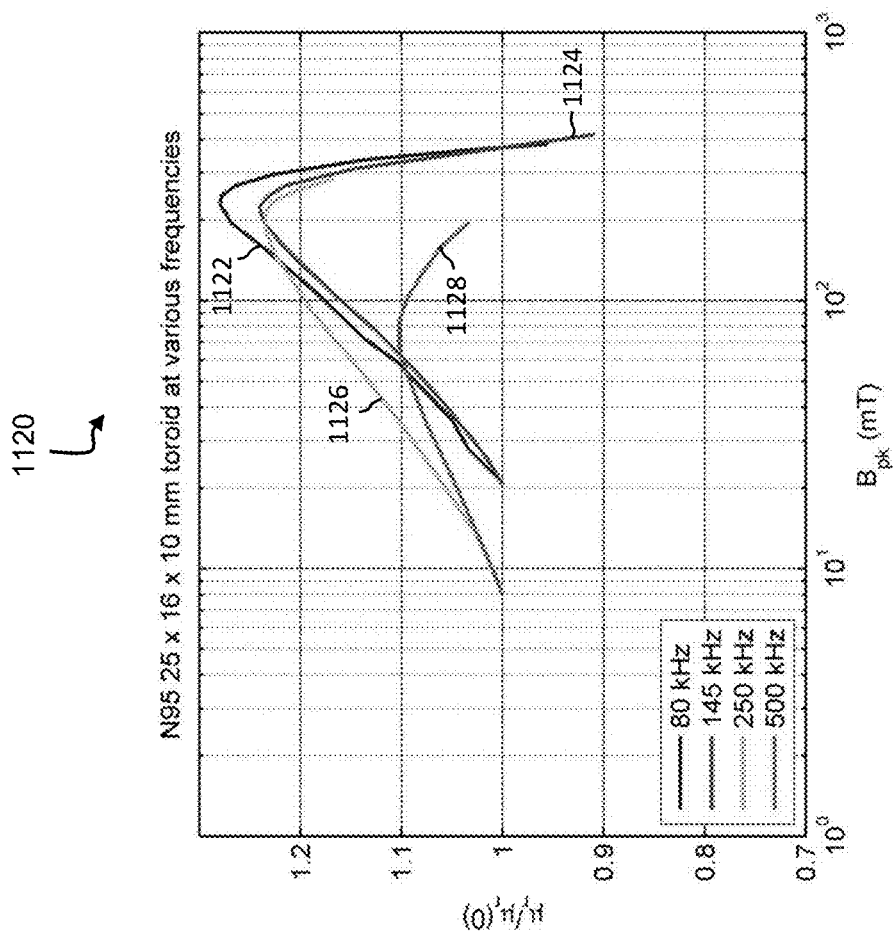
FIG. 11B is a plot 1120 showing measured real part of magnetic permeability ($\mu_r$) versus peak magnetic flux $B_{pk}$ at a point within the toroid of the magnetic component shown in FIG. 10.

FIG. 11B is a plot 1120 showing values of the measured real part of magnetic permeability ($\mu_r$) (normalized by an arbitrary value $\mu_r(0)$) versus peak magnetic flux $B_{pk}$ at a point within the toroid of the magnetic component. Curves 1122, 1124, 1126 and 1128 correspond to frequencies 80, 145, 250 and 500 kHz, respectively, of the current applied by the power source. The nonlinearity of curves 1122, 1124, 1126 and 1128 indicates a dependence of the magnetic permeability (μ) on the magnetic flux density, which in turn depends on the strength of current applied by the power source. In embodiments, a strong dependence may be undesirable for applications in wireless power transfer because impedance matching conditions can depend on the real part of magnetic permeability ($\mu_r$); as such, it may be necessary to adjust impedance matching conditions depending on the applied power.

Figure 12A:
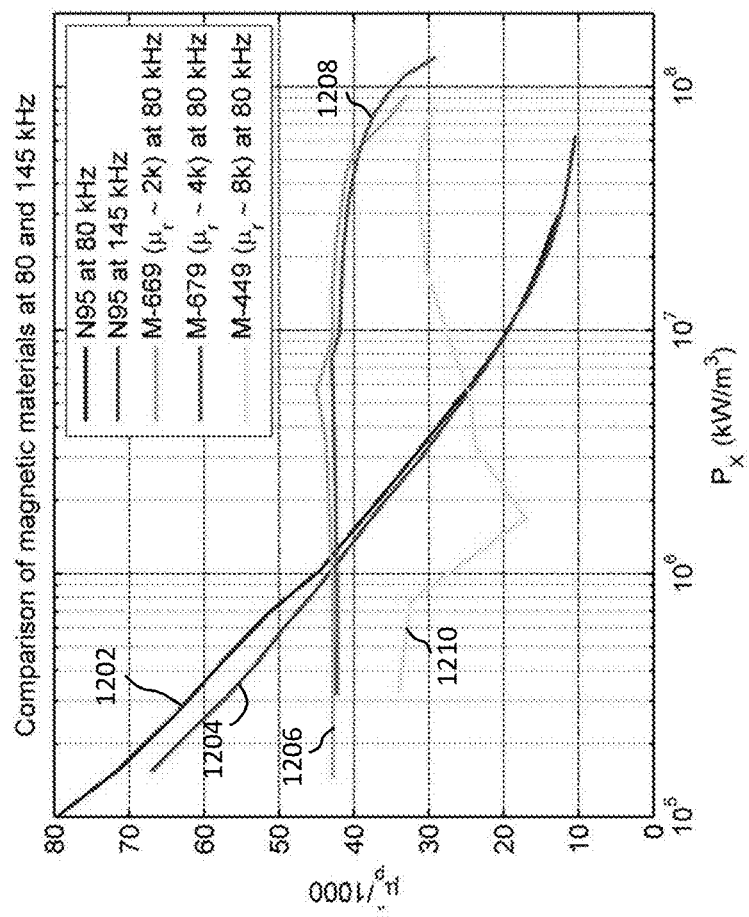
FIG. 12A is a plot showing measured imaginary part of the parallel magnetic permeability ($\mu_p''$) as a function of reactive power $P_X$ for several magnetic components.

Certain nanocrystalline magnetic materials can be advantageous relative to N95® for use in high power transfer because for such materials, the imaginary part of the parallel magnetic permeability ($\mu_p''$) at high reactive power ($P_X$) is higher than for N95®, which leads to higher $Q_\mu$ according to Eq. (4). To illustrate this, FIG. 12A is a plot 1200 displaying the measured imaginary part of the parallel magnetic permeability ($\mu_p''$) as a function of reactive power $P_X$ for the magnetic components N95® and for several nanocrystalline magnetic materials (type M-669, M-679 and M-449). In this example, the nanocrystalline magnetic materials each have a toroid shape 1252 with dimensions $D_a$=25 mm, $D_i$=16 mm and H=10 mm, where $D_a$ is the outer diameter, $D_i$ is in the inner diameter, and H is the thickness, as depicted in FIG. 12D. The real component of the magnetic permeability ($\mu_r$) for the type M-699 material has a value of about 2000 at 80 kHz, while the real components of the magnetic permeabilities for the type M-679 and type M-449 materials are about 4000 and about 8000 at 80 kHz, respectively. The frequencies 80 kHz and 145 kHz in FIG. 12A refer to the operating frequency of supplied power.

Curve 1202 corresponds to N95® at 80 kHz; curve 1204 corresponds to N95® at 145 kHz; curve 1206 corresponds to M-669 at 80 kHz; curve 1208 corresponds to M-679 at 80 kHz; and curve 1210 corresponds to M-449 at 80 kHz. Similar to the curves shown in FIG. 11A, curves 1202 and 1204 for N95® show a strong dependence on $P_X$, which indicates a non-linear imaginary part of the parallel magnetic permeability ($\mu_p"$). On the other hand, the curves for the nanocrystalline materials are relatively flatter. For example, curve 1206 and 1208 shows substantially constant values of the imaginary component of the parallel magnetic permeability ($\mu_p"$) (e.g., variations within 10%) in a range of values of reactive power ($P_X$) between $0.5 \times 10^6$ kW/m$^3$ and $0.5 \times 10^8$ kW/m$^3$. The substantially constant values of the imaginary part of the parallel magnetic permeability ($\mu_p"$) as a function of the reactive power ($P_X$) can be advantageous in certain applications because the quality factor contributed by magnetic component ($Q_\mu$) also has relatively constant values according to Eq. (4). As a result, variations in $Q_{total}$ (described later) over this range can be relatively small according to Eq. (6) (which is described later).

Moreover, plot 1200 shows that nanocrystalline magnetic materials can have higher imaginary components of the parallel magnetic permeability ($\mu_p"$) than N95® at higher reactive powers ($P_X$). For example, M-669 and M-679 have higher $\mu_p"$ than N95® for $P_X$ larger than $10^6$ kW/m$^3$. Accordingly, in some applications such as high power transfer, nanocrystalline magnetic materials can be advantageous relative to N95® because of the nanocrystalline magnetic materials' higher imaginary component of the parallel magnetic permeability ($\mu_p"$) at high reactive power ($P_X$).

Figure 12B:
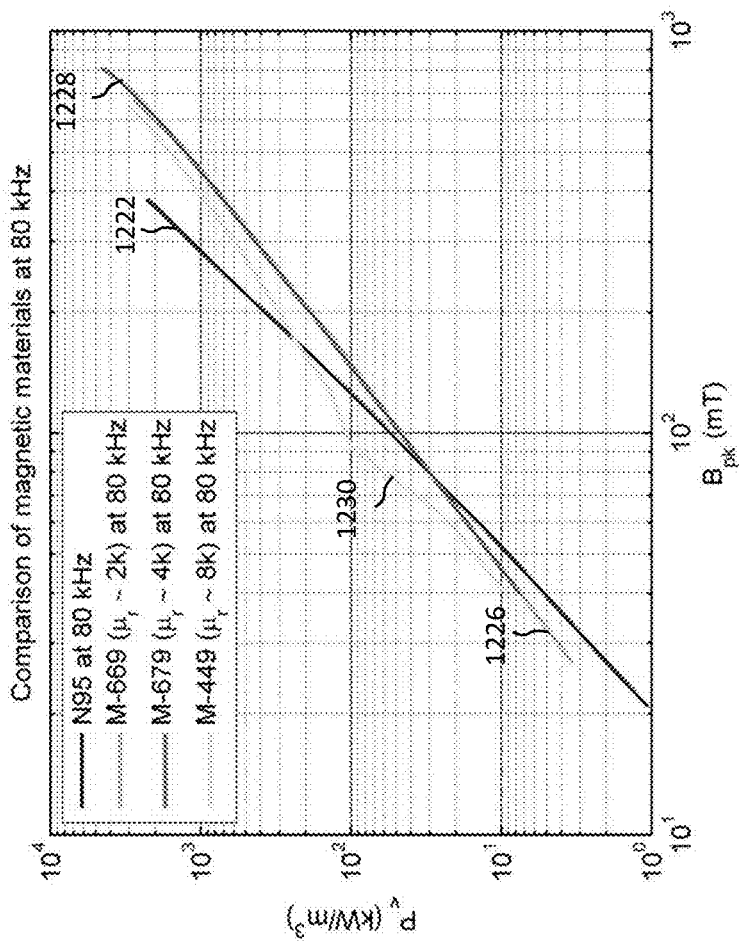
FIG. 12B is a plot showing measured power dissipated ($P_v$) in toroid shaped magnetic components.

FIG. 12B is a plot 1220 showing measured values of the power dissipated ($P_v$) in toroid shaped magnetic components N95® and nanocrystalline magnetic materials (M-669, M-679 and M-449) as a function of peak magnetic flux ($B_{pk}$) at a point within the toroid. Curves 1222, 1226, 1128 and 1130 correspond to N95® at 80 kHz, M-669 at 80 kHz, M-679 at 80 kHz, and M-449 at 80 kHz, respectively. In certain peak magnetic flux ranges, the nanocrystalline magnetic materials have a smaller power dissipation values ($P_v$) than N95®. For example, curves 1226 and 1228 have smaller values than curve 1222 for peak magnetic fluxes ($B_{pk}$) between $0.5 \times 10^2$ mT and $0.5 \times 10^3$ mT. A larger peak magnetic flux ($B_{pk}$) corresponds to a higher power transfer. Therefore, smaller values of curves 1226 and 1228 compared to curve 1222 indicate that nanocrystalline magnetic materials can have smaller power dissipated ($P_v$) for high power transfer, and thus reduced energy losses compared to N95®. Accordingly, for certain applications such as wireless high power transfer, nanocrystalline magnetic materials can be advantageous due to reduced power dissipation in the nanocrystalline magnetic materials. In some application, a power transfer of 3.3 kW can correspond to $P_v$ of about 20 kW/m$^3$. Such value of $P_v$ is near where curves 1222 and 1228 cross-over.

At higher power transfer, nanocrystalline materials can be less lossy than N95®. In particular, nanocrystalline magnetic materials with reduced power dissipation can provide important advantages in applications involving the transfer high power of 1 kW or more (e.g., 2 kW or more, 3 kW or more, 5 kW or more, 6 kW or more). For example, the high power transfer can be about 3.3 kW or more (e.g., 6.6 kW or more).

Figure 12C:
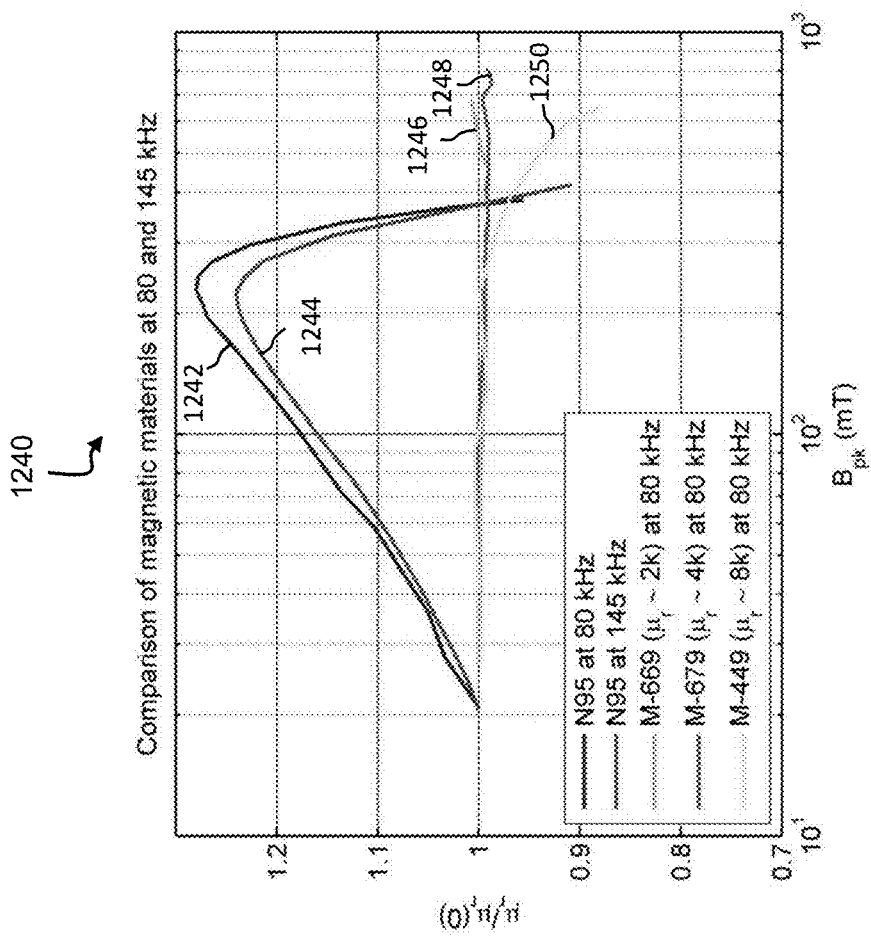
FIG. 12C is a plot showing measured real part of magnetic permeability ($\mu_r$) versus peak magnetic flux ($B_{pk}$) at a point within toroid shaped magnetic components.
Figure 12D:
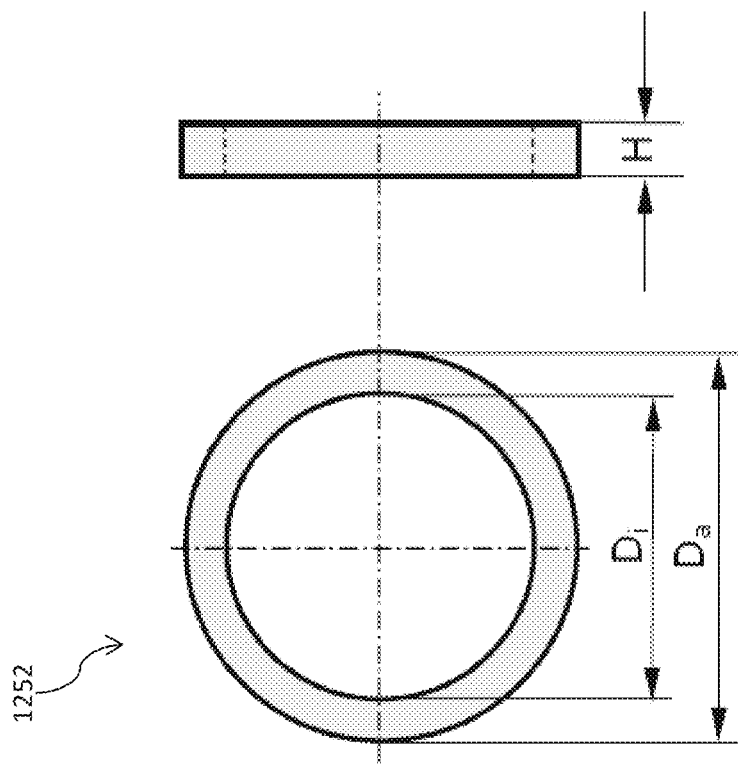
FIG. 12D is a schematic diagram showing dimensions of a toroid shape.

FIG. 12C is a plot 1240 showing measured values of the real part of the magnetic permeability ($\mu_r$) (normalized by an arbitrary value $\mu_r(0)$) versus peak magnetic flux ($B_{pk}$) at a point within the toroid shape of several different magnetic components. Curve 1242 corresponds to N95® at 80 kHz; curve 1244 corresponds to N95® at 145 kHz; curve 1246 corresponds to M-669 at 80 kHz; curve 1248 corresponds to M-679 at 80 kHz; and curve 1250 corresponds to M-449 at 80 kHz. Similar to the curves shown in FIG. 11B, curves 1242 and 1244 of N95® show a strong dependence on peak magnetic flux ($B_{pk}$), which indicates nonlinearity of the real part of the magnetic permeability ($\mu_r$) of N95® as a function of peak magnetic flux ($B_{pk}$).

On the other hand, the curves for the nanocrystalline materials are relatively flatter. For example, curves 1246 and 1248 show a substantially flat dependence (e.g., variations within 10%) in the range of values between $0.5 \times 10^2$ mT and $0.5 \times 10^3$ mT of peak magnetic flux ($B_{pk}$). As discussed above, the substantially flat dependence of the real part of the magnetic permeability ($\mu_r$) as a function of peak magnetic flux ($B_{pk}$) can be advantageous because impedance matching conditions typically depend on the real part of magnetic permeability ($\mu_r$); by using a material with a relatively constant real component of magnetic permeability, tuning of impedance matching conditions as the applied power varies can be reduced. As an example, curve 1246 shows a substantially flat dependence (e.g., variations within 5%) for values of the peak magnetic flux ($B_{pk}$) that vary by a factor of 10. Changes of a factor of 10 of peak magnetic flux ($B_{pk}$) can correspond to changes of a factor of 100 in power transferred. The impedance of an apparatus that includes a magnetic component formed from the M-669 nanocrystalline material may change by an amount smaller than 5% when the power transferred by the apparatus increases by a factor of about 100.

Figure 5A:
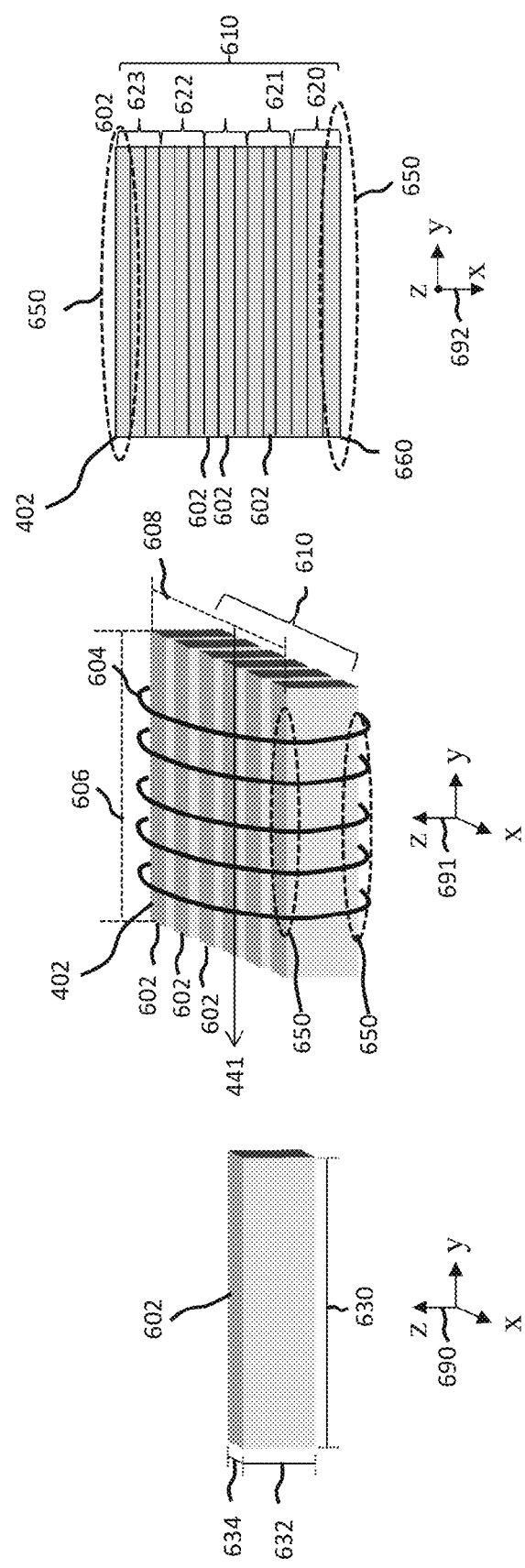
FIGS. 5A and B are schematic diagram of examples of magnetic components.

One or more of the nanocrystalline magnetic materials disclosed herein can be used to form magnetic elements, which can in turn be combined to form a magnetic component. The left-side of FIG. 5A shows a magnetic component formed from a single magnetic element 602. Local coordinate 690 shows the orientation of the magnetic element 602 in x-, y- and z-coordinates. In this disclosure, the local coordinate of a magnetic element is referred to using x-, y- and z-coordinates. The magnetic element 602 has a length 630 in the y-direction, a thickness 634 in the x-direction and a height 632 in the z-direction. In this example, the magnetic element 602 is shaped as a rectangular cuboid, where the length 630 refers to the longest edge, the thickness 634 refers to the shortest edge and the height 632 refers to the edge with a size between the length 630 and the thickness 634, as shown in FIG. 5A. In some embodiments, any two edge lengths of element 602 can be identical. Moreover, in certain embodiments, magnetic element 602 can be shaped as a rectangular cuboid but with smoothed and/or chamfered edges and/or vertices.

Nanocrystalline magnetic materials can be formed in the shape of a thin ribbon. In some processes, the nanocrystalline magnetic material can be initially in powder form and then be crystallized by annealing at a high temperature (e.g., between 400-500° C., between 500-600° C.). Then, during the annealing step, the powder can be processed to form ribbons having a length of 15 cm or more (e.g., 20 cm or more, 30 cm or more, 40 cm or more, 50 cm or more, 100 cm or more, 200 cm or more). The ribbon can be cut into pieces to form one or more magnetic elements 602. Using such techniques, the length 630, thickness 634 and height 632 of the magnetic element 602 can be controlled during the manufacturing process. Because the ribbon can be long, the resulting length 630 of the magnetic element 602 can be 15 cm or more (e.g., 20 cm or more, 30 cm or more, 40 cm or more, 50 cm or more).

As discussed above, a plurality of such magnetic elements 602 can be used to form a magnetic component with large areal size and without the gaps that lead to hot spots in tiled magnetic components. To eliminate gaps in which hot spots form (e.g., gaps where magnetic fields oscillate perpendicular to interfaces of the gaps), a plurality of joined magnetic elements 602 can be oriented such that magnetic field oscillations occur in a direction that is nominally within the plane of the interfaces between the magnetic elements 602. As a result, the extent to which hot spots form at the interfaces is significantly reduced, and heating or damage to the magnetic component arising from magnetic field hot spots can be reduced or eliminated.

The center diagram of FIG. 5A shows an example of a magnetic component 402 including an array 610 of magnetic elements 602 with identical dimensions. A coil 604 formed of a conductive material is wound around the array 610 along an axial direction 441. Coordinate 691 shows the local coordinate of the magnetic elements 602. In this configuration, magnetic fields generated by the coil 604 oscillate substantially along the axial direction 441. A magnetic dipole of the generated magnetic component field is generated substantially along the axial direction 441 of the magnetic component 402 (e.g., to within 1°, to within 3°, to within 5°, to within 10°).

In this arrangement, there is no gap as described in relation to FIG. 4, where magnetic fields oscillate substantially perpendicular to interfaces defining the gap. Thus, heating-related variation in the magnetic properties of magnetic component 402 and/or damage to magnetic component 402 can be reduced or eliminated. Although gaps are present between the magnetic elements 602 (i.e., gaps that are perpendicular to the x-direction and extend along the y-direction), magnetic fields substantially oscillate parallel to the interfaces defining such gaps. The elimination of gaps in which the magnetic fields oscillate in a direction perpendicular to the interfaces that define the gaps is possible because the magnetic elements 602 can be manufactured with a long length 630 of at least 15 cm or more (e.g., 20 cm or more, 30 cm or more, 40 cm or more, 50 cm or more), corresponding to the length of magnetic component 402 measured in direction 441.

Although six magnetic elements 602 are in the magnetic component 402 of the center diagram in FIG. 5A, it is understood that in general, magnetic component 402 can include any number of elements. In some embodiments, for example, magnetic component 402 can include 1 or more elements (e.g., 2 or more elements, 3 or more elements, 5 or more elements, 10 or more elements, 20 or more elements, 30 or more elements, 50 or more elements, 70 or more elements, 100 or more elements) in array 610.

In some embodiments, the absence of or the reduced number of gaps can lead to a tighter tolerance on an apparatus' self-inductance. The tighter tolerance can mean that apparatuses can be mass-produced, with a small range of variations in properties between different apparatuses. By mass-producing apparatuses with small variations in properties, wireless power transfer systems can be constructed and operate more reproducibly, with less fine-tuning during assembly, leading to reduced manufacturing costs.

In this disclosure, an "outer boundary" of a cross-section refers to a perimeter defined by magnetic elements and dielectric materials (if any) of a magnetic component in the plane of the cross-section. The magnetic component 402 shown in the center of FIG. 5A is schematically depicted as a cross-sectional view in the right-side of FIG. 5A with multiple magnetic elements 602 (more than six elements are depicted for purposes of illustration). The coil 604 wound around the magnetic component 402 is not shown. Coordinate 692 shows the local coordinate of the magnetic elements 602. In this example, magnetic elements 602 are formed into groups 620-623. The z-direction is pointing out of the drawing plane. The cross-section is taken in the x-y plane of local coordinate 692, and has an outer boundary 660. In this example, the outer boundary 660 is a rectangular shape.

FIG. 5B is a schematic diagram of another example of magnetic component 402 including a plurality of magnetic elements. The left-side of FIG. 5B shows a magnetic component 402 including two groups 620 and 621 of multiple magnetic elements 602 with the same dimensions. The separation between magnetic elements 602 and the separation between groups 620 and 621 are schematically drawn with exaggeration. Coordinate 694 shows the local coordinate of the magnetic elements 602. Group 620 is adjacent to group 621 along the z-direction. Although only two groups 620 and 621 are shown, it is understood that many more groups can be included in the magnetic component 402, each of which can include one or more magnetic elements 602.

A coil 604 formed by at least one loop, or a plurality of loops, as shown, of conductive material is wrapped around the magnetic component 402; the loops define a coil axis that is parallel to axial direction 441. Magnetic fields generated by the coil 604 oscillate substantially along the axial direction 441. An average magnetic field of the magnetic component 402 at a given time is oriented along the axial direction 441. In certain embodiments, an angle between the direction of the average magnetic field at a given time and axial direction 441 is 10° or less (e.g., 5° or less, 3° or less, 1° or less).

As in FIG. 5A, there are no gaps between elements 602 where magnetic fields oscillate substantially perpendicular to the interfaces defining the gap. Thus, heating due to magnetic field hot spots is significantly reduced or even eliminated. The magnetic component 402 shown in the left-side of FIG. 5B is schematically depicted as a cross-sectional view in the right-side of FIG. 5B with multiple groups 620-623 (more than two groups are depicted for purposes of illustration). The coil 604 wound around the magnetic component 402 is not shown. Coordinate 695 shows the local coordinate of the magnetic elements 602. The x-direction is pointing out of the drawing plane. The cross-section is taken in the y-z plane of local coordinate 695, and an outer boundary 660. In this example, the outer boundary 660 is a rectangular shape.

Magnetic elements 602 forming the magnetic components 402 described in FIGS. 5A and 5B have a different orientation as indicated by coordinates 692 and 695. In FIG. 5A, magnetic elements 602 are placed adjacent to one another so that their surfaces parallel to the y-z plane are placed side-by-side in the x-direction. The stacking direction of the magnetic elements within a group and the stacking direction of the groups are the same. On the other hand, in FIG. 5B, each of groups 620-623 includes magnetic elements 602 placed adjacent to one another so that their surfaces are parallel to the y-z plane are placed side-by-side in the x-direction. The groups 620-623 also form a row extending in the z-direction. The stacking direction of the magnetic elements within a group is orthogonal to the stacking direction of the groups. Accordingly, in the right-side of FIG. 5B, surfaces of corresponding magnetic elements 602 parallel to the y-z plane also form an array in the z-direction. The two groups 620 and 621 are separated by distance 629 in the Z-direction.

Contoured Magnetic Components

Spatially inhomogeneous local heating of a magnetic component can also occur for reasons other than magnetic hot spot formation in gaps between magnetic elements that form the magnetic component. For example, even though in FIGS. 5A and 5B, magnetic components 402 do not include gaps in which magnetic fields oscillating along the axial direction 441 are perpendicular to interfaces defining the gaps (and may thus lead to magnetic field hot spots in the gaps), magnetic field hot spots may still occur at the outer boundaries of the magnetic components. Such hot spots can occur because magnetic fields follow the path of least magnetic reluctance. For example, in FIGS. 5A and 5B, hot spots can be formed near edges 650 because the windings of coil 604 curve around the edges 650. This leads to a larger overlap between the windings of coil 604 near edges 650 than in regions closer to the center of magnetic component 402, which can provide a higher magnetomotive force near edges 650. As a consequence, the magnetic reluctance is smaller near edges 650, and accordingly, magnetic fields are concentrated at the edges 650.

To address the concentration of magnetic fields at edges 650, the lengths of magnetic elements 602 near edges 650 can be reduced to increase the magnetic reluctance at the edges. As a result, the magnetic reluctance of different magnetic elements 602 of the magnetic component 402 can be controlled, such that the reluctances of different elements are similar to one another. Producing a more uniform magnetic reluctance distribution in magnetic component 402 in this manner leads to the generation of a more uniform magnetic field distribution within the magnetic component 402.

Non-uniform magnetic field distributions within the magnetic component lead to the formation of hot spots, because power is dissipated locally in proportion to the square of the magnetic field amplitude. Moreover, a non-uniform magnetic field distribution increases the loss coefficient of the magnetic component. Both of these effects lead to a reduced quality factor on an apparatus that includes the magnetic component, and can even cause the magnetic component to saturate at lower power levels.

However, these effects can be mitigated by generating a more uniform magnetic field distribution within the magnetic component, as described above. In particular, because power dissipation varies approximately proportionally to the square of the magnetic field amplitude, for a fixed total magnetic flux through a magnetic component, a configuration with a more uniform field distribution will generally exhibit lower losses—and a higher quality factor—than a configuration with a less uniform field distribution. The effect is analogous to the electrical resistance of an electrical conductor, where decreasing the effective cross-sectional area of the conductor leads to higher resistance, for example, due to the skin effect.

Hot spots that occur at the boundaries of the magnetic component reduce the uniformity of the magnetic fields within the magnetic component, which can lead to material saturation and cause local heating and damage to the magnetic elements 602. In addition, as explained above, certain magnetic properties of the elements, such as the magnetic permeability, typically depend on the temperature and magnetic field density within the elements. Accordingly, changes in the temperature and magnetic field density can lead to different magnetic permeability values of the magnetic component formed from the elements, and of the apparatus that includes the magnetic component, which can alter the impedance matching conditions of the system.

The formation of magnetic hot spots at the boundaries of the magnetic component can be visualized by electromagnetic simulations that calculate magnetic field distributions within the magnetic component. FIG. 6A shows a schematic diagram of simulated magnetic field densities for magnetic component 1400, which models the configuration shown in the center of FIG. 5A. In magnetic component 1400, a coil 604 is wound around multiple groups 1404 of multiple magnetic elements, and extends along axial direction 441. Coil 604 is connected to a capacitor 1406. The groups 1404 are arranged in a row extending along a direction perpendicular to axial direction 441. Simulated magnetic field densities within the groups 1404 are shown according to the color scale 1410 for 30 A of current in the coil 604. In this simulation, an anisotropic magnetic permeability is used for the magnetic elements.

As shown in FIG. 6A, regions 1408 and 1409 of magnetic component 1400, which correspond to the end portions (e.g., the boundary regions) of the row of groups 1404, have large magnetic field densities concentrated at the edges. Such large densities can give rise to magnetic field hot spots that can damage magnetic component 1400 by over-heating. In contrast, the dashed arrows 1411 indicate regions of low magnetic field density within magnetic component 1400.

Figure 6B:
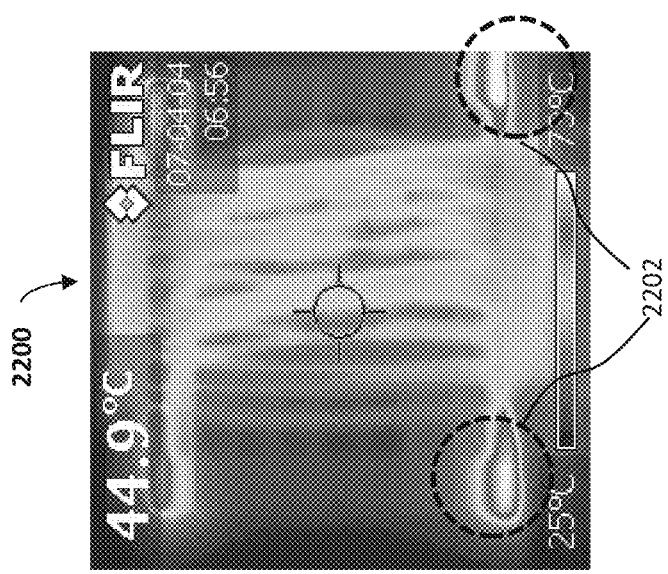
FIG. 6B is an image displaying a measured temperature distribution of a magnetic component.

FIG. 6B is an image 2200 displaying a measured temperature distribution of a surface of the magnetic component shown in the center of FIG. 5A. Image 2200 shows hot spots 2202 at the edges of the magnetic elements at the ends of the row of elements that forms the magnetic component. The hot spots arise from local heating of the edges of the magnetic elements due to higher localized magnetic field densities.

Several approaches can be used to mitigate the heating of the magnetic component by reducing the formation of hot spots at the material's boundaries. In particular, one such approach involves varying the lengths of the magnetic elements that form the magnetic component in the direction of the oscillating magnetic fields. For example, groups 620, 621, 622, and 623 shown in FIG. 5B can modified to form magnetic elements 602 with varying lengths 630. The groups of magnetic elements can be arranged to form a magnetic component for which the induced magnetic fields within the magnetic component are distributed more uniformly compared to the distribution of magnetic fields shown in FIG. 6A.

In general, magnetic components with a wide variety of different contour geometries can be produced by using magnetic elements of different lengths and shapes. The performance of magnetic components formed from such magnetic elements can be analyzed using electromagnetic simulations which calculate the magnetic field distribution within the magnetic component. As an example, FIG. 6C is a schematic diagram showing calculated magnetic field distributions for apparatuses 2460, 2470 and 2480, in which the magnetic components have contoured shapes (e.g., tapered geometries), unlike magnetic component 1400 shown in FIG. 6A. Tapering of magnetic component 402 increases from apparatuses 2460, 2470 to 2480, while at the same time localization of magnetic fields decreases from regions 2462, 2472 to 2482. These simulation results show that by modifying the shape of the magnetic component (and in particular, by tapering the edges of the magnetic component in regions of the magnetic component that are close to the turns of the coil), the formation of magnetic field hot spots at the edges of the magnetic component can be reduced.

Figure 7A:
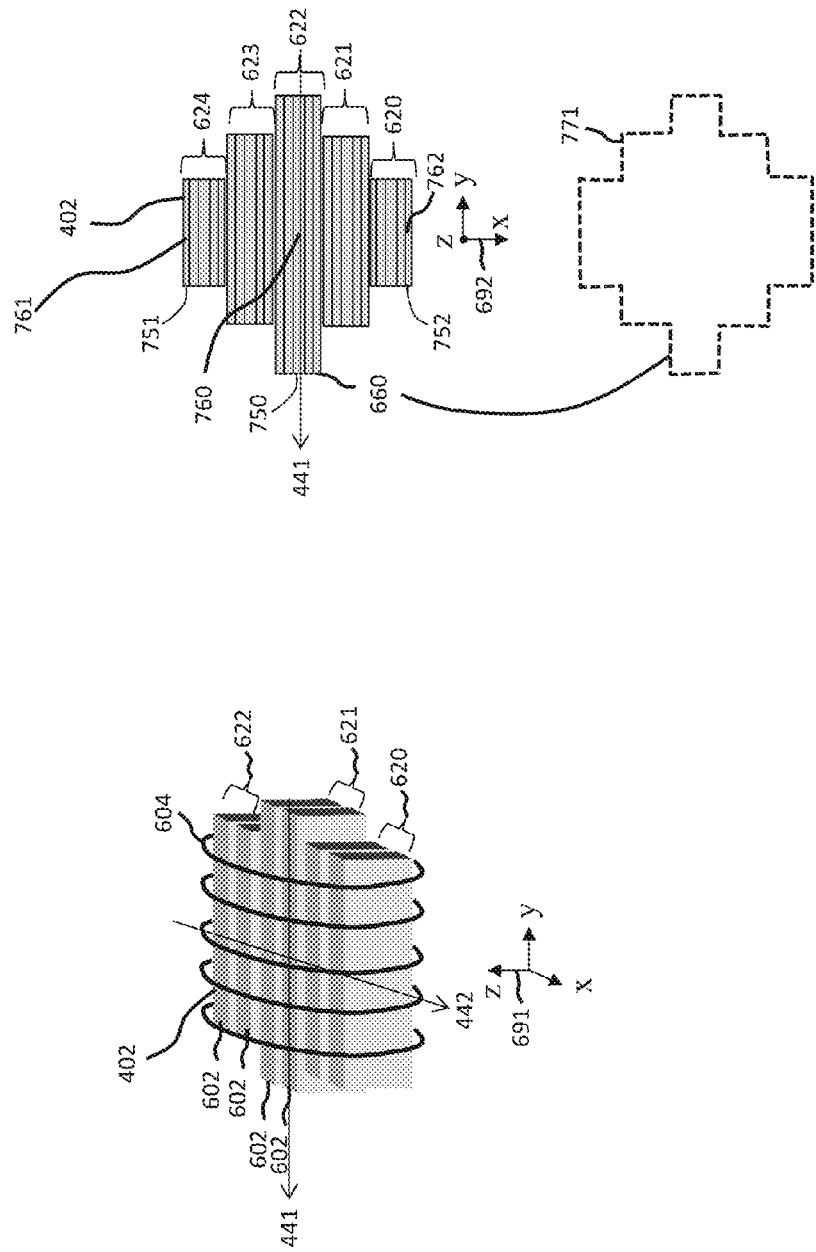
FIGS. 7A and 7B are schematic diagrams of examples of magnetic components.

A wide variety of different magnetic component geometries can be used to reduce magnetic field hot spot formation at the edges of the material (e.g., proximal to the coil turns). FIG. 7A is a schematic diagram of an example of another magnetic component 402 including a plurality of magnetic elements. The left-side of FIG. 7A shows a magnetic component 402 including groups 620-622, each having at least one magnetic element 602. Coordinate 691 shows the local coordinate of the magnetic elements 602. The groups 620-622 are arranged side-by-side along the x-direction. Although only three groups, each having two magnetic elements 602 are shown, any group can have more than two magnetic elements 602. Further, more than three groups can be included in the magnetic component 402.

Coil 604 is wrapped around the magnetic component 402 and extends along axial direction 441. The coil 604 can be formed of a conductive material and can include a plurality of loops defining an internal region that extends along the axial direction 441. The magnetic component 402 is positioned in the internal region and extends in both the axial direction 441 and in a direction 442 perpendicular to the axial direction 441. In this example, the direction 442 is parallel to the x-direction.

In the configuration illustrated in the right-side of FIG. 7A, magnetic fields generated by the coil 604 oscillate substantially along the axial direction 441. An average magnetic field at a given time of the magnetic component 402 is generated substantially along the axial direction 441 (e.g., within 1°, within 3°, within 5°, within 10° of axial direction 441). As in FIG. 5A, there is no gap where magnetic fields oscillate in a direction substantially perpendicular to interfaces defining the gap. Thus, heating or damaging effects due to magnetic field hot spots within such gaps do not occur.

The right-side of FIG. 7A shows a top view of the magnetic component 402 (e.g., along the z-direction) shown in the left-side of FIG. 7A, which includes multiple groups 620-624 of magnetic elements (each group including multiple magnetic elements 602). Coil 604 is not shown. Coordinate 692 shows the local coordinate of the magnetic elements 602. Magnetic component 402 has a stepped cross-sectional profile with an outer boundary 660 in the x-y plane, as shown in FIG. 7A. In this example, magnetic elements in different groups have different lengths 630.

The multiple magnetic elements 602 included in groups 620-624 are arranged in a row extending along the x-direction perpendicular to axial direction 441. Magnetic element 750 with the longest length 630 among the elements 602 is positioned at a center 760 of the row. Magnetic elements 751 and 752 with the shortest lengths 630 among the elements 602 are positioned at ends 761 and 762, respectively, of the row. The magnetic elements 620 are arranged symmetrically with respect to axis 441, which passes through the center 760 of the magnetic component. In this example, the magnetic component has mirror symmetry about center 760.

Compared to the examples shown in FIG. 5A, the lengths 630 of magnetic elements 602 in some of the groups 620-624 are different than the lengths of the magnetic elements in other groups. As discussed above, by using groups of magnetic elements of different lengths measured in direction 441, the uniformity of the magnetic field distribution induced by coil 604 in the magnetic component can be increased because the different lengths 630 can lead to an overall more uniform path of magnetic reluctance. As discussed above in connection with FIG. 5A, the windings of coil 604 have a larger overlap with magnetic component 402 at edges 650 than at the center of magnetic component 402 because the coil 604 curves over the edges 650. This can lead to a variation of the magnetic reluctance at the edges compared to the center of magnetic component 402. By varying lengths of different magnetic elements, the distribution of magnetic reluctance can be adjusted so as to make it become more uniform, which in turn allows the magnetic field to be distributed more uniformly over the different magnetic elements with varying lengths.

Figure 7B:
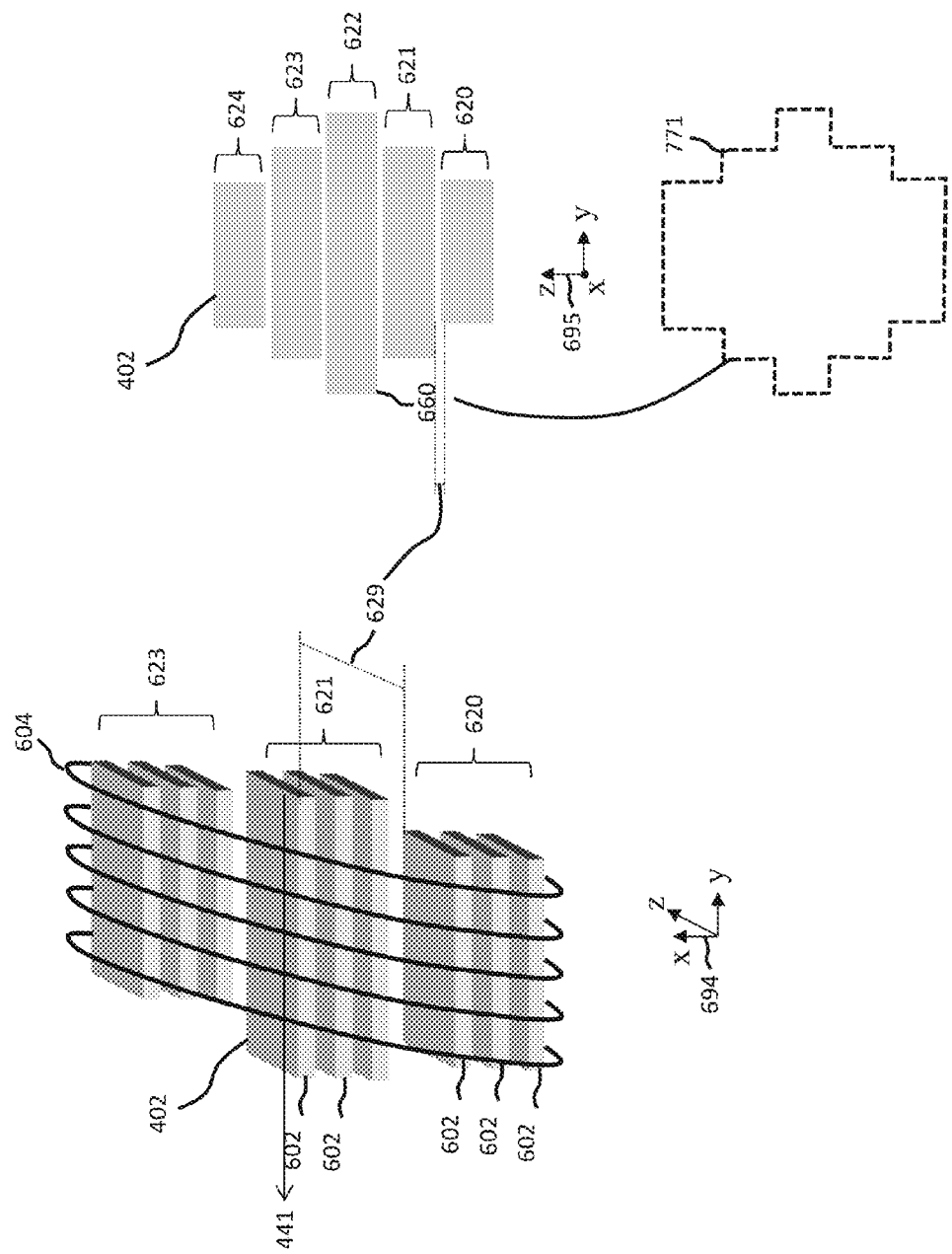

FIG. 7B is a schematic diagram of another example of a magnetic component 402. Magnetic elements 602 forming the magnetic components 402 described in FIGS. 7A and 7B have a different orientation as indicated by coordinates 692 and 695. In FIG. 7A, magnetic elements 602 are placed adjacent to one another so that their surfaces parallel to the y-z plane are placed side-by-side in the x-direction. In the left-side of FIG. 7B, each of groups 620-622 includes magnetic elements 602 that are placed adjacent to one another so that their surfaces parallel to the y-z plane are positioned side-by-side in the x-direction. The groups 620-622 are stacked in a row, which extends in the z-direction. The two groups 620 and 621 are separated by distance 629 in the Z-direction.

The left-side of FIG. 7B shows magnetic component 402 including three groups 620-621 of magnetic elements 602. Within each group, all of the magnetic elements 602 have the same dimensions. Coordinate 694 shows the local coordinate of the magnetic elements 602. The groups 620-621 are stacked in a row which extends along the z-direction. Although only three groups, each having three magnetic elements 620 are shown, generally, a group can include one or more magnetic elements. The separation between magnetic elements 602 and the separation between groups 620 and 621 are schematically drawn with exaggeration. Moreover, the magnetic component 402 can include two, three, or more than three groups. The features and manner of operation of coil 604 are generally the same as described previously in connection with similar embodiments. The contoured shape of magnetic component 402 can reduce heating and/or damage due to magnetic field hot spots in a similar manner described in relation to FIG. 7A.

The right-side of FIG. 7B shows a top view (along the x-direction) of a magnetic component 402 that includes multiple groups 620-624 of magnetic elements 602. The coil 402 wound around the magnetic component 402 is not shown. Coordinate 695 shows the local coordinate of the magnetic elements 602. Magnetic component 402 has a stepped cross-sectional profile in the y-z plane of local coordinate 695, as indicated by the outer boundary 660 of the stepped cross-sectional profile 771.

Compared to the examples shown in FIG. 5B, the multiple groups 620-624 shown in FIG. 7B have different lengths 630 of magnetic elements 602 in different groups. As discussed above in connection with FIG. 7A, by using groups of magnetic elements of different lengths measured in direction 441, the uniformity of the magnetic field distribution induced by coil 604 in the magnetic component can be increased.

Figure 7C:
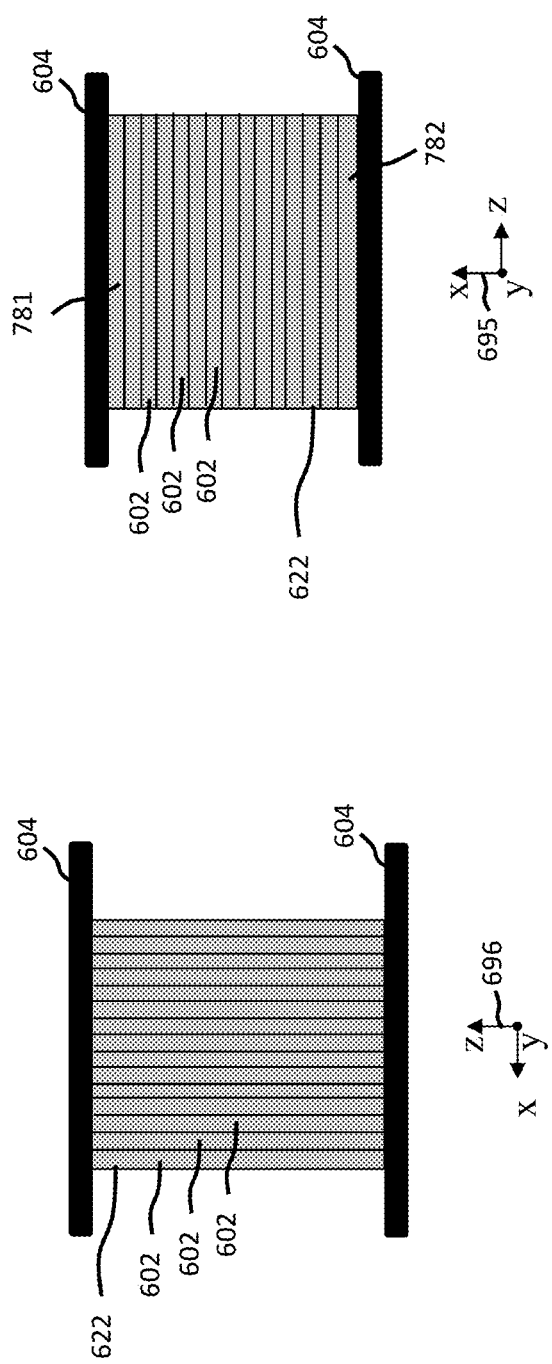
FIG. 7C is a schematic diagram showing a portion of the arrangements shown in FIGS. 7A and 7B.

In some wireless power transfer applications, it may be advantageous to utilize the orientation of magnetic elements 602 as described in FIG. 7A instead of the orientation described in FIG. 7B. This is because the embodiment shown in FIG. 7A can have a more uniform magnetic field distribution within a given group than the embodiment shown in FIG. 7B. To illustrate this, FIG. 7C shows a schematic diagram of a portion of magnetic element group 622 (in FIG. 7A) and of a portion of magnetic element group 642 (in FIG. 7B). In FIG. 7C, group 622 includes fifteen magnetic elements 602. The number of elements 602 are chosen for illustrative purposes only, and differ from the number of elements 602 in FIG. 7A. The local coordinate 696 and portions of coil 604 are also shown. Magnetic fields generated by oscillating currents of the coil 604 oscillate along the y-direction pointing out of the drawing plane. In this configuration, magnetic fields of similar strength can be present within each of the fifteen magnetic elements 602.

Group 622 in FIG. 7C also includes fifteen magnetic elements 602. As for group 622, the number of elements 602 are chosen for illustrative purposes only, and differ from the number of elements 602 in FIG. 7B. The local coordinate 695 and portions of coil 604 are also shown. Magnetic fields generated by oscillating current of the coil 604 oscillate along the y-direction pointing out of the drawing plane. In this configuration, larger magnetic fields are present in top magnetic element 781 and bottom magnetic elements 782 than in the other magnetic elements within group 622 due to a larger magnetomotive force at locations corresponding to the top and bottom magnetic elements 781 and 782. Hence, in contrast to group 622 in FIG. 7A, group 622 in FIG. 7B has a relatively non-uniform magnetic field distribution throughout its magnetic elements 602. On the other hand, in the left side of FIG. 7C, the magnetomotive force is more evenly distributed over different magnetic elements 602 compared to the right side of FIG. 7C.

For certain applications, the configuration of group 622 in FIG. 7A can be advantageous because its relatively uniform magnetic field distribution may result in a reduction of the formation of magnetic field hot spots at the edges of the magnetic component, and thereby decrease the possibility of damaging the magnetic elements 602. Moreover, the configuration of group 622 in FIG. 7A can yield a magnetic component with a higher value of quality factor contributed by magnetic component $Q_\mu$ (described later) than a magnetic component constructed from magnetic elements arranged as shown in group 622 in FIG. 7B, because the induced magnetic field is spread over a larger number of magnetic elements compared to the configuration of the group 722 in FIG. 7B. As mentioned earlier, a more uniform magnetic field distribution typically yields a higher quality factor compared to a less uniform field distribution.

Generally, in the embodiments disclosed herein, a magnetic component can include magnetic elements which have different lengths, different thicknesses, curved edges, straight edges, and which are joined using a variety of different methods. The magnetic elements can be arranged in a variety of ways so that a coil can generate a uniform distribution of magnetic fields within the magnetic component. By generating a uniform field distribution, the occurrence of hot spots at edges of the magnetic component can be reduced or even eliminated.

The embodiments shown in FIGS. 7A and 7B have magnetic components with cross-sectional shapes for which the outer boundary 660 has a stepped cross-sectional profile 771 due to the different lengths of magnetic elements used to form the magnetic components. The profile 771 leads to a more uniform magnetic field distribution within the magnetic component compared to the magnetic component shown in FIG. 5A, reducing the formation of hot spots at edges of profile 771, in contrast to edges 650 in FIG. 5A.

Figure 8A:
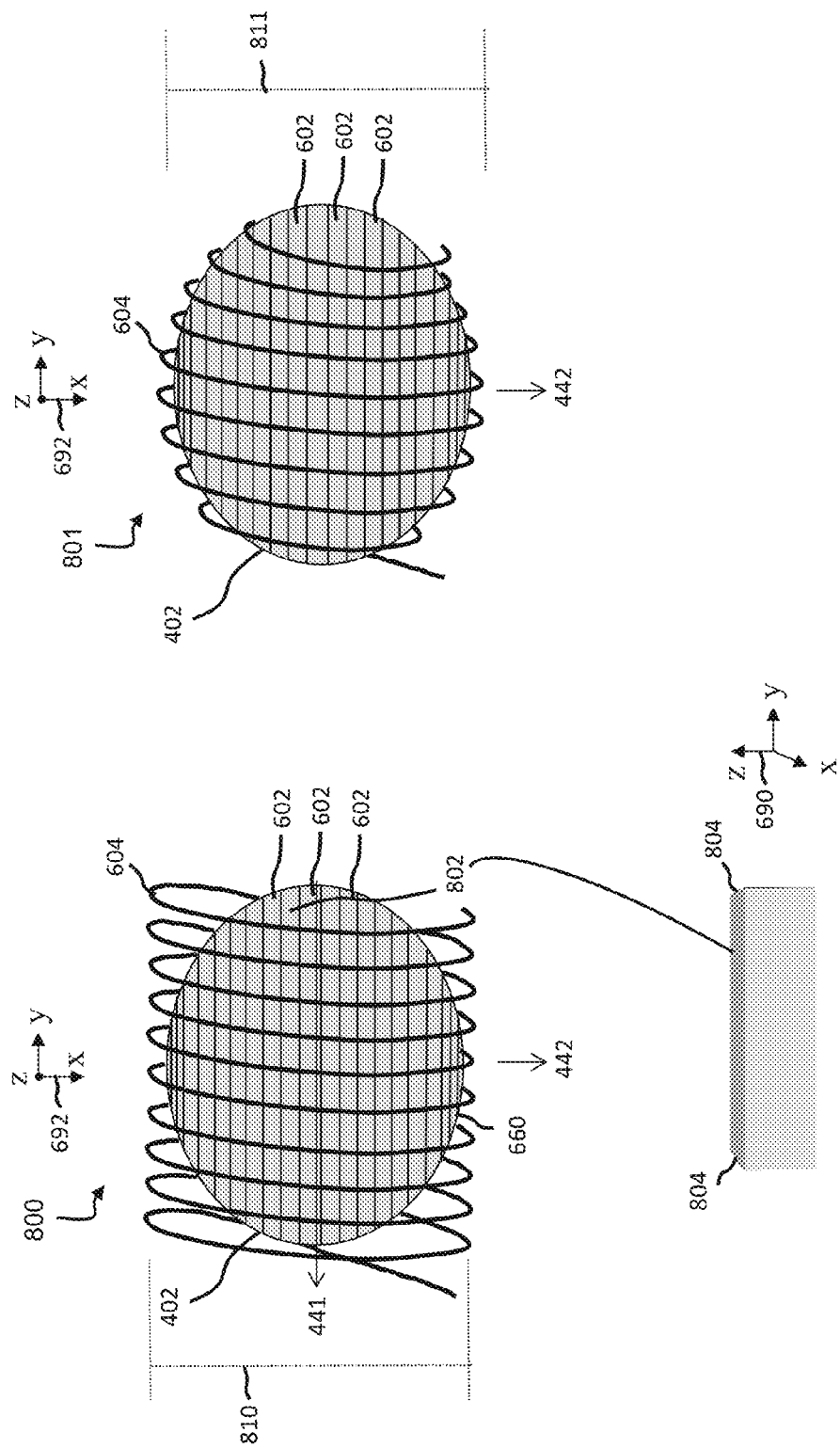

In addition to magnetic components having cross-sectional shapes that correspond to diamond shapes (e.g., stepped diamond shapes), magnetic components with other cross-sectional shapes can also be used to achieve more uniform magnetic field distributions within the materials. FIG. 8A shows schematic diagrams of a magnetic component 402. The left-side of FIG. 8A shows the magnetic component 402 including multiple magnetic elements 602 and a coil 604 extending along axial direction 441. The magnetic elements 602 are shaped and arranged such that the magnetic component 402 has a cross-sectional shape with an outer boundary 660 having an oval shape in the x-y plane.

The magnetic elements 602 in FIG. 8A can have similar shape and local coordinate 690 as described in relation to FIG. 5A. But in contrast to FIG. 5A, the magnetic elements 602 in FIG. 8A can have varying lengths compared one another. Also, each magnetic element 602 in FIG. 8A can have curved end surfaces and therefore differs in shape from a rectangular cuboid. To illustrate this, the lower left-side of FIG. 8A shows a magnetic element 802 (e.g., which can correspond to any of magnetic elements 602 in the oval magnetic component). The magnetic element 802 has a shape that corresponds substantially to a rectangular cuboid, but with curved surfaces 804 on two sides of the cuboid. The surfaces 804 are curved to conform to the oval shape of the outer boundary 660, which has a smooth curved profile. In other words, the magnetic element 802 does not have six planar surfaces but includes two curved surfaces 804.

Coordinate 690 shows the local coordinate of the magnetic element 802. Other magnetic elements 602 in magnetic component 402 have their own respective curved surfaces so that when they are assembled to form the oval shape of the outer boundary 660 depicted in the left-side view of FIG. 8A.

In some embodiments, the oval shape can be obtained by polishing the sides of the assembled magnetic elements 602. Alternatively, the oval shape can be obtained by polishing individual magnetic elements 602 before assembling the magnetic component 402 from the elements. In certain embodiments, it may be unnecessary to polish the edges of magnetic elements 602 to have smooth edges. As such, the oval shape of the outer boundary 660 may not have a smooth contour but can have stepped portions defined by the edges of magnetic elements 602.

Generally, the outer boundary 660 can have a wide variety of different curved shapes. For example, in some embodiments, outer boundary 660 or a portion thereof corresponds to a curved shape that can be described by a polynomial function. In some embodiments, the outer boundary 660 or a portion thereof corresponds to a curved shape that can be described by an elliptical function, a circular function, a hyperbolic function, or a parabolic function. In certain embodiments, the outer boundary 660 can have a compound curved shape that includes two or more differently-curved portions. For example, the left-side view of FIG. 8B illustrates a magnetic component 402 with an the outer boundary 660 with a first curved portion 881 (thinner line) described by an elliptical function, which is connected to a second curved portion 882 (thicker line) described by a parabolic function. In certain embodiments, the magnetic components can have a three-dimensional ellipsoidal shape. The right-side view of FIG. 8B illustrates a magnetic component 402 with a three-dimensional ellipsoidal shape in Cartesian coordinates (unlabeled). In embodiments, the application for the wireless energy transfer system may factor into the shape of the outer boundary of the magnetic component.

In some embodiments, outer boundary 660 can include both straight and curved segments, including any of the different straight and curved segments disclosed herein. Moreover, in certain embodiments, outer boundary 660 can have an irregular shape.

In some embodiments, outer boundary 660 can be symmetric. For example, outer boundary 660 can have inversion symmetry about a central point of the magnetic component. As another example, outer boundary 660 can be symmetric with respect to reflection about one or more axes, and/or symmetric with respect to rotation about an axis (e.g., an axis extending through a center of symmetry of the magnetic component in a direction perpendicular to a plane of the magnetic component). In certain embodiments, outer boundary 660 is not symmetric about a particular point or axis.

In some embodiments, the spacing and diameter of the coil 604 can be varied to achieve a more uniform magnetic field distribution within a magnetic component 402, thereby reducing hot spot formation near the edges of the magnetic component. In certain embodiments, apparatus 801 can have its coil 604 wound around magnetic component 402 such that coil 604 conforms to the shape of magnetic component 402 as shown in the right-side of FIG. 8A. By having coil 604 wound close to the outer contours of magnetic component 402, the volume occupied by magnetic component 402 and coil 604 can be reduced relative to embodiments in which the coil does not conform to the shape of the magnetic component.

By way of illustration, on the left-side of FIG. 8A, the coil 604 is wound around the magnetic component 402 to form a power transmitting apparatus 800. In this example, a diameter 810 of the coil 602 is constant along the y-direction of coordinate 692. In some embodiments, the coil 402 is wound around a support structure (not shown), which contains the magnetic component 402. Such a configuration may allow easy manufacturing of the apparatus 800.

On the other hand, the right-side of FIG. 8A shows a coil 604 wound around the magnetic component 402 to form a power transmitting apparatus 801. A diameter 811 of the coil 604 varies along the y-direction of coordinate 692, such that coil 604 conforms more closely to the cross-sectional shape of magnetic component 402 in the embodiment on the right side of FIG. 8A than in the embodiment on the left side of FIG. 8A.

In some embodiments, the coil 604 can be wound directly on and contact the magnetic component 604 without a support structure in between. This approach may allow the apparatus 801 to have a smaller volume and reduced manufacturing costs relative to apparatus 800 for the same size of magnetic component 402. In some other embodiments, the coil 604 can be wound around a support structure (not shown), which conforms to the shape of magnetic component 402 and guides the coil 604 around the magnetic component 402.

FIG. 9A is a schematic diagram showing four example magnetic components 402a-d, each including a plurality of magnetic elements 602 stacked along the x-direction of coordinate 692.

Magnetic component 402a in the upper left portion of FIG. 9A has a diamond-shaped cross-sectional shape in the x-y plane with an outer boundary 660. The diamond shape can be achieved, for example, by polishing or cutting the sides of each magnetic element 602 to conform to a continuous diamond-shaped boundary formed by adjacent edges of the magnetic elements. The diamond-shaped profile can have a smooth linear profile. Alternatively, in some embodiments, outer boundary 660 can correspond to a stepped diamond-shaped profile formed by adjacent edges of magnetic elements 602, each of which has a different length to generate a stepped profile such as outer boundary 660 depicted in FIG. 9B.

Referring back to the upper left portion of FIG. 9A, a coil (not shown) is wound around the magnetic component 402a and extends along axial direction 441. The coil can include loops of approximately constant diameter, or alternatively, can include loops of varying diameter to conform to the shape of magnetic component 402a, as discussed above.

Direction 442 is parallel to the x-direction and is perpendicular to the axial direction 441. The maximum dimension of magnetic component 402a measured in direction 442 varies along the axial direction 441. For example, at location 910, the magnetic component 402 has a maximum dimension 920 measured in the direction 442. At location 911, the magnetic component 402 has a maximum dimension 921 measured in the direction 442. The examples shown in FIGS. 7A, 7B, and 8 also include magnetic components 402 for which the maximum dimension measured in direction 442 varies along axial direction 441.

The upper-right side of FIG. 9A shows a cross-sectional view of magnetic component 402b in the x-y plane. The cross-sectional shape of magnetic component 402 has an outer boundary 660 in the shape of a hexagon. In some embodiments, the hexagon shape is achieved by polishing or cutting sides of each of the magnetic elements 602 to conform to a continuous hexagonal shape.

Alternatively, in some embodiments, the outer boundary 660 does not have a smooth contour portion but instead has a stepped profile defined by the edges of magnetic elements 602. A schematic cross-sectional view of such a magnetic component labeled as 402d is shown in the lower-right portion of FIG. 9A. Magnetic component 402d has a cross-sectional shape with an outer boundary 660 having a stepped hexagonal profile. In each magnetic components 402a, 402b, and 402d (and also 402c), the maximum dimension of magnetic component 402 measured in direction 442 varies along axial direction 441.

The lower-left side portion of FIG. 9A shows a schematic cross-sectional diagram of magnetic component 402c in the x-y plane. The cross-sectional shape of magnetic component 402c has an outer boundary 660 with a bow-tie shaped profile. In some embodiments, the bow-tie shape is achieved by polishing or cutting sides of each magnetic elements 602 to conform to a bow-tie shape with smooth profile formed by edges of the magnetic elements that form a continuous, rather than stepped, boundary. Alternatively, in some embodiments, the bow-tie shape of the outer boundary 660 has a stepped profile defined by the edges of magnetic elements 602. Such an example is shown in FIG. 9C, where outer boundary 660 has a stepped bow-tie shaped profile.

Referring back to the lower-left side portion of FIG. 9A, the maximum dimension of magnetic component 402c measured in direction 442 varies along axial direction 441. For example, at location 912, the magnetic component 402c has a maximum dimension 922 measured in direction 442. At location 913, the magnetic component 402c has a width corresponding to dimension 923 or dimension 924. For magnetic component 402c which is symmetric about axis 441, dimensions 923 and 924 are same and so the maximum dimension measured at location 913 in direction 442 is either dimension 923 or 924. If dimensions 923 and 924 were not the same, the larger of dimensions 923 and 924 would correspond to the maximum dimension of magnetic component 402c measured at location 913 in direction 442.

The magnetic component 402c includes multiple magnetic elements 602 arranged in a row along direction 442. In this example, the magnetic elements 602 are arranged such that magnetic elements with the longest length 630 among the elements are positioned at the ends of the row. The magnetic element with the shortest length 630 among the elements is positioned at the center of the row.

Generally, a magnetic component can have edges that form a variety of shapes of the magnetic component. For example, the variety of shapes can be described by a various shapes of an outer boundary of the magnetic component. The shapes can be cylindrical or spherical. In some embodiments, the edges can curved so that the magnetic component has a portion with an arc, concave and/or convex shape. In certain embodiments, the magnetic component has curved edges described by exponential, hyperbolical, parabolical, and/or polynomial functions, or a combination thereof. The curved edges may have irregular shapes that can be described by discontinuous functions. In certain embodiments, edges of the magnetic component can have zig-zag edges.

In some embodiments, a magnetic component can have a symmetric shape. For example, the examples shown in FIG. 9A have mirror symmetries with respect to the x-y plane and the y-z plane. In certain embodiments, the magnetic component can have an asymmetric shape. For example, variants of the examples shown in FIG. 9A can have asymmetry in any of the x-, y- and z-directions. For example, the shape of the magnetic component can be different above the x-y plane (in the positive z-direction) and below the x-y plane (in the negative z-direction.)

In certain embodiments, the variety of shapes and curved edges described above can be achieved by arranging magnetic elements with varying lengths to form a magnetic component.

To form magnetic components from a plurality of elements, the elements can be positioned so that they directly contact one another. In some embodiments, a dielectric material such as an adhesive can be used to bond the different magnetic components together. Examples of dielectric materials that can be used include Kapton or Teflon. The dielectric materials can include one or more adhesive materials such as glue, tape plastic, epoxy, and foam. For example, materials such as Kapton® and Teflon® can be used to hold the elements together.

In certain embodiments, it can be advantageous to use a dielectric material with high thermal conductivity placed between the different magnetic elements, so that the dielectric material can facilitate the dissipation of heat generated by oscillating fields within the magnetic elements. In particular, heat generated in the magnetic elements located in a central region of the magnetic component can be transported to magnetic elements located toward the outer edges of the magnetic component (e.g., at the ends of the row of magnetic elements). One or more heat sinks can be used to receive heat from the magnetic elements at the ends of the row, thereby reducing the overall temperature of the magnetic component during operation. This can mitigate possible damage to the magnetic elements from over-heating. As an example, FIG. 9D is a schematic diagram showing heat sinks 981 positioned on sides of magnetic component 402b and heat sink 982 positioned adjacent to the magnetic component 402 so that heat sink 982 contacts multiple element 602. The heat sinks 981 and 982 can contain coolant that can transfer heat out of the magnetic component 402b.

In the foregoing discussion, many of the magnetic components disclosed are fabricated from magnetic elements formed of one or more nano crystalline magnetic materials, which can be produced in long lengths. By producing such materials in long lengths (e.g., as "ribbons"), magnetic components can be fabricated and oriented with respect to a coil such that there are no gaps in the magnetic component defined by interfaces that are perpendicular to the direction of magnetic field oscillation within the magnetic component. This structural configuration and orientation can reduce or eliminate magnetic field hot spots that might otherwise form within gaps between the elements.

By contouring the magnetic components, the occurrence of hot spots at the boundaries of the magnetic component, particularly in the vicinity of sharp coil turns, can be reduced. However, the use of contoured magnetic components is not restricted only to magnetic components fabricated from element formed from nanocrystalline substances. Magnetic components formed from a variety of other materials such as ferrites (e.g., MnZn based ferrites, NiZn based ferrites) can have contoured cross-sectional shapes, including any of the shapes disclosed herein, to reduce hot spot formation at the edges of the materials. MnZn based ferrites can include a $Mn_xZn_{1-x}Fe_2O_4$ where x ranges from 0.1-0.9. For example, x can be 0.2-0.8. NiZn based ferrites can include a $Ni_xZn_{1-x}Fe_2O_4$ ferrite where x ranges from 0.1-0.9. For example, x can be in a range of 0.3-0.4. In some embodiments, magnetic components can include NiZn based ferrites such as NL12® from Hitachi and 4F1® from Ferroxcube, for example, for operation frequencies of 2.5 MHz or above. In certain embodiments, magnetic components can include MnZn based ferrites such as ML90S® from Hitachi, for example, for operation frequencies between 500 kHz and 2.5 MHz. In some embodiments, magnetic components can include MnZn based ferrites such as PC95® from TDK, N95®, N49® from EPCOS and ML24D® from Hitachi, for example, for operation frequencies of 500 kHz or lower. In certain embodiments, magnetic components can include amorphous cobalt-based alloys and nanocrystalline alloys, for example, for operation frequencies of 100 kHz or lower.

In certain embodiments, magnetic element 602 can have a magnetic anisotropy, where the magnitude and/or direction of the magnetic field induced within magnetic element 602 by an externally applied magnetic field depends on the direction of the externally applied magnetic field. In some embodiments, the magnetic anisotropy can arise due to the structural shape of the magnetic element 602. For example, a magnetic element 602 having a relatively large length 630 and a relatively small thickness 634 can have an anisotropic magnetic permeability that arises from the high aspect ratio of the element. Thus, without wishing to be bound by theory, a thickness 634 that is smaller than length 630 by more than a factor of 10 (e.g., more than a factor of 20, more than a factor of 30) can lead to an anisotropic response of magnetic element 602, because the magnetic reluctance of the element in the direction of its length 630 may be smaller than magnetic reluctance in the direction of its thickness 634. This difference in magnetic reluctance of the element in the two directions arises because the magnetic flux along the length 630 is uninterrupted, whereas the flux along the thickness 634 is interrupted within a characteristic distance of the material from which the element is formed. Where magnetic component 402 is formed from one or more anisotropic magnetic elements 602, magnetic component 402 can also be magnetically anisotropic due to the structure of the material, i.e., due to the formation of the material from a plurality of magnetic elements with air gaps between them. Anisotropic magnetic components with magnetic reluctances that vary according to direction within the material contribute to hot spot formation that arises due to non-uniform magnetic field distributions, as described earlier. As disclosed herein, by varying the lengths of different magnetic elements within a magnetic component, the magnetic reluctance of the different elements can be adjusted, which in turn can yield a more uniform magnetic field distribution within the material, mitigating the effects of structure-induced anisotropy in the magnetic component.

In some embodiments, the bulk material from which the magnetic element 602 is formed may have intrinsic magnetic anisotropy. The intrinsic magnetic anisotropy can be introduced during fabrication of the magnetic element by applying a strong magnetic field to align magnetic domains (i.e., a magnetic poling process) of the nanocrystalline magnetic material during the annealing process. Generally, an anisotropic magnetic component has magnetic permeability tensor. In some embodiments, the anisotropic magnetic component can be arranged so that the generated magnetic fields point in the direction corresponding to the largest component of the magnetic permeability tensor so as to effectively enhance induced magnetic fields. The adjustment of magnetic reluctance within individual magnetic elements by varying the lengths of the elements can be used to mitigate hot spot formation due to the intrinsic anisotropy of the elements, as well as due to the formation of the magnetic component from a plurality of magnetic elements (whether or not those elements individually have magnetic anisotropy).

EXAMPLES

The methods, apparatus, and systems described herein are further illustrated by way of the following examples, which do not limit the scope of the disclosure.

Figure 13:
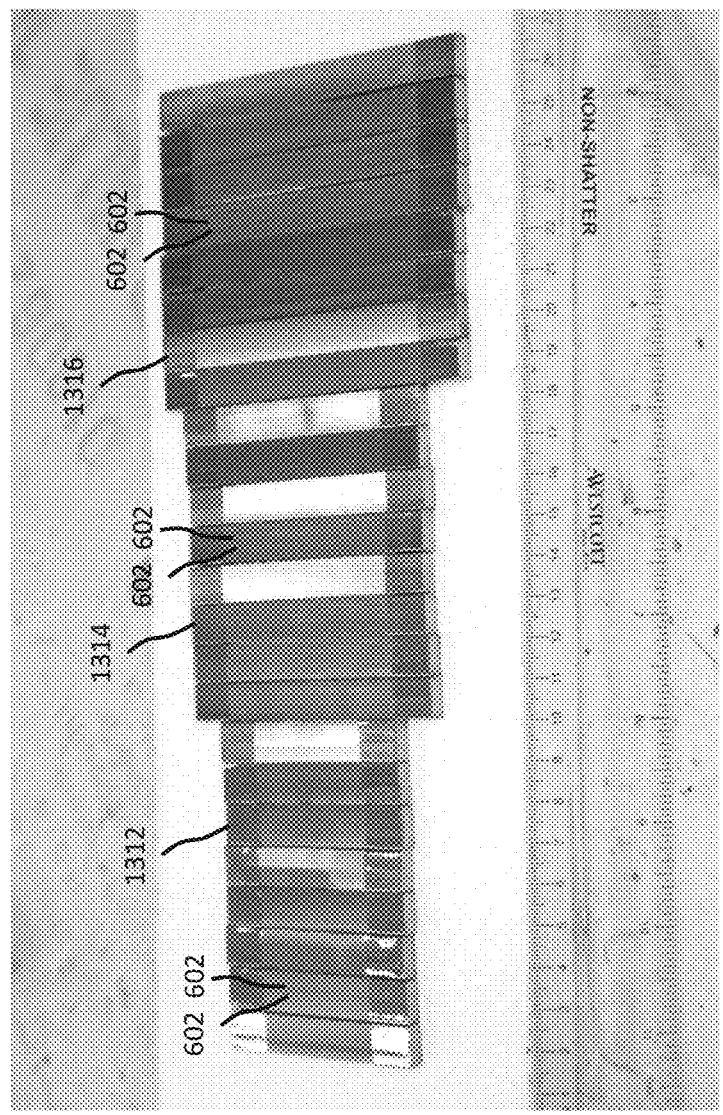
FIG. 13 is an image showing a plurality of magnetic elements.

FIG. 13 is an image of magnetic elements 602 grouped according to their lengths. The elements of group 1312 have a size of 60×10×5 mm, the elements of group 1314 have a size of 80×10×5 mm, and the elements of group 1316 have a size of 100×10×5 mm. That is, group 1312 includes multiple elements with a length of 60 mm, group 1314 includes multiple elements with a length of 80 mm and group 1316 includes multiple elements with a length of 100 mm. Each group can, in general, include any number of magnetic elements. For example, a group of magnetic elements can include at least 2 elements (e.g., at least 3 elements, at least 4 elements, at least 5 elements, at least 10 elements, at least 20 elements, at least 30 elements). Various groups of elements can be used to form a wide variety of magnetic components, including the magnetic components shown in FIGS. 5A-9. Coordinate 697 indicates the orientation of the magnetic elements 602 in relation to FIGS. 5A-9.

Figure 14:
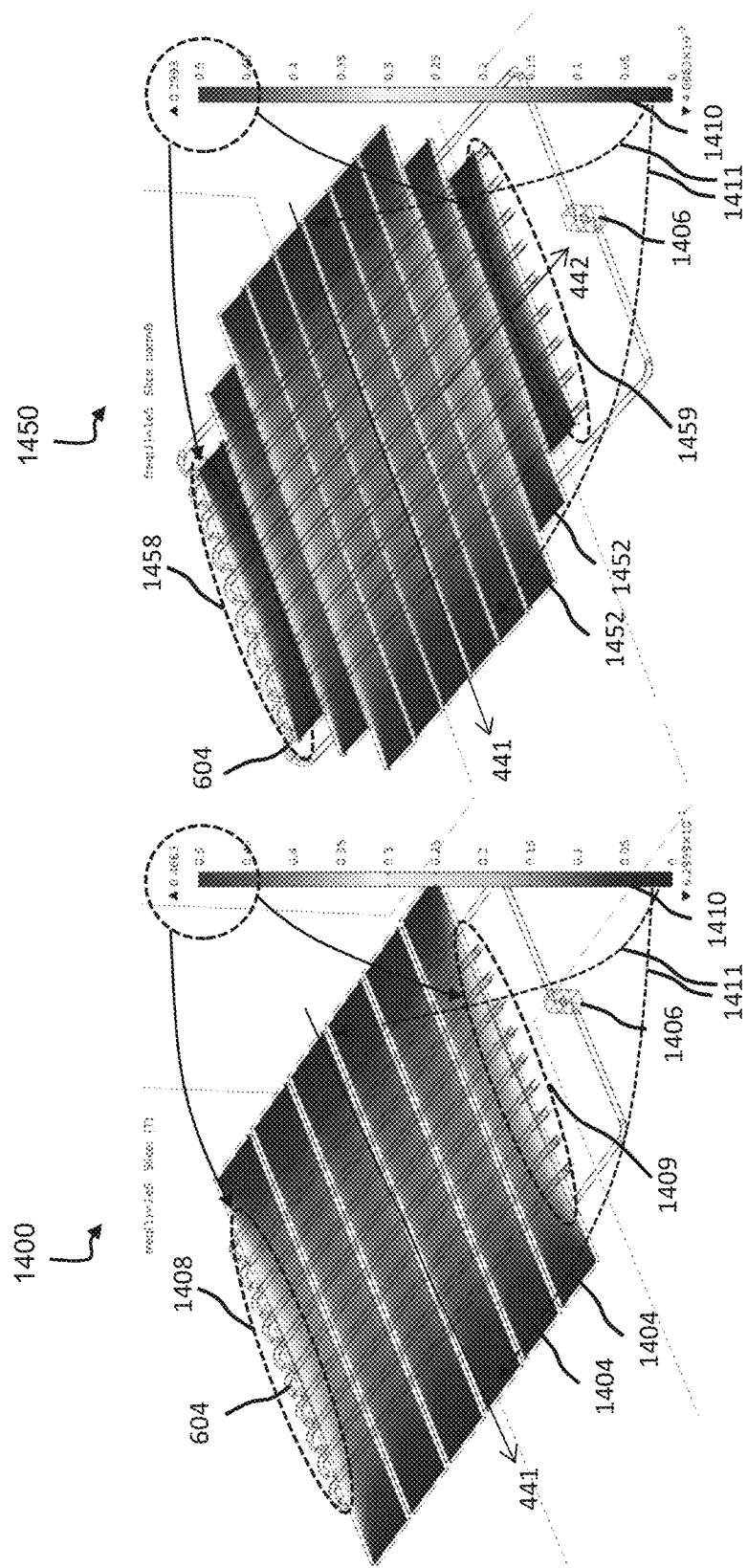
FIG. 14 is a schematic diagram showing simulated magnetic field densities for two different magnetic components.

The performance of magnetic components having a wide variety of different shapes and sizes and formed from magnetic elements such as those shown in FIG. 13 can be analyzed using electromagnetic simulations. FIG. 14 shows schematic diagrams of simulated magnetic field densities for two magnetic components 1400 and 1450. Magnetic component 1400 was described previously in connection with FIG. 6A. As mentioned, for magnetic component 1400, and particularly in regions 1408 and 1409 of the component which correspond to end portions of the row of groups 1404, large magnetic field densities occur at the edges of the material. Such large magnetic field densities can give arise to magnetic field hot spots that can damage magnetic component 1400 due to local heating within the component. In some embodiments, large magnetic field densities can damage resonators (e.g., source resonator, device resonator) or other elements of the system. In contrast, the dashed arrows 411 indicate regions of comparatively low magnetic field density within the magnetic component.

The effect of introducing a contoured magnetic component is shown on the right hand side of FIG. 14. In magnetic component 1450, a coil 604 is wound around multiple groups 1452, each of which includes multiple magnetic elements that extend along (and have lengths measured in the direction of) axial direction 441. The groups 1452 are arranged in a row that extends along direction 442, perpendicular to axial direction 441.

In contrast to magnetic component 1400, groups 1452 have varying lengths in the axial direction 441. Accordingly, magnetic component 1450 has a maximum dimension measured in direction 442 that varies along the axial direction 441. Simulated magnetic field densities within the groups 1452 are shown as color densities according to scale 1410. The dashed arrows 411 indicate the regions of low magnetic field density. Comparing regions 1408, 1409, 1458, and 1459, it is evident that in regions 1458 and 1459, the magnetic field density is smaller at the edges of the magnetic component. This is because the varying lengths of groups 1452, which yield a magnetic component having tapered edges, allow a more uniform magnetic field distribution to be generated by coil 604 in the magnetic component, thereby reducing hot spot formation at the material's edges.

Figure 15:
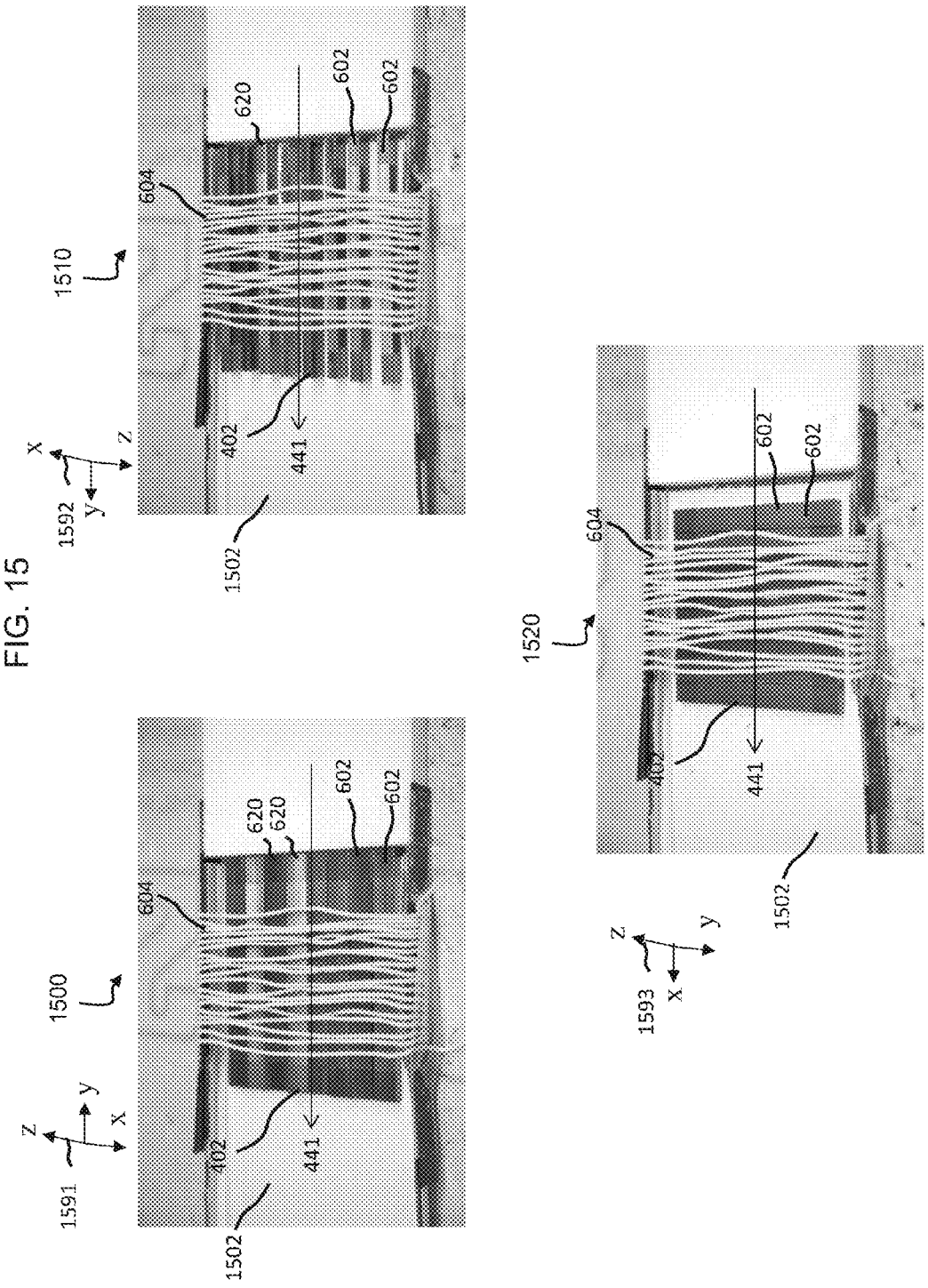
FIG. 15 is a series of images of different magnetic components, each featuring a plurality of magnetic elements.

FIG. 15 shows images of various magnetic components formed by groups of magnetic elements and by individual magnetic elements, such as those shown in FIG. 13. Apparatus 1500 includes a coil 604 wound around a Teflon support 1502, which supports a magnetic component 402. The coil 604 extends along axial direction 441. The orientation of the magnetic elements is indicated by coordinate 1591 which is the local coordinate described in relation to FIG. 5A. For apparatus 1500, the x- and y-direction is parallel to a plane where support 1502 lies. The z-direction is perpendicular to the plane where support 1502 lies. The orientation of the magnetic elements in apparatus 1500 is sometimes referred as a "canonical orientation," which corresponds to the orientation of magnetic elements described in relation to FIG. 6A.

Apparatus 1510 includes a coil 604 wound around a support 1502 (e.g., Teflon support), which supports a magnetic component 402. The support 1502 can be used for placing the magnetic component 402 on the support 1502. In some embodiments, the coil 604 is wound around the support 1502, and the shape of the support 1502 can a guide for forming the shape of the coil windings. The coil 604 extends along axial direction 441. The orientation of the magnetic elements is indicated by coordinate 1592, and such an orientation is sometimes referred as a "vertical orientation," which correspond to the orientation described in relation to FIG. 5B. For apparatus 1510, the y- and z-direction is parallel to a plane where support 1502 lies. The x-direction is perpendicular to the plane where support 1502 lies. The different between orientations of FIGS. 5A and 5B are described earlier.

Apparatus 1520 includes a coil 604 wound around a Teflon support 1502, which supports a magnetic component 402. The coil 604 extends along axial direction 441. The orientation of the magnetic elements is indicated by coordinate 1593, and such an orientation is sometimes referred as a "transverse orientation." For apparatus 1520, the x- and y-direction is parallel to a plane where support 1502 lies. The z-direction is perpendicular to the plane where support 1502 lies.

Apparatuses 1500 and 1510 are constructed using eight groups of magnetic elements with a length of 100 mm. Arrangement 1520 is constructed using eight groups with a length of 80 mm. In the example shown in FIG. 15, the magnetic elements 620 have a thickness of about 15 to about 20 μm. Each group has about 500 magnetic elements 620. In certain embodiments, thinner magnetic elements can lead to smaller losses.

Figure 16:
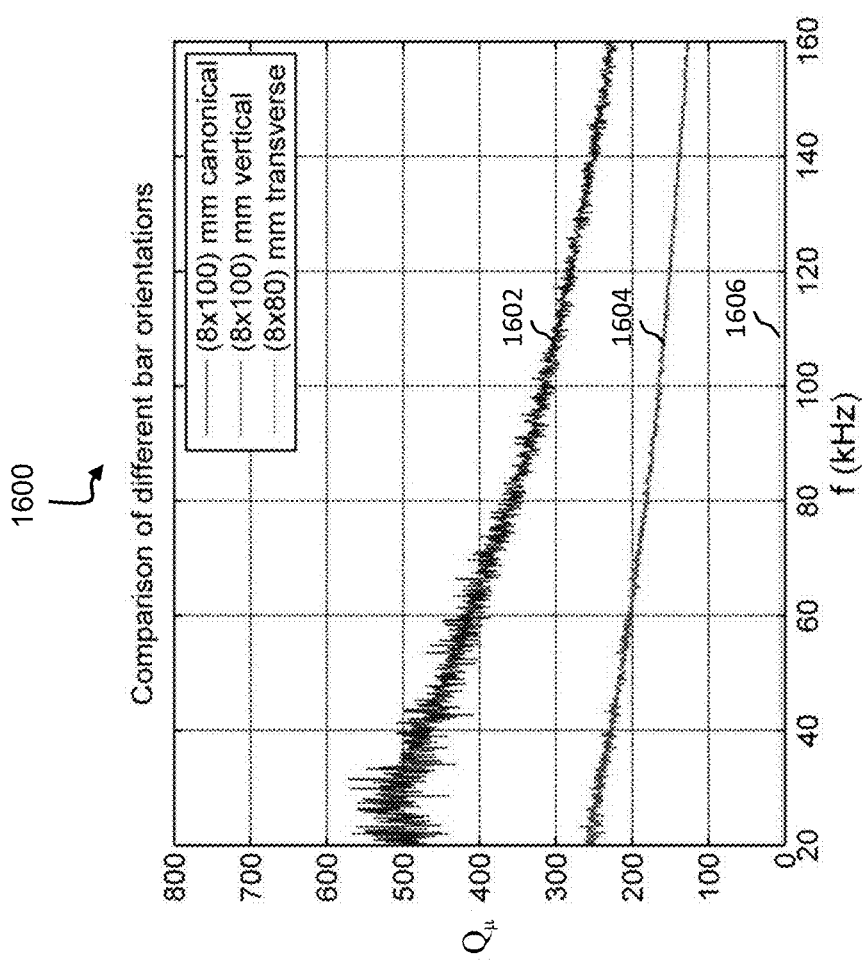
FIG. 16 is a plot showing measured quality factor contributed by the magnetic component ($Q_\mu$) values for the different magnetic components shown in FIG. 15.

FIG. 16 is a plot 1600 showing measured values of the quality factor contributed by the magnetic component ($Q_\mu$) (which will be discussed in more detail later) for the different magnetic components 402 shown in FIG. 15 as a function of the operating frequency of coil 604. Curve 1602 corresponds to apparatus 1500; curve 1604 corresponds to apparatus 1510; and curve 1606 corresponds to apparatus 1520. Curve 1602 has the highest quality factor contributed by the magnetic component $Q_\mu$. According to Eq. (6), higher values of quality factor contributed by the magnetic component $Q_\mu$ lead to smaller reductions in the value of quality factor ($Q_{total}$), which will be described in greater detail later. Thus, the canonical orientation of the magnetic elements, corresponding to curve 1602, can provide a higher quality factor ($Q_{total}$) than case of the vertical and transverse orientations corresponding to curves 1604 and 1606. Higher values of $Q_{total}$ can result in higher power transfer efficiency. For similar reasons, the canonical orientation of magnetic elements shown on the left-side of FIG. 7C can provide a higher quality factor contributed by the magnetic component, $Q_\mu$, than case of the vertical orientation of magnetic elements shown on the right-side of FIG. 7C.

FIG. 17 is a series of images of different magnetic components that are formed from magnetic elements of different lengths arranged in the canonical orientation. The orientation of the magnetic elements is indicated by coordinate 1791 which is the local coordinate described in FIG. 6A. The x- and y-direction is parallel to a plane where support 1502 lies. The z-direction is perpendicular to the plane where support 1502 lies. Apparatus 1700 includes a coil 604 wound around a Teflon support 1502, which supports a magnetic component 402. The coil 604 extends along axial direction 441. Multiple groups of magnetic elements are arranged in a row along a direction perpendicular to the axial direction 441. Groups 1702 and 1704 at the two ends of the row have a length of 80 mm along the axial direction 441. The other groups have a length of 100 mm along axial direction 441.

In a similar manner, apparatus 1710 includes groups 1702 and 1704 at the two ends of the magnetic component, each of which has a length of 60 mm in axial direction 441, while the other groups have a length of 100 mm in axial direction 441. Apparatus 1720 includes groups 1702 and 1704 at the two ends of the magnetic component, each having a length of 40 mm in axial direction 441, while the other groups have a length of 100 mm in axial direction 441. Apparatus 1730 includes groups 1702 and 1704 at the ends of the magnetic component, each having a length of 20 mm in axial direction 441, while the other groups have a length of 100 mm in axial direction 441.

Figure 18:
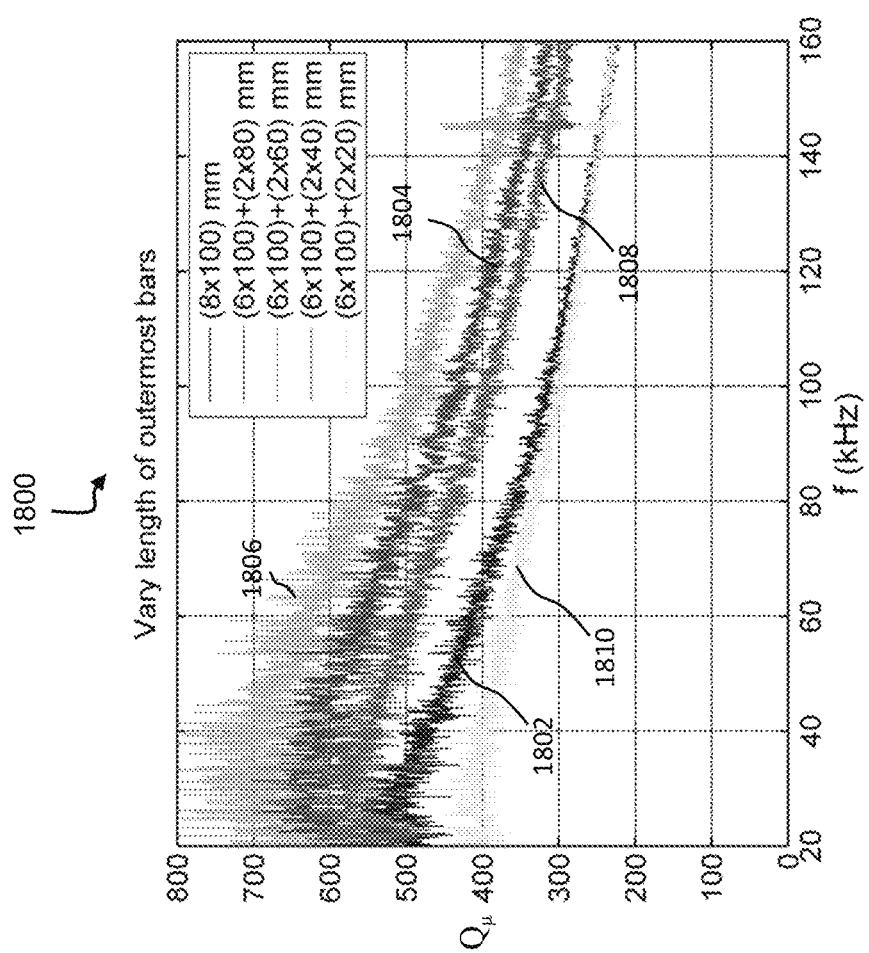
FIG. 18 is a plot showing measured quality factor contributed by the magnetic component $Q_\mu$ values for the different apparatuses.

FIG. 18 is a plot 1800 showing measured values of the quality factor contributed by the magnetic component, $Q_\mu$, for the different apparatuses of FIG. 17 and for apparatus 1500, as a function of the operating frequency of coil 604. Curve 1802 corresponds to apparatus 1500 of FIG. 15, curve 1804 corresponds to apparatus 1700 of FIG. 17, curve 1806 corresponds to apparatus 1710 of FIG. 17, curve 1808 corresponds to apparatus 1720 of FIG. 17, and curve 1810 corresponds to apparatus 1730 of FIG. 17.

Curve 1806 corresponds to one of the higher quality factor contributed by the magnetic component $Q_\mu$, and thus apparatus 1710 has one of the higher quality factor contributed by the magnetic component $Q_\mu$ from among apparatuses 1500, 1700, 1710, 1720 and 1730. As shown in FIG. 18, the quality factor changes in a relatively predictable manner when the geometry of the magnetic component (e.g., the cross-sectional shape of the material) changes in a regular manner. As such, an optimum length of groups 1702 and 1704 can be selected for achieving a higher quality factor contributed by the magnetic component $Q_\mu$. In general, an apparatus can include a plurality of groups where the length of each group is selected and/or adjusted to generate a relatively uniform magnetic field distribution in the material so that a quality factor contributed by the magnetic component, $Q_\mu$, is relatively high.

Figure 19:
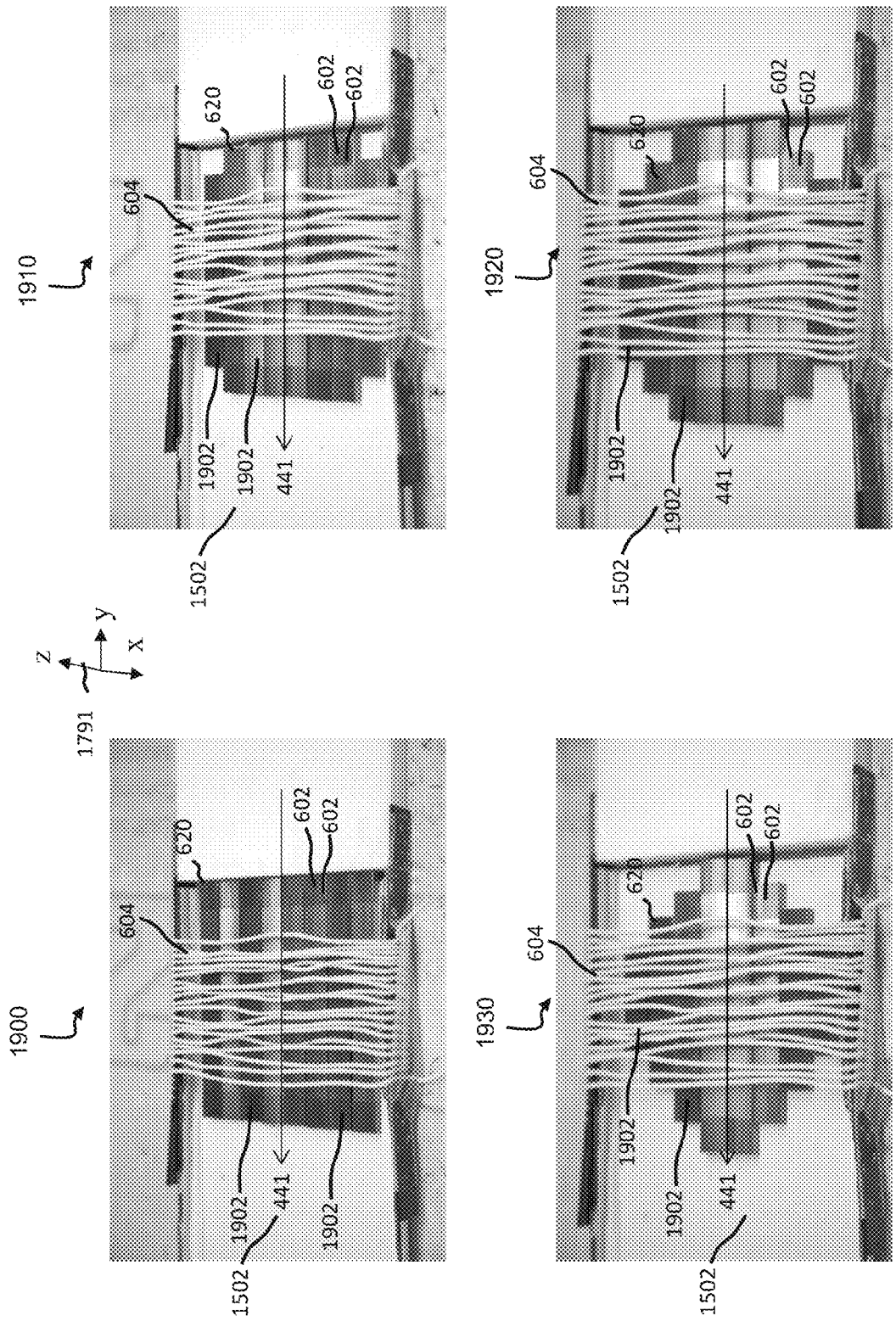
FIG. 19 is a series of images of different arrangements using various lengths of magnetic elements.

In some embodiments, groups other than those at the ends of the magnetic component can have different lengths. FIG. 19 includes a series of images of different apparatuses that include various lengths of magnetic elements in the canonical orientation. The orientation of the magnetic elements is indicated by coordinate 1791 which is the local coordinate described in relation to FIG. 6A. In these apparatuses, coil 604 is wound around a Teflon support 1502, which supports a magnetic component 402. The coil 604 extends along axial direction 441. Multiple groups are arranged in a row extending along a direction perpendicular to the axial direction 441. In apparatus 1900, groups 1902—each including multiple magnetic elements—all have the same length. In apparatuses 1910, 1920 and 1930, certain groups 1902 of magnetic elements have different lengths along axial direction 441 relative to other groups of magnetic elements.

Figure 20:
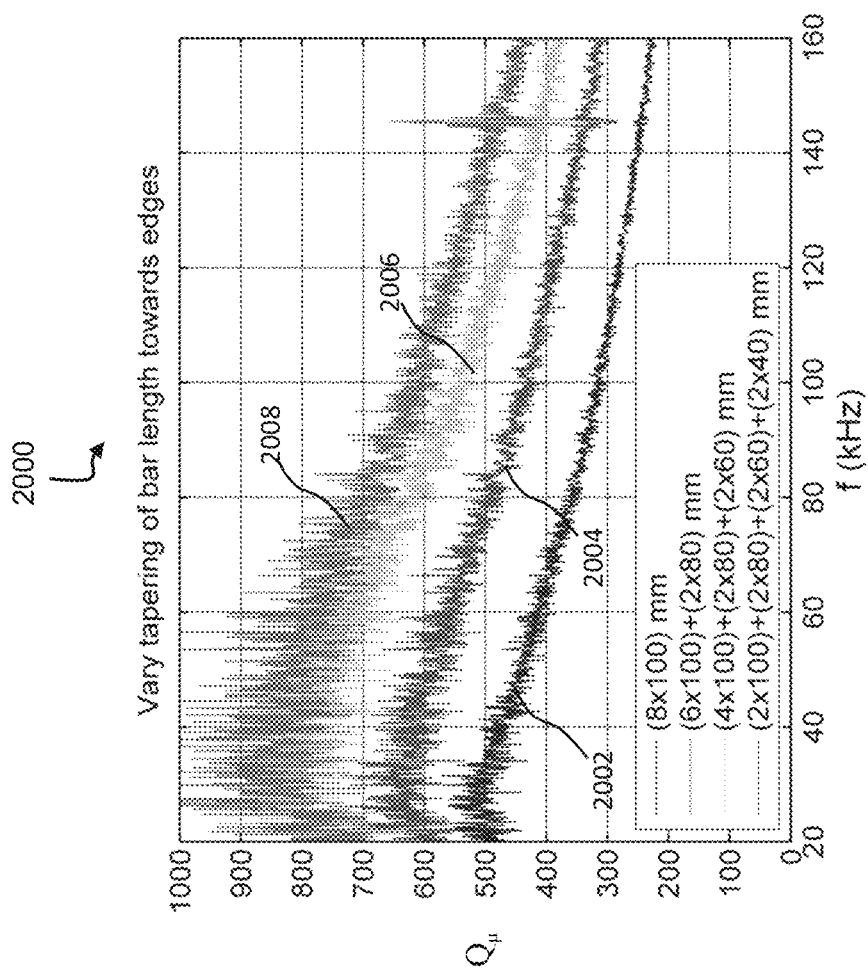
FIG. 20 is a plot showing measured quality factor contributed by the magnetic component $Q_\mu$ of apparatuses shown in FIG. 19 as a function of operating frequency.

FIG. 20 is a plot 2000 showing measured values of the quality factor contributed by the magnetic component, $Q_\mu$, of apparatuses 1900, 1910, 1920 and 1930 as a function of the operating frequency of coil 604. The quality factor contributed by the magnetic component, $Q_\mu$, was calculated according to Eq. (6) (described in more detail later). Curve 2002 corresponds to apparatus 1900, curve 2004 corresponds to apparatus 1910, curve 2006 corresponds to apparatus 1920, and curve 2008 corresponds to apparatus 1930.

Curve 2008 corresponds to one of the higher quality factor contributed by the magnetic component, $Q_\mu$, and thus apparatus 1930 has one of the higher quality factor contributed by the magnetic component $Q_\mu$ compared to the other apparatuses plotted in FIG. 20. In general, the different lengths of groups 1902 can be selected and/or adjusted to yield a magnetic component for which the magnetic field distribution is relatively uniform, such that the quality factor contributed by the magnetic component $Q_\mu$ is relatively high.

Figure 21:
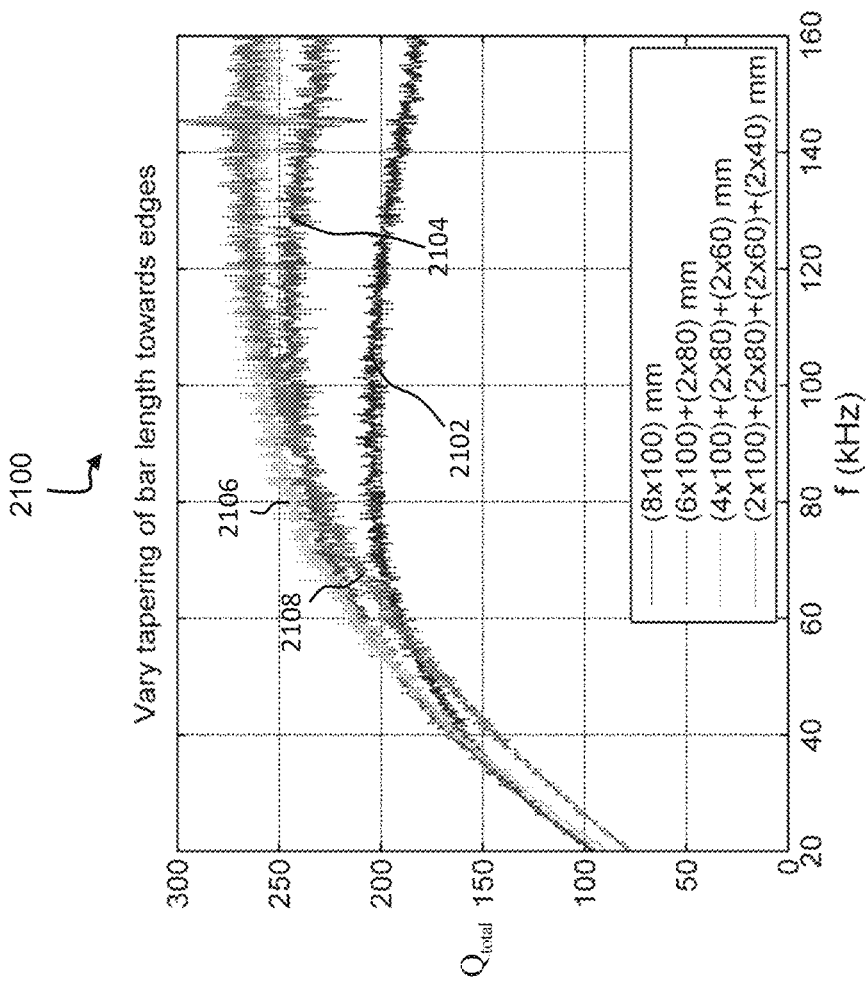
FIG. 21 is a plot showing measured quality factor $Q_{total}$ shown in FIG. 19 as a function of operating frequency.

FIG. 21 is a plot 2100 showing the quality factor $Q_{total}$ the cases of apparatuses 1900, 1910, 1920 and 1930 as a function of the operating frequency of coil 604. Curve 2102 corresponds to apparatus 1900, curve 2104 corresponds to apparatus 1910, curve 2106 corresponds to apparatus 1920, and curve 2108 corresponds to apparatus 1930. Simulation results such as those shown in FIG. 21 can be used to fabricate a magnetic component to provide a desired (e.g., large) quality factor $Q_{total}$ a given operating frequency range.

Figure 22:
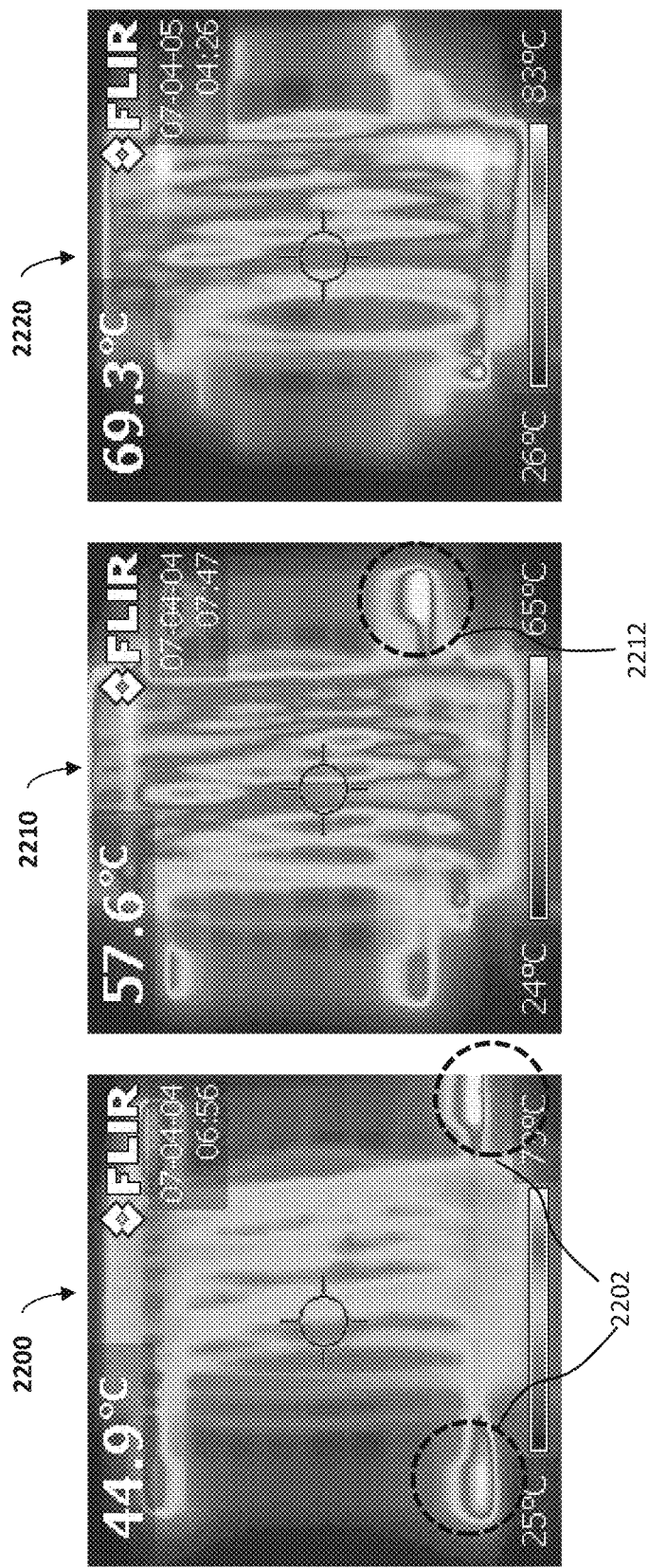
FIG. 22 is a series of images showing measured temperature distributions for different magnetic components, each featuring a plurality of magnetic elements.

In some embodiments, a detector (e.g., an infrared detector) can be used to monitor a temperature distribution within magnetic component 402. The monitored temperature distribution can be used to identify magnetic field hot spots within specific magnetic elements arranged in the magnetic component 402. Referring to FIG. 22, images 2200, 2210 and 2220 correspond to measured temperature distributions of the apparatuses 1900, 1920 and 1930 in FIG. 19, respectively. Image 2200 was shown in FIG. 6D, and includes hot spots 2202 located in magnetic elements positioned at the ends of the row of elements that form the magnetic component in apparatus 1900. Image 2210 shows hot spot 2212. Image 2210 shows a more uniform temperature distribution compared to that of image 2200. Image 2220 shows a more uniform temperature distribution compared to that of image. These examples show reduction of relative localization of heating as the length of magnetic elements become more gradually varying along the row of elements. The operated power levels were different for different images.

Generally, magnetic fields oscillating in a magnetic component lead to the generation of heat in the material. The heat can damage the magnetic component if its temperature rises too high and/or too quickly. In particular, hot spots can raise the temperature of a localized region of the magnetic component, leading to material damage (e.g., expansion-related fracture).

In certain embodiments, a measured temperature distribution within the magnetic component can be used to identify possible damage and/or identify defects in the magnetic elements (e.g., when a temperature at a point in the magnetic component increases rapidly over time). Magnetic elements that are damaged can be replaced to avoid further defect-induced heating of the magnetic component.

Figure 23:
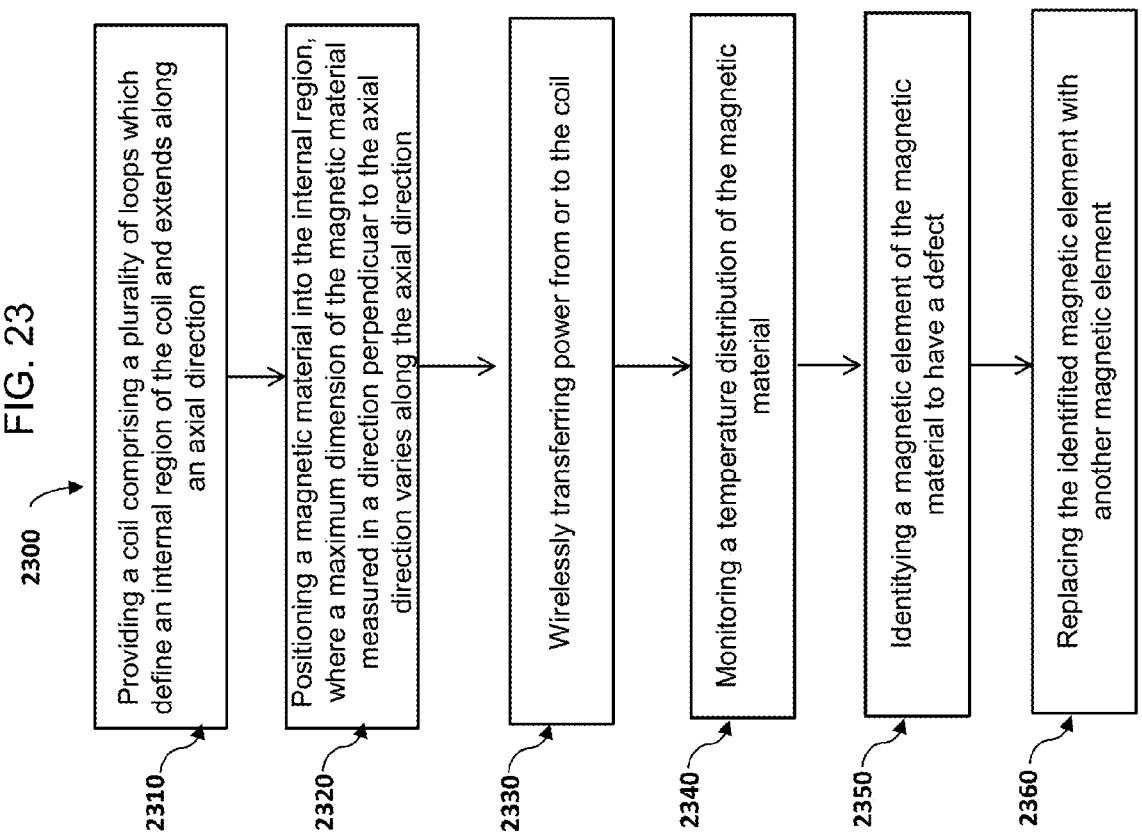
FIG. 23 is a flow chart that includes a series of steps for wirelessly transferring power and monitor hot spots of magnetic components.

FIG. 23 is a flow chart depicting an example process 2300 for wirelessly transferring power using the magnetic components disclosed herein, and for monitoring hot spots within such magnetic components. At step 2310, a coil is provided, where the coil is formed of a conductive material and includes a plurality of loops extending along an axial direction. The plurality of loops defines an internal region of the coil. In some embodiments, the coil can be formed from Litz wire. For example, Litz wire can be used for operation frequencies of lower than 1 MHz. In certain embodiments, the coil can be a solid core wire or conducting layers (e.g., copper layers) in a printed circuit board (PCB). For example, such solid core wire or conducting layers can be used for operation frequencies of 1 MHz or higher.

At step 2320, a magnetic component having an anisotropic magnetic permeability is positioned within the internal region of the coil. The magnetic component extends in a first direction parallel to the axial direction and in a second direction perpendicular to the axial direction. A maximum dimension of the magnetic component measured in the second direction can vary along the axial direction. In some embodiments, the magnetic component can include multiple magnetic elements with varying lengths along the axial direction. The magnetic elements can be arranged in a row that extends along the second direction. In certain embodiments, the magnetic elements can be formed into several groups, where magnetic elements in a given group have the same length along the axial direction. Different groups can have different lengths measured along the axial direction.

At step 2330, power is transferred wirelessly from or to the coil. For example, the coil in steps 2310 and 2320 can be included in a power transmitting apparatus. As another example, the coil can be included in a power receiving apparatus. In some embodiments, a power transmitting apparatus and a power receiving apparatus each include a coil of the type described in connection with steps 2310 and 2320.

The disclosed techniques can be implemented for low operating frequencies. The operating frequency of a power transfer system can be chosen as the frequency of minimum loss of the combined contribution of losses of a shield, resonators and electronics such as amplifiers and DC-AC converters of the system. The shield can have lower losses as the operating frequency increases, and the resonator can have lower losses as long as the frequency is low enough that radiative losses in the resonator are lower than ohmic losses in the resonator. On the other hand, the electronics can have higher losses as the operating frequency increases. Thus, an optimum frequency can exist where the combined losses can be minimum. In addition, the operating frequency of a wireless power system may be chosen to exist within certain pre-specified frequency bands determined by a regulatory agency, a standards committee, a government or military organization, and the like. In some cases, the resonator and shield designs are optimized to operate at a specified frequency and/or within a certain frequency range. For example, such an operating frequency can be about 85 kHz. In some embodiments, the operating frequency can be at about 145 kHz. In high power applications, the losses of the electronics are typically lower for operating frequencies below 200 kHz, and thus certain high power applications are designed to operate at 20 kHz, 50 kHz, 85 kHz, and 145 kHz. In low power applications (e.g., low power consumer electronics), certain applications are designed to operate at the Industrial, Scientific and Medical (ISM) frequencies, where conducted and radiated emissions are not subject to regulatory restrictions. The ISM frequencies include 6.78 MHz, 13.56 MHz and many harmonics of 13.56 MHz. Magnetic component including nanocrystalline magnetic materials can have magnetic permeabilities that a relatively constant (e.g., that vary by less than 5%) for frequencies in this range. For example, nanocrystalline magnetic materials can be advantageous over magnetic components such as N95® at an operating frequency of 80 kHz as described in relation to FIGS. 12A-C.

In some embodiments, power transfer can occur with a peak magnetic flux density in the magnetic component that varies in a range from about 10 mT to about $10^3$ mT. For example, nanocrystalline magnetic materials, such as those described in connection with FIG. 12C, can be included in the magnetic component to yield a magnetic component for which $\mu_r$ is relatively constant (e.g., varies by less than 5%) as a variety of the magnetic flux density in the magnetic component.

At step 2340, a temperature distribution of the magnetic component is monitored. For example, the temperature distribution can be monitored for different power transfer levels of the power transfer in step 2330. In some embodiments, the magnetic component includes magnetic elements, and the monitoring includes monitoring the temperature in the magnetic elements proximate to the edges of the magnetic component.

At step 2350, magnetic elements with defects in the magnetic component are identified. In some embodiments, the defect can be identified based on a threshold temperature (e.g., 50°, 60°, 70°, 80°, 90°). For example, if the temperature at a location within the magnetic element is above the threshold temperature, e.g., above 50° (above 60°, above 70°, above 80°, above 90°), that element can be identified as having a defect. The threshold temperature value can depend on the types of magnetic elements in the magnetic component. For example, a nanocrystalline magnetic element can have a relatively high threshold temperature if its heat resiliency is relatively high, e.g., higher than for magnetic elements formed from ferrite materials.

At step 2360, magnetic elements with defects are replaced with new magnetic elements. In some embodiments, only magnetic elements identified as having defects are replaced; other magnetic elements are not replaced. By replacing only a portion of the magnetic component (e.g., the damaged magnetic elements), reduced maintenance costs can be realized.

Although the foregoing discussion focuses generally on power transmitting apparatuses, the disclosure is equally applicable to power receiving apparatuses and power repeating apparatuses. For example, a power receiving apparatus can include a coil, a shield and a magnetic component formed from magnetic elements of varying lengths. The magnetic elements can be arranged to achieve a more uniform magnetic field distribution within the magnetic component, and to thereby reduce or eliminate hot spots, e.g., near the edges of the magnetic component in proximity to sharp coil turns. Moreover, the magnetic elements can be formed from any of the nanocrystalline magnetic materials disclosed herein. By using contoured magnetic components and/or elements formed from nanocrystalline magnetic materials, energy losses and the potential for heating-induced damage in power receiving apparatuses can be reduced or eliminated.

Quality Factors and Operating Conditions

The resonators disclosed herein, which can be source resonators, receiver resonators, and/or repeater resonators, can each be an electromagnetic resonator that is capable of storing energy in fields (e.g., electric, magnetic fields). Any one of the resonators can have a resonant frequency $f=\omega/2\pi$, an intrinsic loss rate $\Gamma$, and a Q-factor $Q=\omega/(2\Gamma)$ (also referred as "intrinsic" quality factor in this disclosure), where w is the angular resonant frequency. A resonator can have a capacitance (C) and inductance (L) that defines its resonant frequency f according to equation 1 (Eq. (5)) below:

$$f = \frac{\omega}{2\pi} = \frac{1}{2\pi}\sqrt{\frac{1}{LC}}. \quad (5)$$

In some embodiments, any one of a source resonator, a receiver resonator, and/or a repeater resonator can have a Q-factor that is a high Q-factor where Q>100 (e.g., Q>100, Q>200, Q>300, Q>500, Q>1000). For example, a wireless power transfer system can include one or more source resonators, and at least one of the source resonators can have a Q-factor of $Q_1>100$ (e.g., $Q_1>100$, $Q_1>200$, $Q_1>300$, $Q_1>500$, $Q_1>1000$). The wireless power transfer system can include one or more receiver resonators, and at least one of the receiver resonators can have a Q-factor of $Q_2>100$ (e.g., $Q_2>100$, $Q_2>200$, $Q_2>300$, $Q_2>500$, $Q_2>1000$). The wireless power transfer system can include one or more repeater resonators, and at least one of the repeater resonators can have a Q-factor of $Q_3>100$ (e.g., $Q_3>100$, $Q_3>200$, $Q_3>300$, $Q_3>500$, $Q_3>1000$).

Utilizing high Q-factor resonators can lead to large energy transfer efficiency between at least some or all of the resonators in the wireless power transfer system. Resonators with high Q-factors can couple strongly to other resonators such that the "coupling time" between resonators is shorter than the "loss time" of the resonators. As a result, the energy transfer rate between resonators can be larger than the energy dissipation rate of individual resonators. Energy can therefore be transferred efficiently between resonators at a rate higher than the energy loss rate of the resonators, which arises from heating and radiative losses in the resonators.

In certain embodiments, for a source-receiver resonator pair with Q factors $Q_i$ and $Q_j$ (i=1, j=2), for a source-repeater resonator pair with Q factors $Q_i$ and $Q_j$ (i=1, j=3), and/or for a receiver-repeater resonator pair with Q factors $Q_i$ and $Q_j$ (i=2, j=3), a geometric mean $\sqrt{Q_iQ_j}$ can be larger than 100 (e.g., $\sqrt{Q_iQ_j}>200$, $\sqrt{Q_iQ_j}>300$, $\sqrt{Q_iQ_j}>500$, $\sqrt{Q_iQ_j}>1000$). Any one of the source, receiver, and repeater resonators can include one or more of the coils described herein. High-Q resonators and methods for transferring power using such resonators are described, for example, in commonly owned U.S. patent application Ser. No. 12/567,716, published as US Patent Application Publication 2010/0141042, and issued as U.S. Pat. No. 8,461,719 on Jun. 11, 2013; U.S. patent application Ser. No. 12/720,866, published as US Patent Application Publication 2010/0259108, and issued as U.S. Pat. No. 8,587,155 on Nov. 19, 2013; U.S. patent application Ser. No. 12/770,137, published as U.S. Patent Application Publication 2010/0277121; U.S. patent application Ser. No. 12/860,375, published as US Patent Application Publication 2010/0308939; U.S. patent application Ser. No. 12/899,281, published as US Patent Application Publication 2011/0074346; U.S. patent application Ser. No. 12/986,018, published as U.S. Patent Application Publication 2011/0193416; U.S. patent application Ser. No. 13/021,965, published as US Patent Application Publication 2011/0121920; U.S. patent application Ser. No. 13/275,127, published as US Patent Application Publication 2012/0119569; U.S. patent application Ser. No. 13/536,435, published as US Patent Application Publication 2012/0313742; U.S. patent application Ser. No. 13/608,956, published as US Patent Application Publication 2013/0069441; U.S. patent application Ser. No. 13/834,366, published as US Patent Application Publication 2013/0221744; U.S. patent application Ser. No. 13/283,822, published as US Patent Application Publication No. 2012/0242225, issued as U.S. Pat. No. 8,441,154 on May 14, 2013; U.S. patent application Ser. No. 14/059,094; and U.S. patent application Ser. No. 14/031,737. The contents of each of the foregoing applications are incorporated herein by reference.

In some embodiments, a resonator of any of the types disclosed herein (e.g., source, receiver, repeater resonators) can include a coil formed of a conductive material. In certain embodiments, the resonator can have a resonance with a resonant frequency defined by an inductance and capacitance of the coil as described by Eq. (5) In this disclosure, the coil is also referred to interchangeably as a "coil structure."

In certain embodiments, the coil can be connected to at least one capacitor, and the resonator can have a resonance with a resonator frequency defined by a combined inductance and combined capacitance of the coil-capacitor structure as described by Eq. (1). In this disclosure, the combination of the coil and the capacitor is also referred to interchangeably as a "coil-capacitor structure."

In certain embodiments, an apparatus can include a coil wound around or positioned above and/or near-by a magnetic component (e.g., ferrite material). The magnetic component can enhance an induced magnetic flux density and can shield from nearby absorbing materials to reduce energy losses from such materials. In this disclosure, the combination of the coil and the magnetic component is also referred to interchangeably as a "coil-magnetic component structure." A coil-magnetic component structure may or may not include a capacitor connected to the coil. A coil-magnetic component structure can have a resonant frequency defined by a combined inductance and combined capacitance of the coil structure and the magnetic component, or the coil-capacitor structure and the magnetic component, and a quality factor. In this disclosure, the quality factor $Q_{total}$ of the coil-magnetic component structure, $Q_{total}$, can be expressed according to:

$$\frac{1}{Q_{total}} = \frac{R_{total}}{\omega L_{total}} = \frac{1}{Q_{coil}} + \frac{1}{Q_\mu} = \frac{R_{coil}}{\omega L_{total}} + \frac{R_\mu}{\omega L_{total}}, \quad (6)$$

where $R_{total}$ and $L_{total}$ is the total effective resistance and inductance of the coil-magnetic component structure, respectively. $R_{coil}$ and $R_\mu$ are the effective resistance contributed by the coil and the magnetic component, respectively. In Eq. (2), $Q_{coil}$ can be considered as the quality factor of the configuration assuming a lossless magnetic component, and $Q_\mu$ can be considered as the quality factor contributed by the magnetic component (e.g., ferrite material) with its loss to the coil structure or the coil-capacitor structure.

In some embodiments, $Q_{total}$ can be measured or calculated. $R_{total}$ and $L_{total}$ can be calculated from the obtained $Q_{total}$. Another measurement or calculation without the presence of the magnetic component can be carried out to obtain $R_{coil}$ in Eq. (6) assuming $R_{coil}$ is not affected by the presence of the magnetic component. Then, $R_\mu$ can be calculated by subtracting $R_{coil}$ from $R_{total}$. Further, $Q_\mu$ can be obtained using the calculated $R_\mu$ and $L_{total}$ based on the relations described in Eq. (6).

Hardware and Software Implementation

Figure 24:
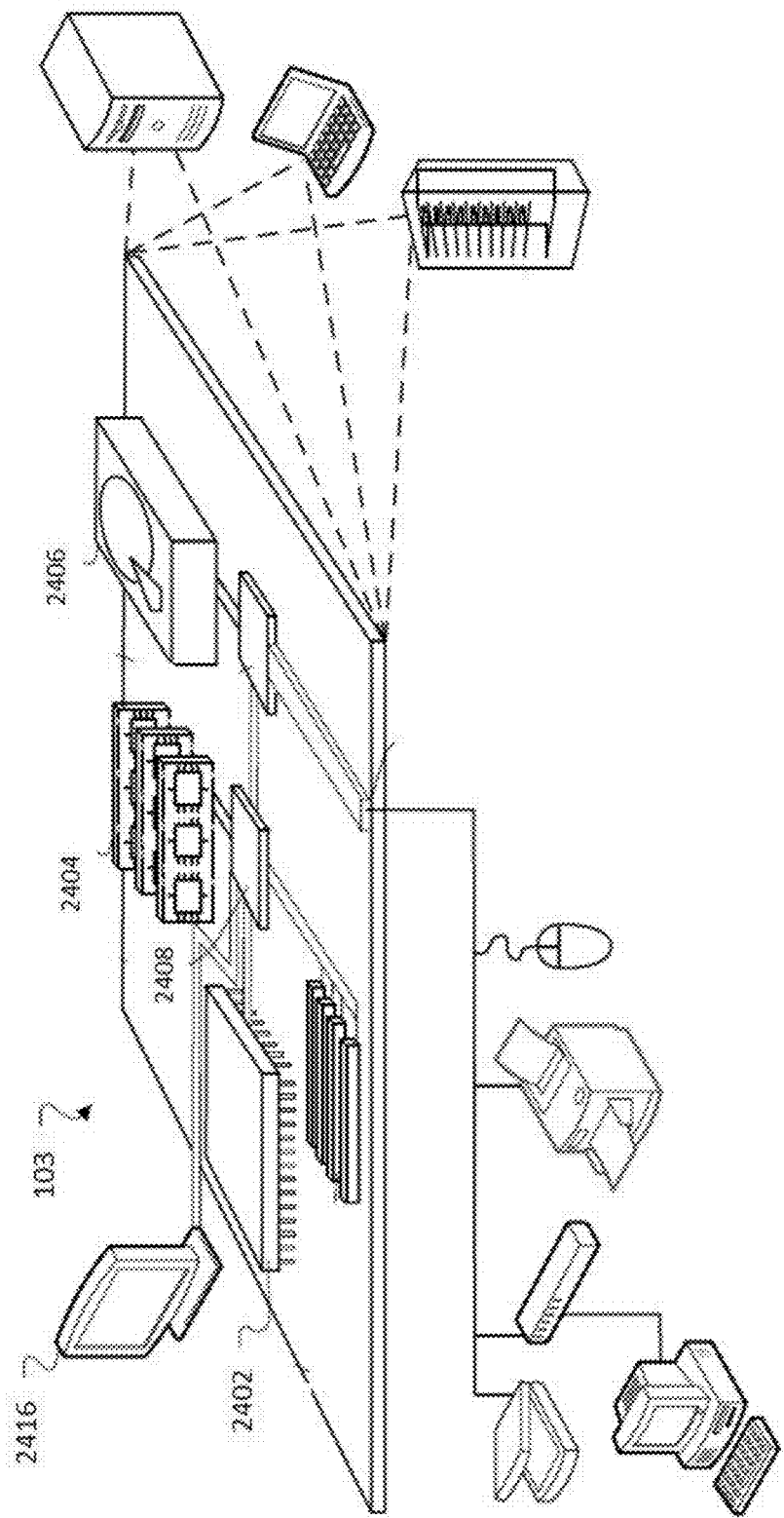
FIG. 24 is a schematic diagram of an example of a computing device.

FIG. 24 shows an example of an electronic controller 103, which may be used with the techniques described here. As mentioned earlier, the electronic controller 103 can be used to control power transfer of a wireless power transferring system, for example, by changing power output of a power source, adjusting operation and/or resonant frequencies and adjusting impedance matching networks. In some embodiments, the electronic controller 103 can be directly connected to or wirelessly communicate with various elements of the system.

Electronic controller 103 can include a processor 2402, memory 2404, a storage device 2406 and interfaces 2408 for interconnection. The processor 2402 can process instructions for execution within the electronic controller 103, including instructions stored in the memory 2404 or on the storage device 2406. For example, the instructions can instruct the processor 2402 to determine parameters of the system such as efficiency of power transfer, operating frequency, resonant frequencies of resonators and impedance matching conditions. In certain embodiments, the processor 2402 is configured to send out control signals to various elements (e.g., power source, power transmitting apparatus, power receiving apparatus, impedance matching networks) to adjust the determined parameters. For example, control signals can be used to tune capacitance values of capacitors in an impedance matching network. In certain embodiments, control signals can be used to adjust operation frequency of a power source. Control signals can change capacitance value of a capacitor in a resonator to tune its resonant frequency.

The memory 2404 can store information of optimized parameters of the system. For example, the information can include optimized impedance matching conditions for various levels of power output from the power source. In certain embodiments, the memory 2404 can store information such as resonant frequencies of resonator and magnetic properties (e.g., magnetic permeability depending on power levels) of magnetic components in the system, which can be used by the processor 2402 for determining signals to be sent out to control various elements in the system.

The storage device 2406 can be a computer-readable medium, such as a floppy disk device, a hard disk device, an optical disk device, or a tape device, a flash memory or other similar solid state memory device, or an array of devices, including devices in a storage area network or other configurations. The storage device 2605 can store instructions that can be executed by processor 2402 described above. In certain embodiments, the storage device 2605 can store information described in relation to memory 2404.

In some embodiments, electronic controller 103 can include a graphics processing unit to display graphical information (e.g., using a GUI or text interface) on an external input/output device, such as display 2416. The graphical information can be displayed by a display device (device (e.g., a CRT (cathode ray tube) or LCD (liquid crystal display) monitor) for displaying information. A user can use input devices (e.g., keyboard, pointing device, touch screen, speech recognition device) to provide input to the electronic controller 103. In some embodiments, the user can monitor the display 2416 to analyze the power transfer conditions of the system. For example, when the power transfer is not in optimum condition, the user can adjust parameters (e.g., power transfer level, capacitor values in impedance matching networks, operation frequency of power source, resonant frequencies of resonators) by inputting information through the input devices. Based on the receive input, the electronic controller 103 can control the system as described above.

In some embodiments, the electronic controller 103 can be used to monitor hazardous conditions of the system. For example, the electronic controller 103 can detect overheating in the system and provide an alert (e.g., visual, audible alert) to the user through its graphical display or audio device.

In certain embodiments, electronic controller 103 can be used to control magnitudes and phases of currents flowing in one or more coils of the wireless power transfer system. For example, processor 2402 can calculate and determine the magnitudes and phase of currents to be supplied to coils in a power transmitting apparatus. The determination can be based on the monitored power transfer efficiency and information stored in memory 2404 or storage 2406.

A feedback signal can be received and processed by the electronic controller 103. For example, the electronic controller 103 can include a wireless communication (e.g., radio-frequency, Bluetooth receiver) to receive information from either or both of a power transmitting apparatus and a power receiving apparatus (which can have its own wireless communication device). In some embodiments, the received information can be processed by processor 2402, which can further send out control signals to adjust parameters of the system as described above. For example, the control signals can be used to adjust the magnitudes and phases of currents flowing in one or more coils of resonators in the system to increase the power transfer efficiency.

Various embodiments of the systems and techniques described here can be realized by one or more computer programs that are executable and/or interpretable on the electronic controller 103. These computer programs (also known as programs, software, software applications or code)

include machine instructions for a programmable processor, and can be implemented in a high-level procedural and/or object-oriented programming language, and/or in assembly/machine language. For example, computer programs can contain the instructions that can be stored in memory 2404 and storage 2406 and executed by processor 2402 as described above. As used herein, the terms "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

Generally, electronic controller 103 can be implemented in a computing system to implement the operations described above. For example, the computing system can include a back end component (e.g., as a data server), or a middleware component (e.g., an application server), or a front end component (e.g., a client computer having a graphical user-interface), or any combination therefor, to allow a user to utilized the operations of the electronic controller 103.

The electronic controller 103 or one or more of its elements can be integrated in a vehicle. The electronic controller 103 can be utilized to control and/or monitor wireless power charging of a battery installed in the vehicle. In some embodiments, the display 2416 can be installed adjacent to the driving wheel of the vehicle so that a user may monitor conditions of the power charging and/or control parameters of the power charging as described in relation to FIG. 24. The display 2416 can also visualize information traffic information and road maps based on Global Positioning System (GPS) information. Any of the elements such as the processor 2402, memory 2404 and storage device 2406 can be installed in the space behind the display 2416, which can visualize the data process by those elements.

OTHER EMBODIMENTS

While this disclosure contains many specific embodiments and implementation details, these should not be construed as limitations on the scope of the disclosure. Other embodiments are also within the scope of this disclosure. Also, features that are described in this disclosure in the context of separate embodiments can, in general, also be implemented in combination in a single embodiment. Various features that are described in the context of a single embodiment can, in general, also be implemented in other embodiments, alone or in combination with other features disclosed herein.

What is claimed is:

1. An apparatus for wireless power transfer, the apparatus comprising:
    a coil formed of a conductive material and comprising a plurality of loops, wherein the plurality of loops defines an internal region of the coil that extends along a coil axis; and
    a magnetic component, wherein the magnetic component is disposed in the internal region and extends in a first direction parallel to the coil axis and in a second direction perpendicular to the coil axis,
    wherein a maximum dimension of the magnetic component measured in the second direction varies along the first direction;
    wherein a plurality of magnetic elements are joined to form the magnetic component and the plurality of magnetic elements are positioned in a row that extends in a direction parallel to the second direction; and
    wherein one or more edges of the magnetic component have a stepped profile.

2. The apparatus of claim 1, wherein the magnetic component has an anisotropic magnetic permeability.

3. The apparatus of claim 1, wherein during operation of the apparatus, an average magnetic field generated by the coil at a given time in the magnetic component is oriented along a direction different from the second direction.

4. The apparatus of claim 1, wherein each one of the plurality of loops has a common diameter.

5. The apparatus of claim 1, wherein each one of the plurality of magnetic elements contacts adjacent magnetic elements within the row, and is connected to adjacent magnetic elements within the row by a dielectric material comprising an adhesive.

6. The apparatus of claim 1, wherein during operation, the apparatus is configured to wirelessly transfer power to, or receive power from, another coil.

7. The apparatus of claim 6, wherein during operation, the apparatus is configured to transfer power to an additional coil at an operating frequency within a range of one of: 85 kHz or less, and between about 80 kHz and about 145 kHz.

8. The apparatus of claim 6, wherein during operation, the apparatus is configured to transfer power from the coil to an additional coil at 3.3 kW or higher.

9. The apparatus of claim 6, wherein during operation of the apparatus, a magnetic field is generated when the coil is driven, the magnetic field having a magnetic flux density that varies in a range from about 10 mT to about 1000 mT.

10. An apparatus for wireless power transfer, the apparatus comprising:
    a coil formed of a conductive material and comprising a plurality of loops, wherein the plurality of loops defines an internal region of the coil that extends along a coil axis; and
    a magnetic component, wherein the magnetic component is disposed in the internal region and extends in a first direction parallel to the coil axis and in a second direction perpendicular to the coil axis,
    wherein a maximum dimension of the magnetic component measured in the second direction varies along the first direction; and
    wherein the magnetic component has one of an oval shape, a square shape, a hexagonal shape, and a bowtie shape.

11. The apparatus of claim 10, wherein:
    a plurality of magnetic elements are joined to form the magnetic component;
    the plurality of magnetic elements are positioned in a row that extends in a direction parallel to the second direction; and
    one or more edges of the magnetic component have a smooth profile.

12. The apparatus of claim 11, wherein one or more edges of the magnetic component have a smooth linear profile.

13. The apparatus of claim 11, wherein one or more edges of the magnetic component have a smooth curved profile.

14. An apparatus for wireless power transfer, the apparatus comprising:
    a coil formed of a conductive material and comprising a plurality of loops, wherein the plurality of loops defines an internal region of the coil that extends along a coil axis; and
    a magnetic component, wherein the magnetic component is disposed in the internal region and extends in a first direction parallel to the coil axis and in a second direction perpendicular to the coil axis, wherein a maximum dimension of the magnetic component measured in the second direction varies along the first direction; and wherein at least some of the plurality of loops have different diameters, and the diameters of the plurality of loops vary based on positions of each of the loops relative to edges of the magnetic component.

15. An apparatus for wireless power transfer, the apparatus comprising:
a coil formed of a conductive material and comprising a plurality of loops, wherein the plurality of loops defines an internal region of the coil that extends along a coil axis; and
a magnetic component, wherein the magnetic component is disposed in the internal region and extends in a first direction parallel to the coil axis and in a second direction perpendicular to the coil axis,
wherein a maximum dimension of the magnetic component measured in the second direction varies along the first direction;
wherein a plurality of magnetic elements are joined to form the magnetic component and the plurality of magnetic elements are positioned in a row that extends in a direction parallel to the second direction; and
wherein each one of the plurality of magnetic elements has a length measured in a direction parallel to the first direction, and at least two magnetic elements have different lengths.

16. An apparatus for wireless power transfer, the apparatus comprising:
a coil formed of a conductive material and comprising a plurality of loops, wherein the plurality of loops defines an internal region of the coil that extends along a coil axis; and
a magnetic component, wherein the magnetic component is disposed in the internal region and extends in a first direction parallel to the coil axis and in a second direction perpendicular to the coil axis,
wherein a maximum dimension of the magnetic component measured in the second direction varies along the first direction;
wherein a plurality of magnetic elements are joined to form the magnetic component and the plurality of magnetic elements are positioned in a row that extends in a direction parallel to the second direction;
wherein one or more edges of the magnetic component have a smooth linear profile; and
wherein one of:
the magnetic elements are arranged such that a magnetic element with a longest length is positioned at a center of the row, and a magnetic element with a shortest length is positioned at an end of the row; or
the magnetic elements are arranged such that a magnetic element with a longest length is positioned at an end of the row, and a magnetic element with a shortest length is positioned at a center of the row.

17. An apparatus for wireless power transfer, the apparatus comprising:
a coil formed of a conductive material and comprising a plurality of loops, wherein the plurality of loops defines an internal region of the coil that extends along a coil axis; and
a magnetic component, wherein the magnetic component is disposed in the internal region and extends in a first direction parallel to the coil axis and in a second direction perpendicular to the coil axis,
wherein a maximum dimension of the magnetic component measured in the second direction varies along the first direction;
wherein a plurality of magnetic elements are joined to form the magnetic component and the plurality of magnetic elements are positioned in a row that extends in a direction parallel to the second direction; and
wherein the plurality of magnetic elements are symmetrically arranged with respect to the coil axis.

* * * * *